United States Patent [19]

Raz

[11] Patent Number: 5,504,899
[45] Date of Patent: Apr. 2, 1996

[54] GUARANTEEING GLOBAL SERIALIZABILITY BY APPLYING COMMITMENT ORDERING SELECTIVELY TO GLOBAL TRANSACTIONS

[75] Inventor: Yoav Raz, Newton, Mass.

[73] Assignee: Digital Equipment Corporation, Maynard, Mass.

[21] Appl. No.: 348,753

[22] Filed: Dec. 2, 1994

Related U.S. Application Data

[63] Continuation of Ser. No. 778,254, Oct. 17, 1991, abandoned.

[51] Int. Cl.$^6$ .................................................. G06F 12/14
[52] U.S. Cl. ................... 395/650; 395/600; 364/DIG. 2; 364/974.7; 364/969
[58] Field of Search .................................. 395/600, 650, 395/700

[56] References Cited

U.S. PATENT DOCUMENTS

| | | | |
|---|---|---|---|
| 4,224,664 | 9/1980 | Trinchieri | 364/200 |
| 4,249,241 | 2/1981 | Aberle et al. | 364/200 |
| 4,627,019 | 12/1986 | Ng | 364/900 |
| 4,881,166 | 11/1989 | Thompson et al. | 364/200 |
| 5,193,188 | 3/1993 | Franaszek et al. | 395/650 |
| 5,263,156 | 11/1993 | Bowen et al. | 395/600 |

FOREIGN PATENT DOCUMENTS

| | | | |
|---|---|---|---|
| 0457112 | 11/1991 | European Pat. Off. | G06F 9/46 |
| 3927703 | 3/1990 | Germany | G06F 15/16 |

OTHER PUBLICATIONS

Database System Concepts, Korth et al., McGraw Hill Inc., 1991, 1986, pp. 491–503.

On Serializability of multidatabase transactions through forced local conflicts, Georgakoponlos et al., Proc. of 7th Int. Conf. on Data Engy., Apr., 1991.

Christos Papadimitriou, *The Theory of Database Concurrency Control*, Computer Science Press, Inc., Rockville, Maryland, (1986), pp. 93–158, 201–224.

Vassos Hadzilacos, "A Theory of Reliability in Database Systems," *Journal of the ACM*, vol. 35, No. 1, Jan., 1988, pp. 121–145, Association for Computing Machinery, New York, New York.

Agrawal et al., "Modular Synchronization in Multiversion Databases: Version Control and Concurrency Control," *Proc. of the 1989 ACM Sigmond Int. Conf. on Management of Data*, pp. 408–417, Portland, Oregon, Jun., 1989, Association for Computing Machinery, New York, N.Y.

Kung et al., "On Optimistic Methods for Concurrency Control," *ACM Transactions on Database Systems*, vol. 6, No. 2, (Jun. 1981), pp. 213–226, Association for Computing Machinery, New York, NY.

(List continued on next page.)

*Primary Examiner*—Kevin A. Kriess
*Assistant Examiner*—Kakali Chaki
*Attorney, Agent, or Firm*—Arnold, White & Durkee

[57] ABSTRACT

Global serializability in a distributed computing system having a plurality of resource managers is guaranteed by selectively committing global transactions, and aborting or delaying commitment of transactions to enforce an order of commitment of global transactions that is the same as an order of conflicts among the global transactions, including indirect conflicts caused by local transactions. These conflicts are detected, for example, by maintaining a serializability graph in each resource manager recording the effects of local as well as global transactions, including the effects of committed local transactions. The serializability graph includes nodes representing transactions, directed edges representing direct conflicts, and paths including more than one edge representing indirect conflicts. By referencing the serializability graph, global serializability is achieved in a most efficient manner. An atomic commitment coordinator, for example, communicates with a plurality of resource managers by way of "prepare," "commit" and "abort" commands, and the serializability graph in each resource manager is referenced to delay acknowledging that a global transaction has been "prepared" until an optimum "abort set" is obtained for compliance with the global transaction commitment order.

38 Claims, 18 Drawing Sheets

OTHER PUBLICATIONS

Chan et al., "Implementing Distributed Read–Only Transactions," *IEEE Transactions on Software Engineering,* vol. SE–11, No. 2, (Feb. 1985), pp. 205–212. IEEE, New York, N.Y.

Garcia–Molina et al., "Node Autonomy in Distributed Systems," (1988), pp. 158–166, IEEE, New York, N.Y.

Calton Pu, "Transactions across Heterogeneous Databases: the Super–database Architecture," pp. 1–18, (Jun. 1988), Department of Computer Science, Columbia, University, New York, N.Y.

Elmagarmid et al., "A Paradigm for Concurrency Control in Heterogeneous Distributed Database Systems," (1990), pp. 17–46, IEEE, New York, N.Y.

J. Puustjarvi, "Distributed Management of Transactions in Heterogeneous Distributed Database Systems", *Bit,* vol. 31, No. 2, (1991), pp. 407–420.

Breitbart et al., "On Rigorous Transaction Scheduling," IEEE Transactions on Software Engineering, vol. 17, No. 9, (Sep. 1991), pp. 954–960, IEEE, New York, NY.

Silberschatz et al., "Database Systems: Achievements and Opportunities," Communications of the ACM, vol. 34, No. 10, Oct. 1991, pp. 110–120, Association for Computing Machinery, New York, N.Y.

Breitbart et al., "Complexity of Global Transaction Management in Multi–database Systems," Technical Report No. 198–91, Nov. 1, 1991, University of Kentucky, Lexington, Kentucky.

Raghavan et al., "Database Availability for Transaction Processing," Digital Technical Journal, vol. 3, No 1, Winter 1991, pp. 65–69, Digital Equipment Corp., Maynard, Mass.

Vassos Hadzilacos, "A Knowledge Theoretic Analysis of Atomic Commitment Protocols," Proc. of the Sixth ACM Symposium on Principles of Database Systems, Association for Computing Machinery, New York, NY, Mar. 23–25, 1987, pp. 129–134.

Joseph Y. Halpern, "Using Reasoning about Knowledge to Analyze Distributed Systems," Research Report RJ 5522 (56421) Mar. 3, 1987, Computer Science, IBM Almaden Research Center, San Jose, California, 1987.

Lampson et al., "Crash Recovery in a Distributed Data Storage System," Technical Report, Xerox, Palo Alto Research Center, Palo Alto, California, 1986.

Litwin et al., "Flexible Concurrency Control Using Value Dates," in Integration of Information Systems: Bridging Heterogeneous Databases, ed. A Gupta, IEEE Press, IEEE, New York, NY, 1989, pp. 144–145.

Weihl, "Distributed Version Management for Read–Only Actions," IEEE Transactions on Software Engineering, vol. SE–13, No. 1, IEEE, New York, NY, Jan. 1987, pp. 55–64.

Agrawal et al., "Performance Characteristics of Protocols With Ordered Shared Locks," *Proceedings of the Seventh IEEE International Conference on Data Engineering,* Institute of Electrical and Electronics Engineers, Pisctaway, New Jersey,Apr. 1991, pp. 592–601.

Agrawal et al, "Locks with Constrained Sharing," *Proceedings of the Ninth ACM Symposium on Principles of Database Systems,* Association for Computing Machinery, New York, N.Y., Apr. 1990, pp. 85–93.

CASE 1: T₂ CAN READ THE WRITE DATA OF
T₁ ONLY AFTER T₁ IS COMMITED

CASE 2: T₂ CAN READ THE WRITE DATA OF
T₁ BEFORE T₁ IS COMMITED

| | TRANSACTION ID | POINTER TO NEXT | V | R | I | G | P | C | L |
|---|---|---|---|---|---|---|---|---|---|
| 0 | ...0001 | ...0010 | 1 | 1 | 1 | 1 | 0 | 0 | 0 |
| 1 | ...0010 | ...0011 | 1 | 0 | 1 | 0 | 0 | 0 | 1 |
| 2 | ...0011 | ...0100 | 1 | 1 | 1 | 1 | 1 | 0 | 1 |
| 3 | ...0100 | ...0101 | 1 | 0 | 1 | 0 | 0 | 1 | 0 |
| 4 | ...0101 | ...0110 | 1 | 0 | 1 | 0 | 0 | 1 | 0 |
| ⋮ | | | | | | | | | |
| X | ...0000 | 0 | 0 | 0 | 0 | 0 | 0 | 0 | 0 |

HEAD POINTER —108

TAIL POINTER —109

POINTER TO TRANSACTION BEING PERFORMED —110

*FIG. 7*

| | 1 | 2 | 3 | 4 | 5 | ⋯ | X |
|---|---|---|---|---|---|---|---|
| 0 | 0 | 1 | 0 | 0 | 0 | | 0 |
| 1 | 0 | 0 | 1 | 0 | 0 | | 0 |
| 2 | 0 | 0 | 0 | 0 | 1 | | 0 |
| 3 | 0 | 0 | 0 | 0 | 0 | | 0 |
| 4 | 0 | 0 | 0 | 0 | 0 | | 0 |
| ⋮ | | | | | | | |
| X | 0 | 0 | 0 | 0 | 0 | | 0 |

*FIG. 8*

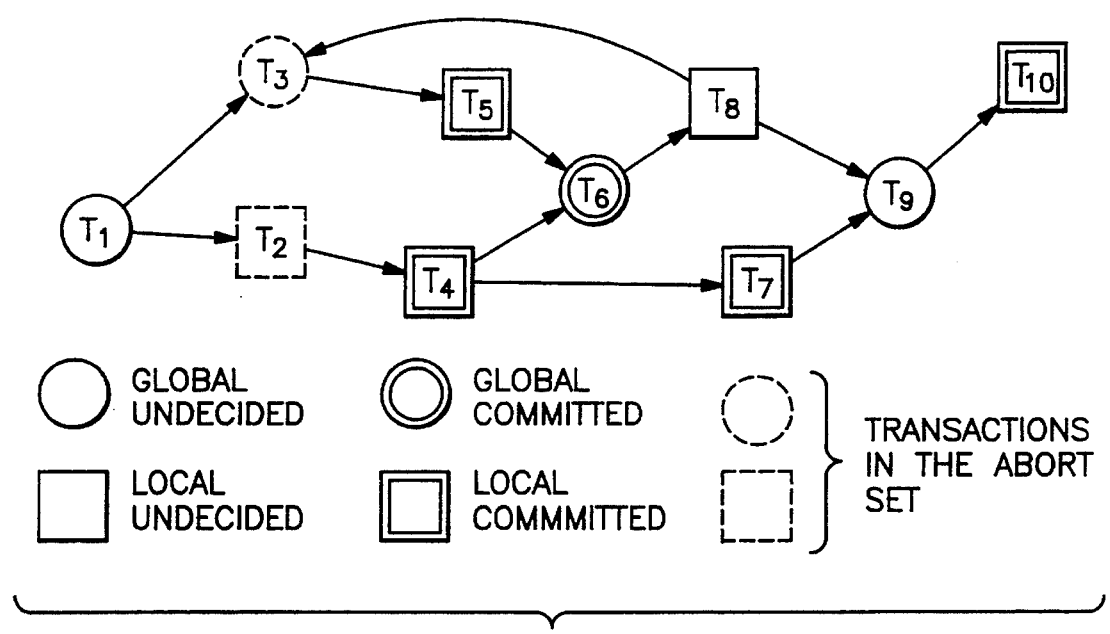
FIG. 9
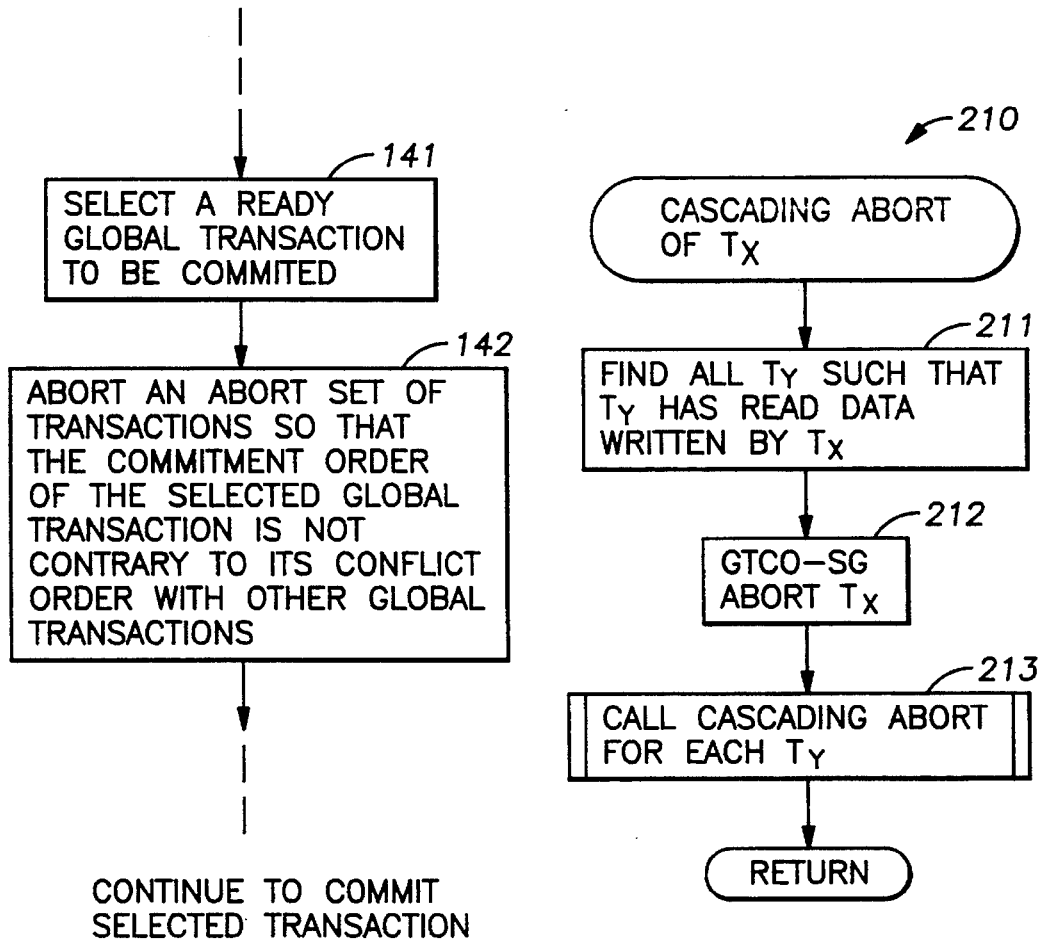
FIG. 10
FIG. 17

GUARANTEEING GLOBAL SERIALIZABILITY BY APPLYING COMMITMENT ORDERING SELECTIVELY TO GLOBAL TRANSACTIONS

This application is a continuation of application Ser. No. 07/778,254 filed Oct. 17, 1991 now abandoned.

BACKGROUND OF THE INVENTION

1. Field of the Invention

The present invention relates generally to distributed computing, and more particularly to a transaction processing system in which component operations in related transactions are distributed so that at least one operation in a second transaction is performed before a first transaction having a conflicting operation is committed. The present invention specifically concerns a method and apparatus for scheduling the commitment of conflicting global transactions in a distributed transaction processing system without restricting the commit order of local transactions.

2. Description of the Background Art

A desirable feature of a computing system is the ability to recover from partial system failures that interrupt memory write operations. If an application program has a memory write operation in progress at the time of the system failure, it is most likely that the memory record will become erroneous. To enable the recovery of memory records after a partial system failure, it is necessary for the application program to keep backup copies of the records in nonvolatile memory. When the computing system is restarted, the memory records to be recovered are replaced with the backup copies.

To facilitate the making of backup copies and the recovery of memory records, the operating system typically provides an established set of memory management procedures that can be invoked or called from an application program to define a "recovery unit." The recovery unit consists of program statements between a "START" statement and a "COMMIT" statement. All of the statements in the "recovery unit" must be completed before the memory records modified by the statements in the recovery unit are made available for subsequent processing. The "START" statement corresponds to initiating the making of a backup copy in nonvolatile memory, and the "COMMIT" statement corresponds to switching of the backup copy with a modified version. The statements in the "recovery unit" specify operations in a single "transaction." Upon recovering from a partial system error, inspection of the nonvolatile memory will reveal that the operations in the single "transaction" are either all completed, or none of them are completed.

In a distributed computing system, the operations in a single transaction may modify files in different data bases, and the files may be shared by other processes. During the operation of the transaction, the files may be inconsistent for a time, although the files will be consistent upon completion of the transaction. A typical example is a transfer of funds from one account to another, in which a first account is debited, and at a slightly later time, another account is credited. During the interim, the two accounts are inconsistent because the sum of the two accounts does not represent the total funds in the two accounts. Due to inconsistency when files are being modified by a transaction, it is known to prevent other processes from accessing the files until the modification is finished. Atomicity can be assured in this example by performing commitment for both files at the same time and place. By changing a single flag, for example, the backup copies of each file can be replaced at the same time with the modified versions of the files. In many instances, however, it is desirable to distribute the operations in a transaction among multiple processors or processes in a computing system, and to commit the transaction by committing the operations in each process or processor while permitting some variability between the times of commitment. In these instances, an "atomic commitment protocol" is typically used to ensure atomicity. The protocol requires the exchange of information about the state of the transaction between the processors or processes. To identify the transaction being performed, the transaction is typically assigned a unique "transaction identification number."

A widely used atomic commitment protocol is known as the "two-phase commit protocol." In a somewhat elementary example of this protocol, one processor or process in the computing system is assigned the role of a coordinator which initiates the commit process of a transaction. For this purpose, the coordinator sends a prepare command to all of the processors or processes participating in the transaction.

Upon receipt of the "prepare" command, each processor or process participating in the transaction checks whether the operation can be completed successfully, writes an indication of the decision to acknowledge successful completion together with the transaction identification number into permanent memory to remember that it is prepared for the transaction, and then sends an acknowledgement back to the coordinator processor, but does not yet commit its results for the transaction. The coordinator waits for acknowledgements from all of the participants. When the coordinator receives acknowledgements from all of the participants, the coordinator records in permanent memory a list of the participants and a notation that the transaction is now being completed, and then the coordinator sends "commit" commands to all of the participants. The coordinator, however, may receive a message from a participant indicating that it cannot prepare for the transaction, or the coordinator may fail to receive acknowledgements from all of the participants after a predetermined time period, possibly after the coordinator has retransmitted the "prepare" command. In this case the coordinator transmits an "abort" command to all of the participants.

Upon receipt of the "commit" command, each participant checks its permanent memory for the transaction identification number to determine whether the participant has prepared for the transaction, and, if it has, it then performs a "COMMIT" operation to write its results into permanent memory and clear the transaction ID from permanent memory in one "atomic" step. Then the participant sends an acknowledgement back to the coordinator. When the coordinator receives acknowledgments from all of the participants, it erases the list of participants from permanent memory, and the transaction is finished.

Additional complexity is introduced when it is desired to process global transactions concurrently across multiple processors or processes in a distributed computing system. It is well known that global serializability is not guaranteed merely by ensuring that each processor or process achieves local serializability, because local transactions may introduce indirect conflicts between distributed global transactions. It is impractical to permit a processor or process to view a global picture of all the conflicts in all of the other processors or processes. Without a global picture, however, it is difficult for a processor or process to ensure that there is a correlation between its serialability order and the serialability orders of the other processors or processes.

Time-stamping of transaction requests and data updates is one method that has been used to address this problem of concurrency control. In general, concurrency control in a distributed computing system has been achieved at the expense of restricted autonomy of the local processors or processes, or by locking.

The problem of global deadlock also has to be addressed whenever global transactions are performed concurrently. One known solution is to provide a global transaction scheduler that decides whether or not to dispatch concurrent global transaction requests. An example is described Y. Breitbart et al., "Reliable Transaction Management in a Multidatabase System", *Proc. of the ACM SIGMOD conf. on Management of Data*, Atlantic City, N.J., June 1990, pp. 215–224. The global scheduler keeps track of global transaction requests for local locks on data items by using a global lock mechanism. Each global data item has a global lock associated with it. A global transaction that needs only to read a data item requests a global read-lock. Locks are conflicting if they are requested by two different transactions on the same data item and at least one of the requested locks is a write-lock. If two global transactions request conflicting global locks, the scheduler will prevent one of the transactions from proceeding because it knows that the two transactions will cause a conflict at the local site. The scheduler uses strict two-phase locking for allocating global locks to global transactions, and maintains a global "wait for graph." The "global wait for graph" is a directed graph $G=(V,E)$ whose set of vertices V is a set of global transactions and an edge $T_i \to T_j$ belongs to E if and only if global transaction $T_i$ waits for a global lock allocated to global transaction $T_j$. If a global transaction waits for a global lock, then the transaction state becomes "blocked" and the transaction is included in the "global wait for graph." The transaction becomes active again only after it can obtain global locks that it was waiting for. To avoid global deadlocks, the "global wait for graph" is always made acyclic. To ensure data consistency in the presence of failures, the scheduler also uses a "commit graph" and a "wait-for-commit graph" to determine when to schedule a commit operation. The commit graph $CG=<TS,E>$ is an undirected bipartite graph whose set of nodes TS consists of a set of global transactions (transaction nodes) and a set of local sites (site nodes). Edges from E may connect only transaction nodes with site nodes. An edge $(T_i,S_j)$ is in E if and only if transaction $T_i$ was executing at site $S_j$, and the commit operation for $T_i$ has been scheduled for processing. After the commit operation for $T_i$ is completed, $T_i$ is removed from the commit graph along with all edges incidental to $T_i$. Global database consistency is assured if the commit graph does not contain any loops. The wait-for-commit graph is a directed graph $G=(V,E)$ whose set of vertices V consists of a set of global transactions. An edge $T_i \to T_j$ is in E if and only if $T_i$ has finished its execution, but its commit operation is still pending and $T_j$ is a transaction whose commit operation should be completed or aborted before the commit of $T_i$ can be scheduled. The scheduler uses the following algorithm for constructing the wait-for-commit graph, and in scheduling a commit operation of transaction $T_i$:

1. For each site $S_k$ in which $T_i$ is executing, temporarily add the edge $T_i \to S_k$ to the commit graph.
2. If the augmented commit graph does not contain a cycle, then the global commit operation is submitted for processing, and the temporary edges become permanent.
3. If the augmented commit graph contains a cycle then:
   a) The edges $T_i \to T_{i1}, \ldots, T_i \to T_{im}$ are inserted into the wait-for-commit graph. The set $\{T_{i1}, T_{i2}, \ldots, T_{im}\}$ consists of all the transactions which appear in the cycle which was created as a result of adding the new edges to the commit graph.
   b) Remove the temporary edges from the commit graph.

The transaction $T_i$, however, need not necessarily wait for the completion of every transaction $T_{ik}$ such that $T_i \to T_{ik}$. It may be ready to be scheduled for a commit operation after some of transactions $T_{ik}$ such that $T_i \to T_{il}$ (0<l<r) successfully commit (and in some cases, a successful commit of only one such transaction would be sufficient to schedule the transaction's commit!).

Global serializability can be guaranteed in a distributed transaction processing system by enforcing a "commitment ordering" for all transactions. In Yoav Raz, U.S. patent application Ser. No. 07/703,394, filed May 21, 1991, and entitled "Commitment Ordering For Guaranteeing Serializability Across Distributed Transactions," it was shown that if global atomicity of transactions is achieved via an atomic commitment protocol, then a "commitment ordering" property of transaction histories is a sufficient condition for global serializability. The "commitment ordering" property occurs when the order of commitment is the same as the order of performance of conflicting component operations of transactions. Moreover, it was shown that if all of the local processes were "autonomous," i.e., they do not share any concurrency control information beyond atomic commitment messages, then "commitment ordering" is also a necessary condition for global serializability.

In some applications, it is desirable for local serializability to be guaranteed by pre-existing mechanisms in the processors or processes in a distributed transaction processing system. In this case, it is desirable to provide a mechanism which does not violate the autonomy of the local processors or processes and guarantees global serializability if the local processors or processes assure local serialability. The solution to this problem is described in Georgakopoulos et al., "On Serializability of Multidatabase Transactions through Forced Local Conflicts," Proceedings of the Seventh Int. Conf. on Data Engineering, Kobe, Japan, April 1991.

Georgakopoulos et al. first classify known methods of concurrency control in distributed transaction processing systems into several groups, including observing the execution of the global transactions at each local processor or process, controlling the submission and execution order of the global transactions, limiting the membership in the system to processors or processes which use strict schedulers, assuming the possibility of conflicts among global transactions whenever they execute at the same processor or process, modifying the local processors or processes, and rejecting serializability as the correctness criterion. Georgakopoulos then describe an "optimistic ticket method" (OTM) which is said not to violate local autonomy and guarantees global serializability if the participating local processors or processes assure local serializability. OTM is said to use "tickets" to determine the relative serialization order of the subtransactions of global transactions at each local processor or process (i.e., an LDBS). A ticket is a (logical) timestamp whose value is stored as a regular data item in each LDBS. Each subtransaction of a global transaction is required to issue a "Take-A-Ticket" operation which consists of reading the value of the ticket and incrementing it through regular data manipulation operations. The value of a ticket and all operations on tickets issued at each LDBS are subject to the local concurrency control and other database constraints. Only the subtransactions of global transactions have to take tickets; local transactions are not affected. To maintain global consistency, OTM must ensure that the subtransactions of each global transaction have the same relative serialization order in their corresponding LDBSs. Since the relative serialization order of the subtransactions at each LDBS is reflected in the value of their tickets, the basic idea in OTM is to allow the subtransactions of each global transaction to proceed but commit them only if their ticket values have the same relative order in all participating LDBSs. This requires that the LDBS support a visible "prepared to commit state" for all subtransactions of global transactions. The prepared to commit state is "visible" if the application program can decide whether the transaction should commit or abort.

It is said that OTM processes a multidatabase transaction G as follows. Initially, it sets a timeout for G and submits its subtransactions to their corresponding LDBSs. All subtransactions are allowed to interleave under the control of the LDBSs until they enter their prepared to commit state. If they all enter their prepared to commit states, they wait for the OTM to validate G. The validation can be performed using a Global Serialization Graph (GSG) test. The nodes in GSG correspond to "recently" committed global transactions. In its simplest form, the set of recently committed global transactions in OTM does not contain transactions committed before the oldest of the currently active global transactions started its execution. For any pair of recently committed global transactions $G_i^c$ and $G_j^c$, GSG contains a directed edge $G_i^c \rightarrow G_j^c$ if at least one subtransaction of $G_i^c$ was serialized before (obtained a smaller ticket than) the subtransaction of $G_j^c$ in the same LDBS. Similarly, if the subtransaction of $G_j^c$ in some LDBS was serialized before the subtransaction of $G_i^c$ a directed edge $G_i^c \leftarrow G_j^c$ connects their nodes in GSG.

Initially, GSG contains no cycles. During the validation of G, OTM first creates a node for G in GSG. Then, it attempts to insert edges between G's node and nodes corresponding to every recently committed multidatabase transaction $G^c$. More specifically, if the ticket obtained by a subtransaction of G at some LDBS is smaller (larger) than the ticket of the subtransaction of $G^c$ there, an edge $G \rightarrow G^c$ ($G \leftarrow G^c$) is added to GSG. If all such edges can be added without creating a cycle in GSG, G is validated. Otherwise, G does not pass validation, its node, together with all incident edges, is removed from the graph and G is restarted.

G is also restarted if at least one LDBS forces a subtransaction of G to abort for local concurrency control reasons (e.g., local deadlock), or its timeout expires (e.g., global deadlock). Alternatively, OTM may set new timeout and restart only the subtransactions that did not report prepared to commit in time. If more than one of the participating LDBSs uses a blocking mechanism for concurrency control, the timeouts above are necessary to resolve global deadlocks. An alternative approach is to maintain a wait-for graph (WFG) having LDBS as nodes. Then, if a cycle is found in the WFG and the cycle involves LDBS that use a blocking technique to synchronize conflicting transactions, a deadlock is possible. Dealing with deadlocks in MDBSs is said to constitute a problem for further research.

Georgakopoulos et al. disclose a refinement for "rigorous" LDBs called "implicit tickets." A "rigorous" scheduler guarantees "strictness" and also does not allow transactions to write a data item until the transactions that previously read it either commit or abort. Under a "strict" scheduler, no transaction can read or write a data item until all transactions that previously wrote it commit or abort. It is said that rigorous schedulers guarantee that for any pair of transactions $T_i$ and $T_j$, such that $T_i$ is committed before $T_j$, $T_i$ also precedes $T_j$ in the serialization order corresponding to the execution schedule. The "implicit ticket method" (ITM) is said to take advantage of the fact that if all LDBs produce rigorous schedules, then ticket conflicts can be eliminated. To guarantee global serializability in the presence of local transactions, ITM requires the following conditions to be satisfied: 1) all local database systems use rigorous transaction management mechanisms; 2) each multidatabase operation has at most one subtransaction at each LDBs; and 3) each subtransaction has a visible prepare to commit state.

Accordingly, workers skilled in the art have been working for a considerable period of time to solve the problem of guaranteeing global serializability without significantly limiting the autonomy of existing local processors or processes, and without limiting concurrency or imposing unnecessary overhead.

SUMMARY OF THE INVENTION

The present invention guarantees serializability in a computing system across distributed transactions over multiple resource managers by selectively committing global transactions and aborting or delaying commitment of transactions to enforce an order of commitment of global transactions that is the same as an order of conflicts among the global transactions, including indirect conflicts through local transactions. The conflicts, for example, are indicated by a serializability graph, maintained in each resource manager, wherein nodes represent transactions, directed edges represent direct conflicts, and paths including more than one edge represent indirect conflicts. This method can be used with any other mechanism that ensures local serializability, without affecting that mechanism's resource access scheduling strategy. Therefore, the method of the present invention can be used with existing mechanisms for ensuring local serializability or with a mechanism that is selected or optimized for each processor or process according to the nature of the transactions.

In a typical transaction processing system, a second transaction can read data written by a first transaction only after the second transaction has been committed. This restriction is a sufficient condition to ensure recoverability of the system. To practice the present invention in this case, when a second global transaction performs a read operation before a conflicting write operation of a first global transaction is committed at a time when the second global transaction has not yet committed, the second global transaction is aborted to ensure that the order in which the global transactions are committed is not different from the conflict order of the global transactions.

The present invention, however, permits the construction of a transaction processing system in which a second global transaction may read data written by a write operation of a first global transaction before the first global transaction is committed. In this case, depending on the respective order in which the two conflicting operations occur, either of the two global transactions may be aborted to ensure that the order of commitment is the same as the conflict order of the global transactions. Moreover, to insure recoverability, both of the global transactions should be aborted in the case of the read operation following the write operation and the read operation being performed before aborting of the write operation. In general, in a transaction processing system in which a second transaction may read data written by a write operation of a first transaction, recoverability is enforced by a process of cascading aborts; the aborting of a transaction requires the additional aborting of all other transactions that have read data written by aborted transactions.

The global transaction commitment order is enforced by committing a selected global transaction for which a result has been prepared, and aborting an abort set of other transactions for which a result is being prepared or is prepared. The global transaction to commit is selected, for example, by a commitment request from an atomic commitment coordinator. The abort set is selected so that the committing of the selected global transaction is not contrary to the order of conflict with global transactions that are not included in the abort set. In a multiprocessor system in which an atomic commitment coordinator communicates with a plurality of transaction processors by way of "prepare" and "commit" commands, acknowledgement that a transaction has been "prepared" is preferably delayed until an "abort set" for the transaction has been minimized.

In a preferred embodiment, a transaction is assumed to be global, unless indicated otherwise, because an incorrect assumption that a transaction is global will not cause a serializability violation.

Preferably, the method of the present invention is performed by maintaining a directed graph for each local processor or process. The nodes are all the undecided global transactions being processed by the processor or process, together with all the non-aborted local transactions (i.e., committed and undecided) that lie on paths or possible further paths in the graph between undecided global transactions. Edges in the graph represent the order of performance of conflicting operations of the transactions. In particular, there is an edge from transaction T1 to transaction T2 if the transactions have respective conflicting operations, and the respective operation of T2 has occurred after the respective operation of T1. Each time a global transaction is committed, all paths and possible future paths to it in the graph from all undecided transactions are disconnected by aborting a selected set of transactions on the paths. The aborted transactions, for example, are all the undecided transactions on the paths from undecided global transactions to the committed transactions, which are closest (one on each path separately) to the committed transaction. Additional searching through the graph from the committed transaction could be done to possibly find a more optimal "abort set." The graph is further maintained by removing global decided (both committed and aborted) transactions, and local aborted transactions. A local committed transaction, however, is removed from the graph only when there is no path to it from any undecided transaction. Local transactions are committed upon an explicit request from the local concurrency control mechanism.

BRIEF DESCRIPTION OF THE DRAWINGS

Other objects and advantages of the invention will become apparent upon reading the following detailed description and upon reference to the drawings in which.

Figure 4A:
Figure 4B:
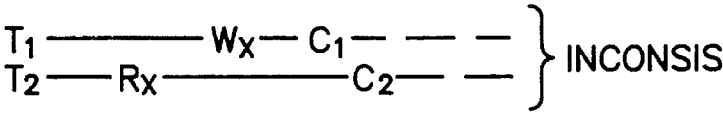
Figure 5A:
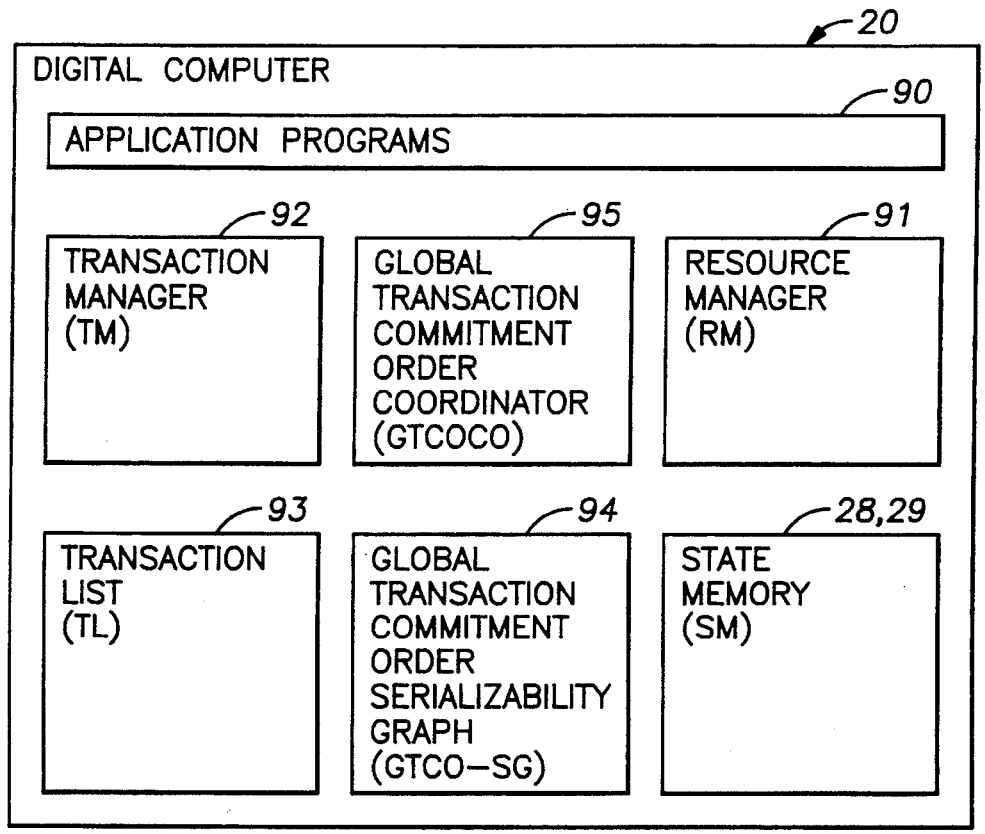
Figure 5B:
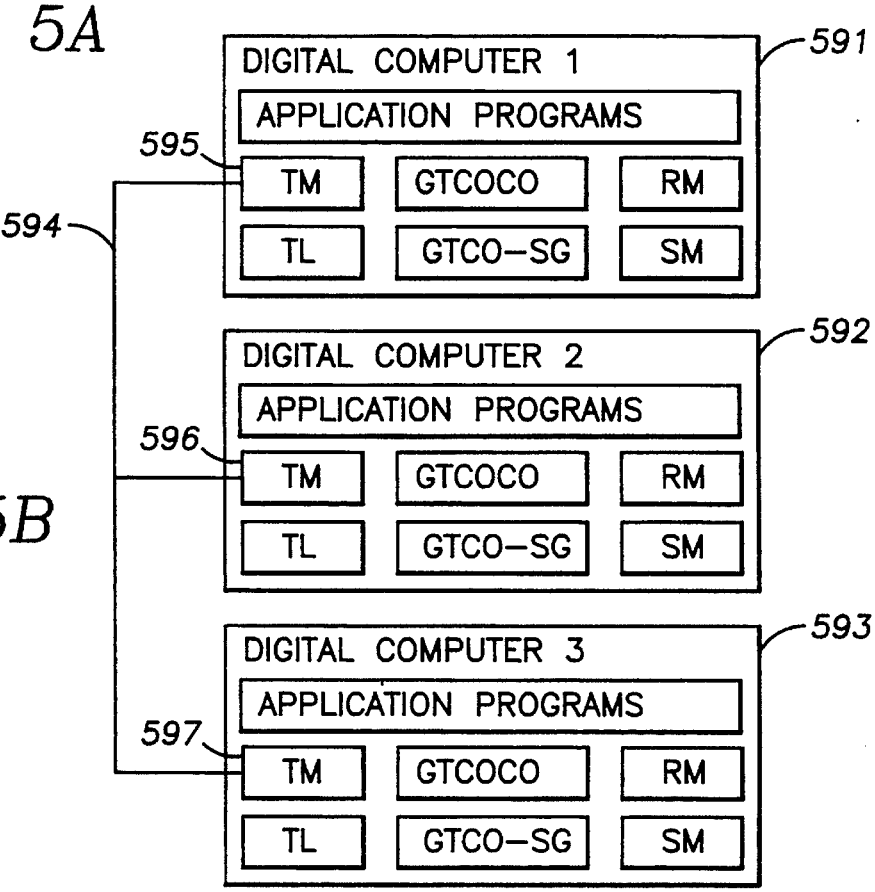
Figure 6:
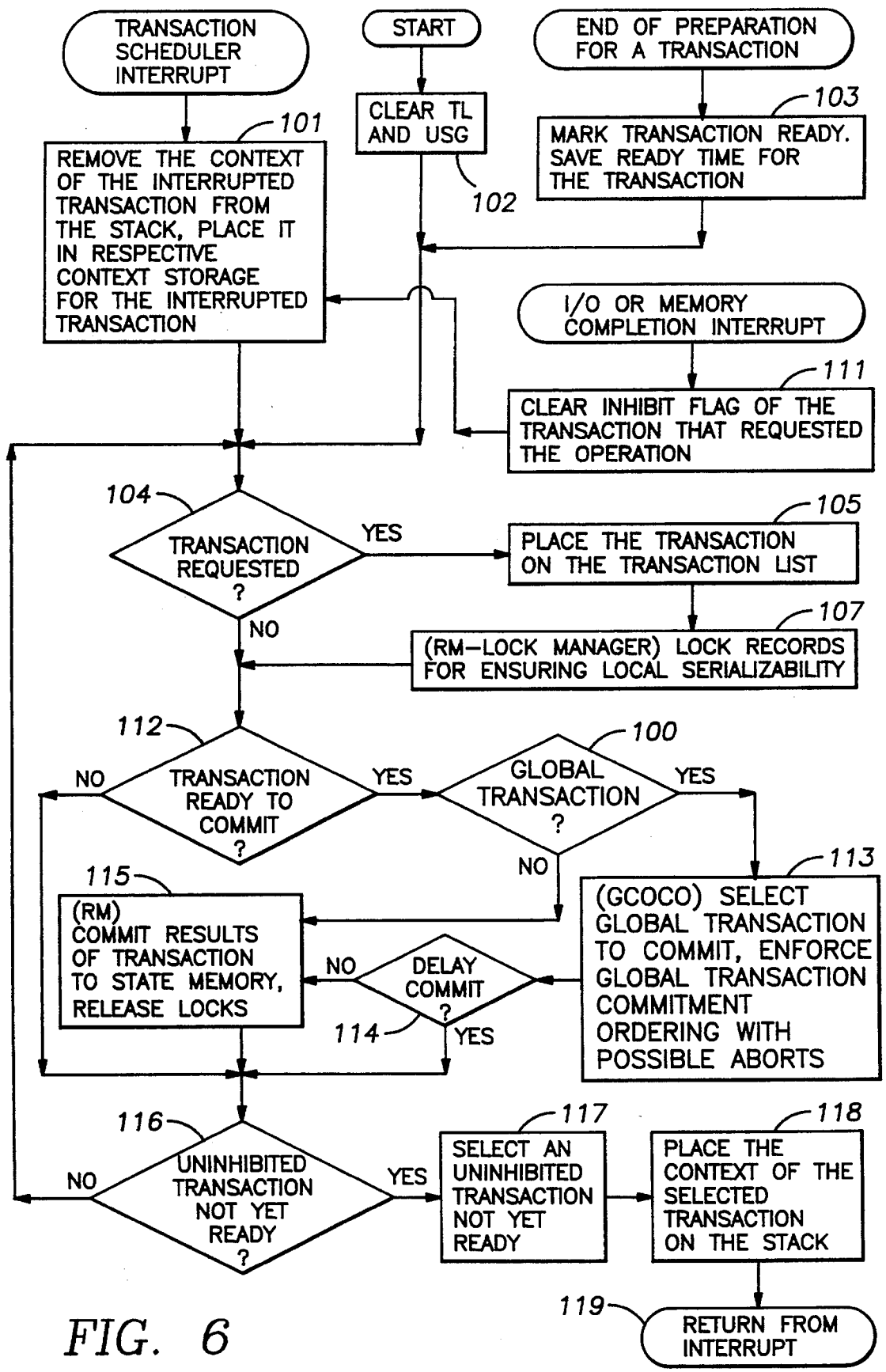
Figure 11:
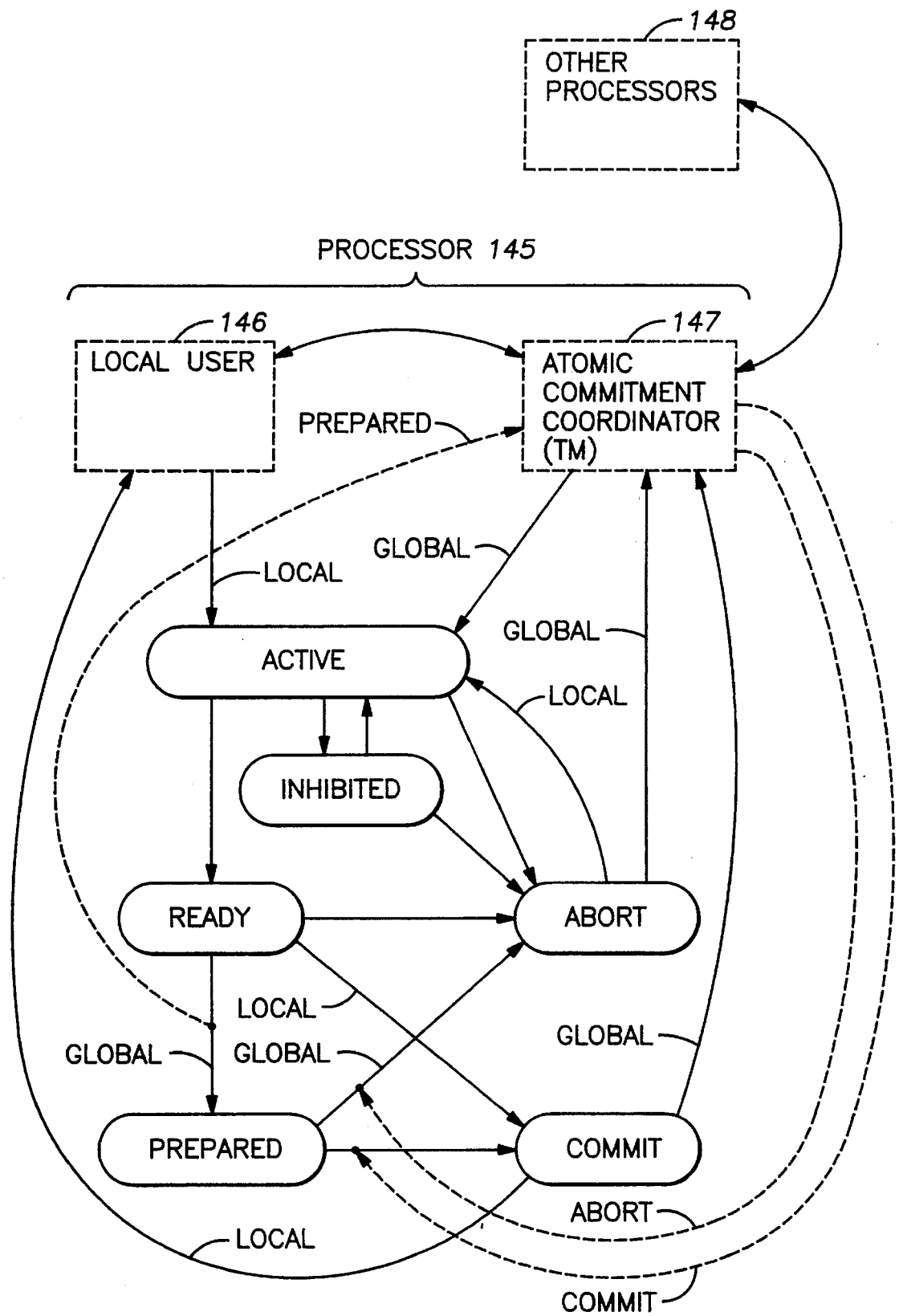
Figure 12A:
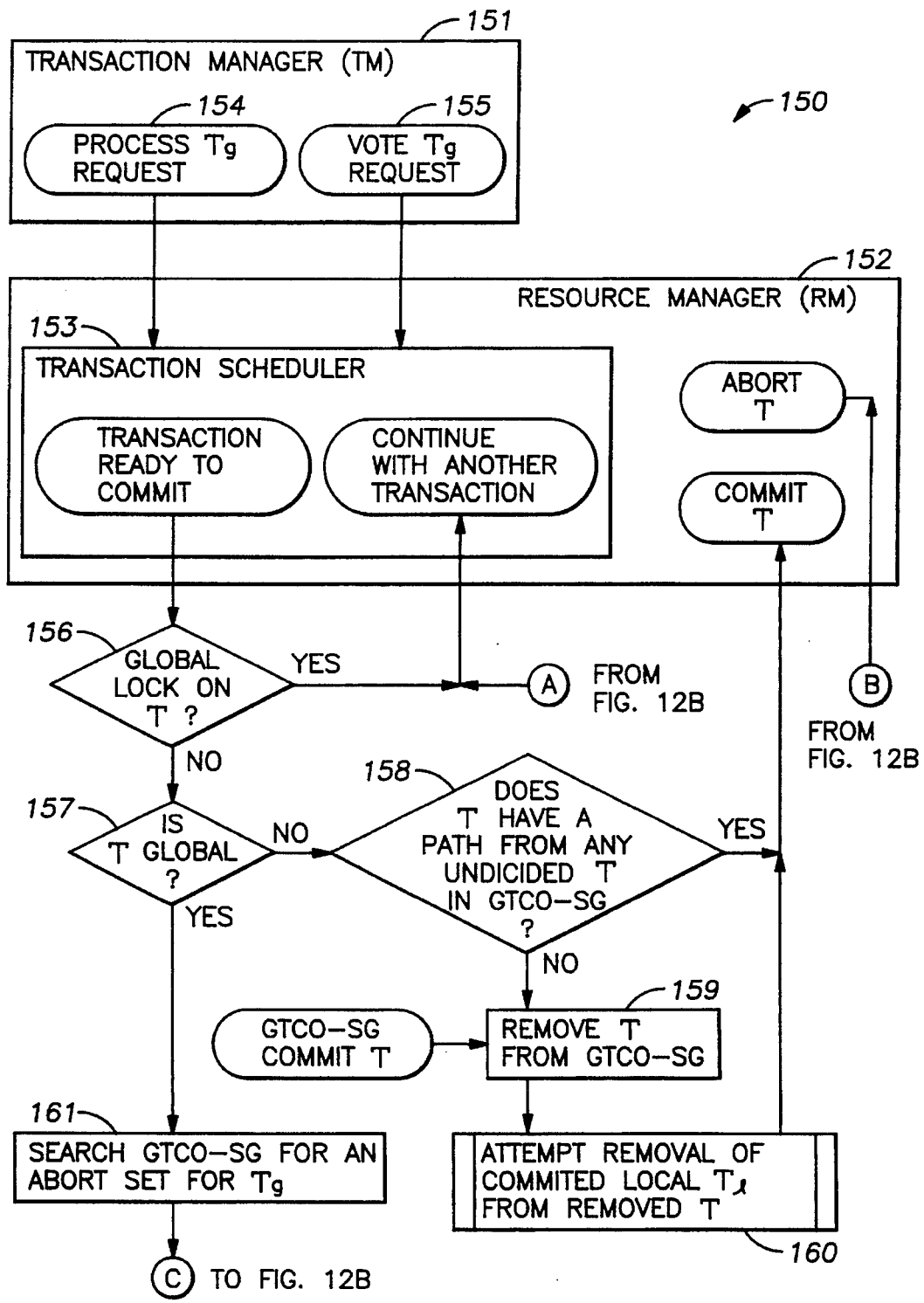
Figure 12B:
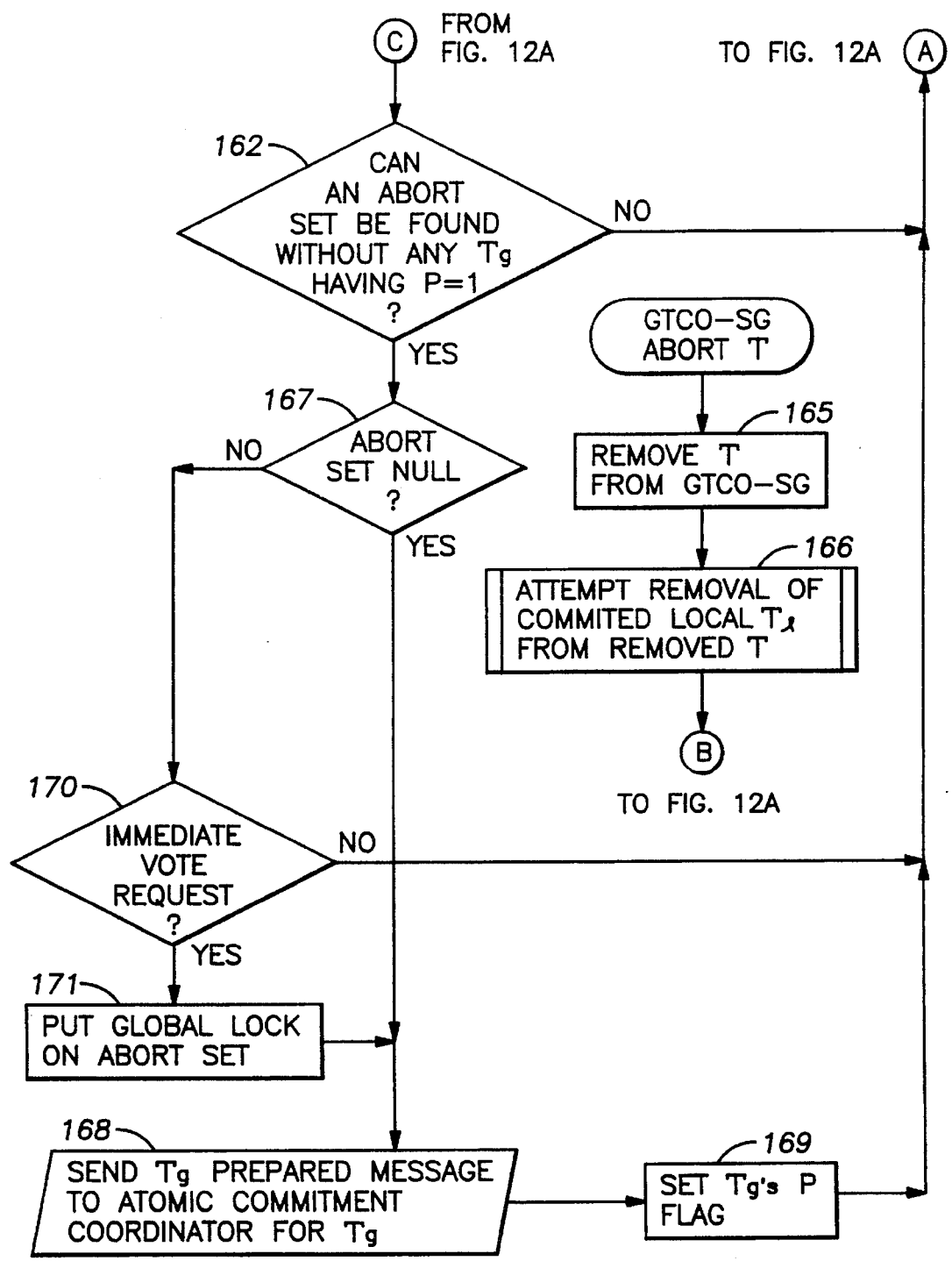
Figure 13:
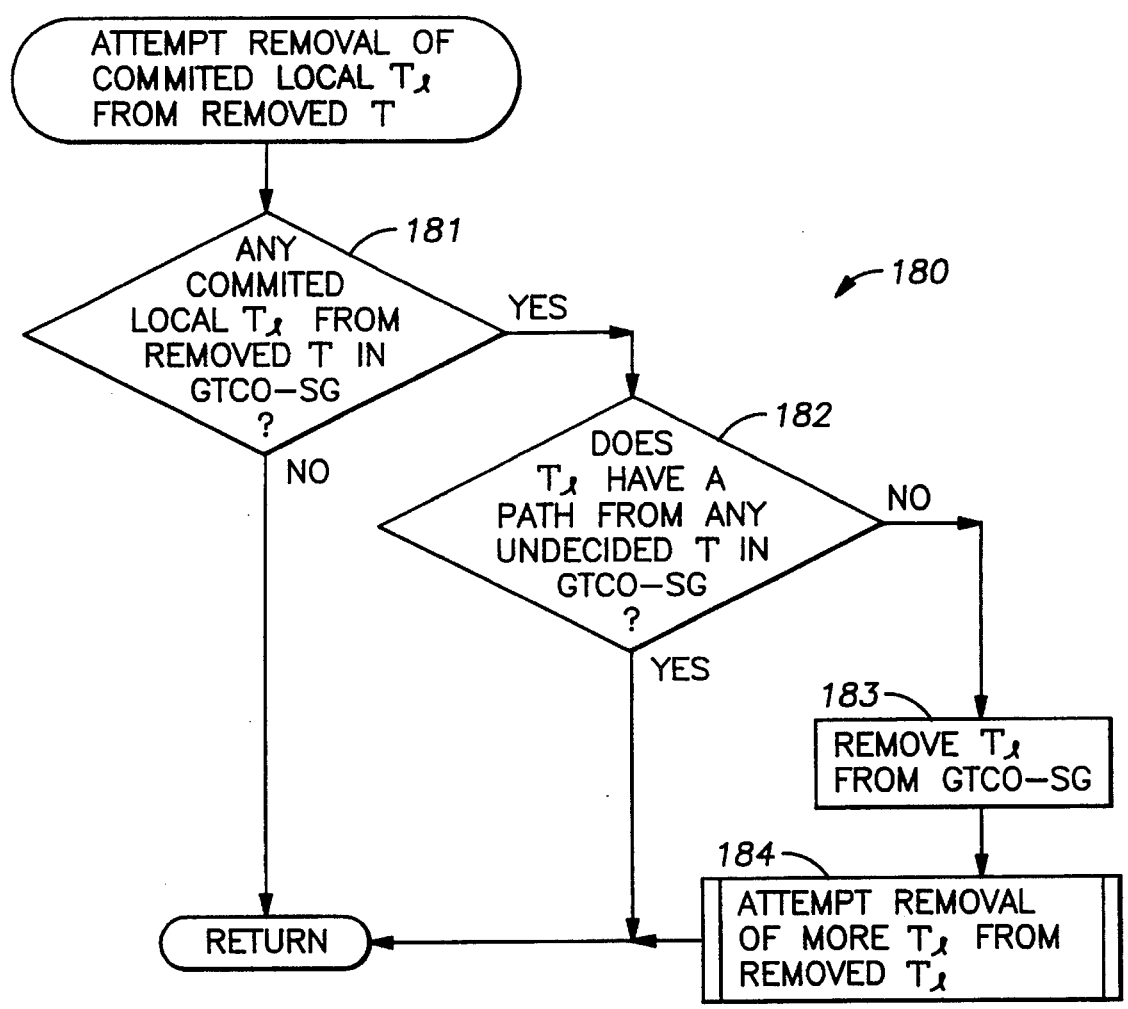
Figure 16:
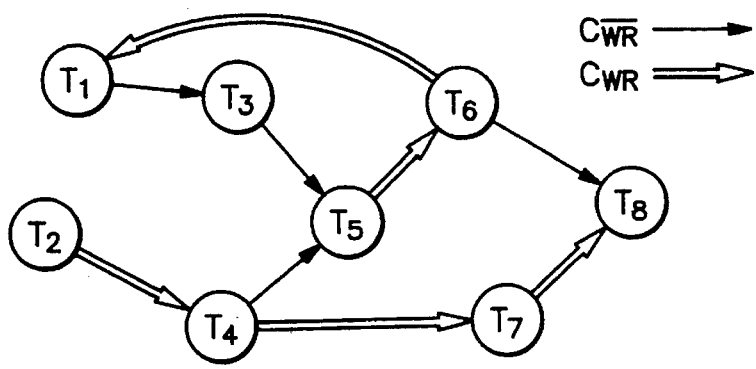
Figure 14:
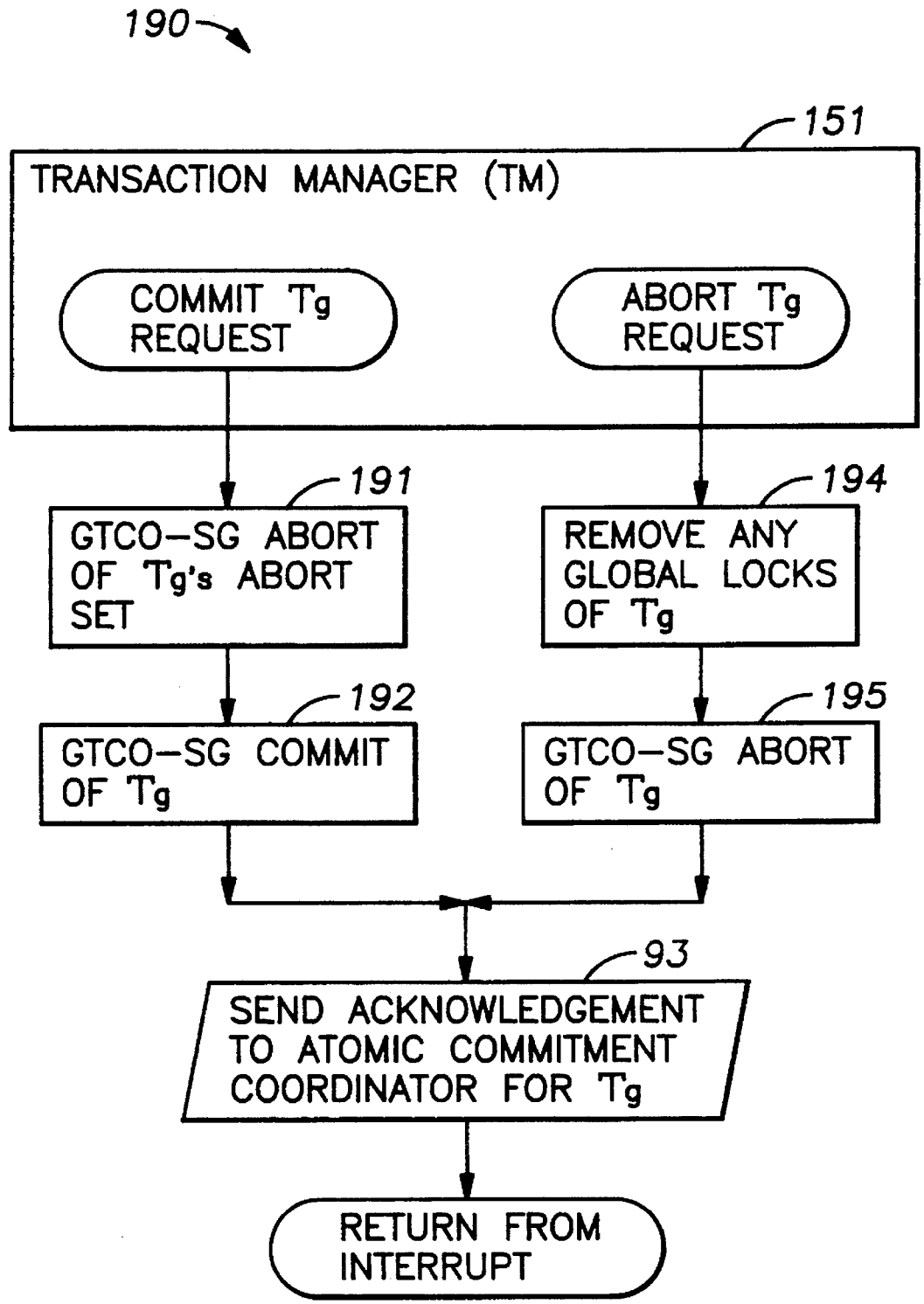
Figure 15:
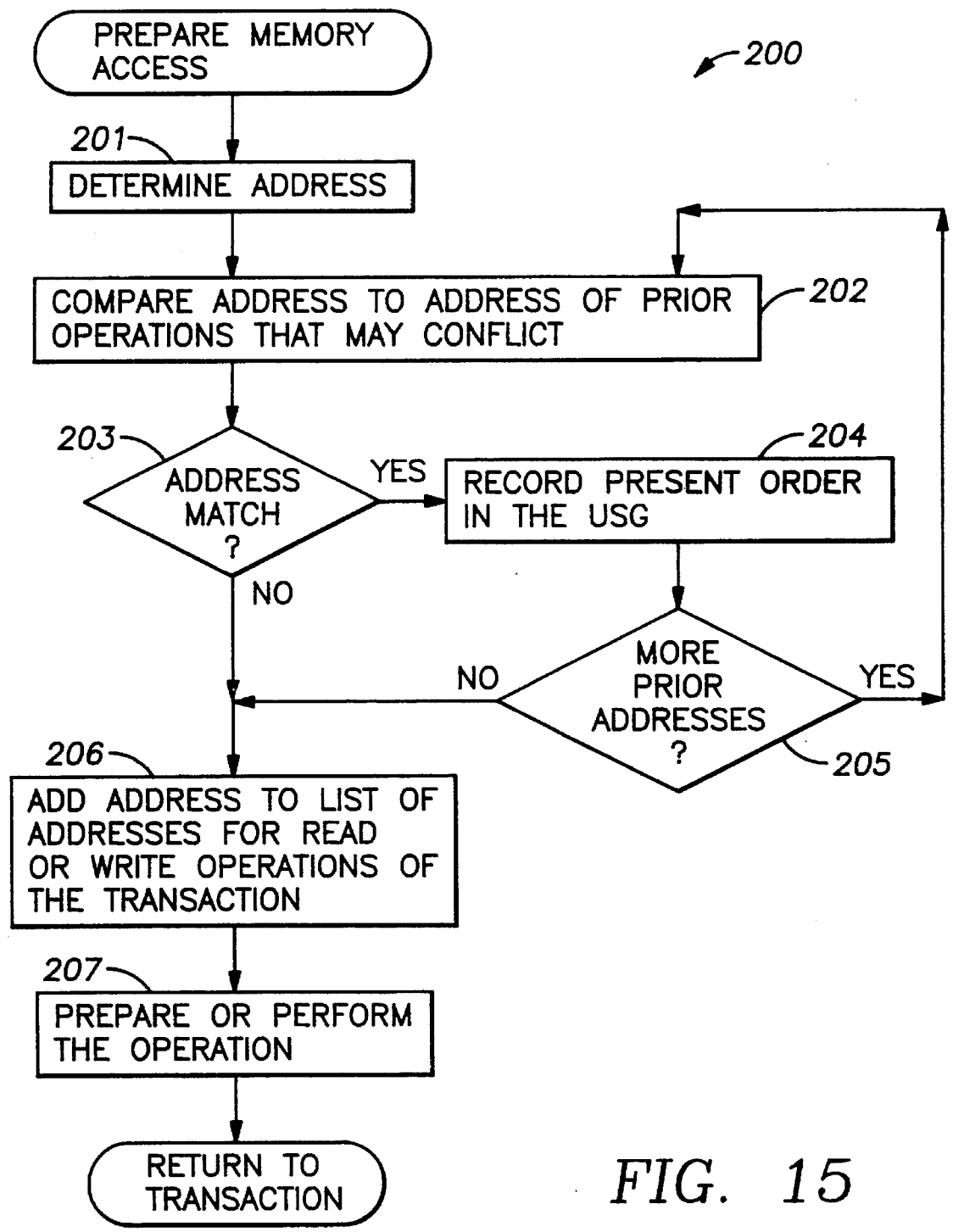
Figure 18:
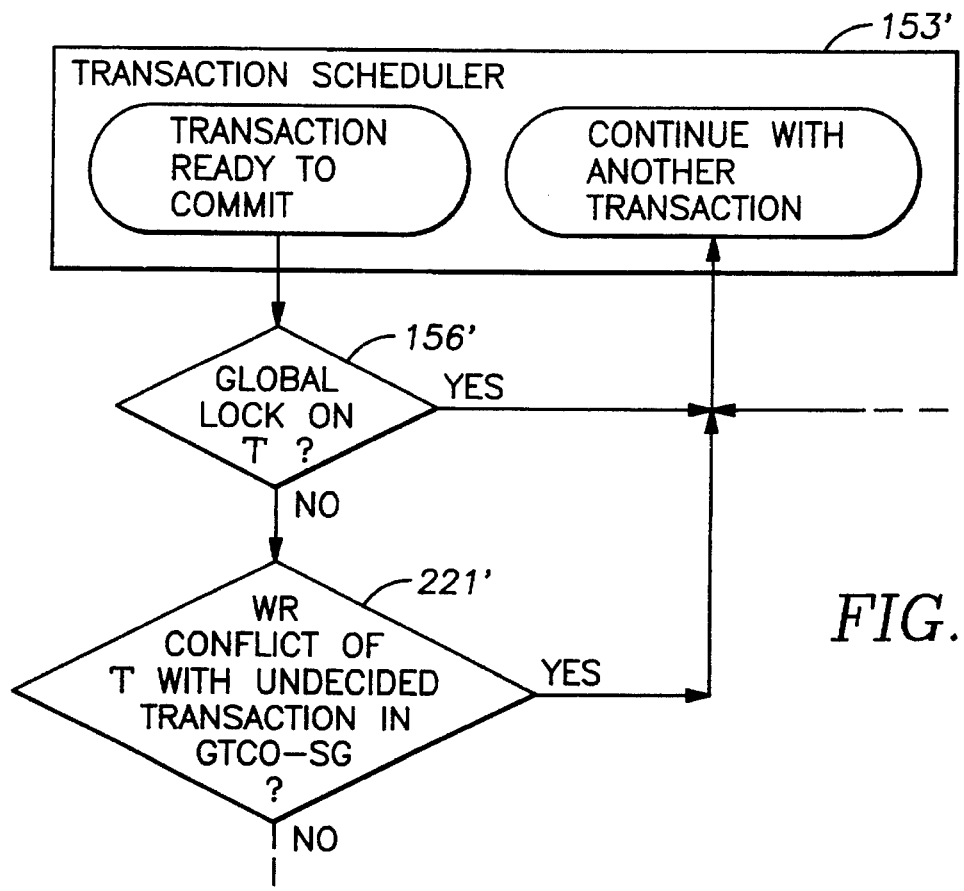
Figure 19:
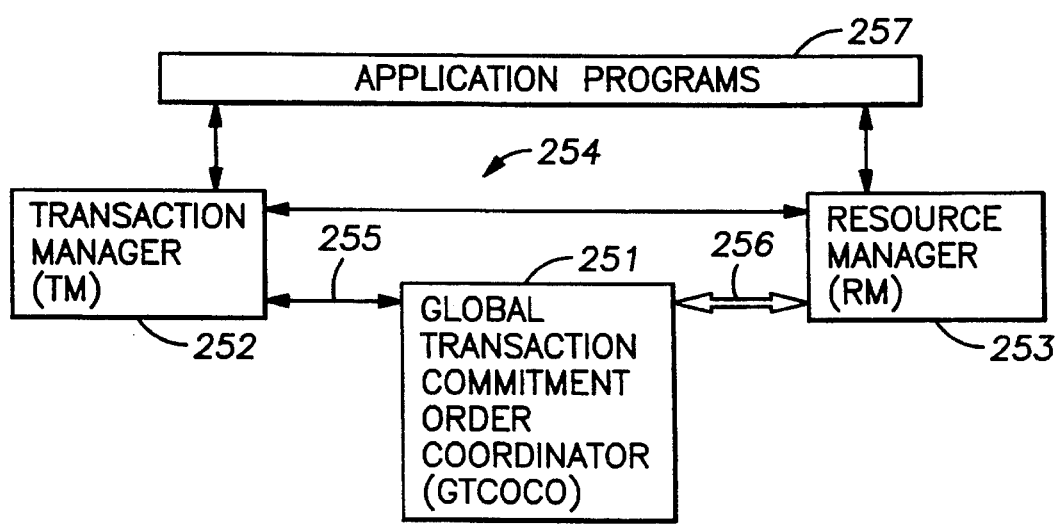
Figure 20:
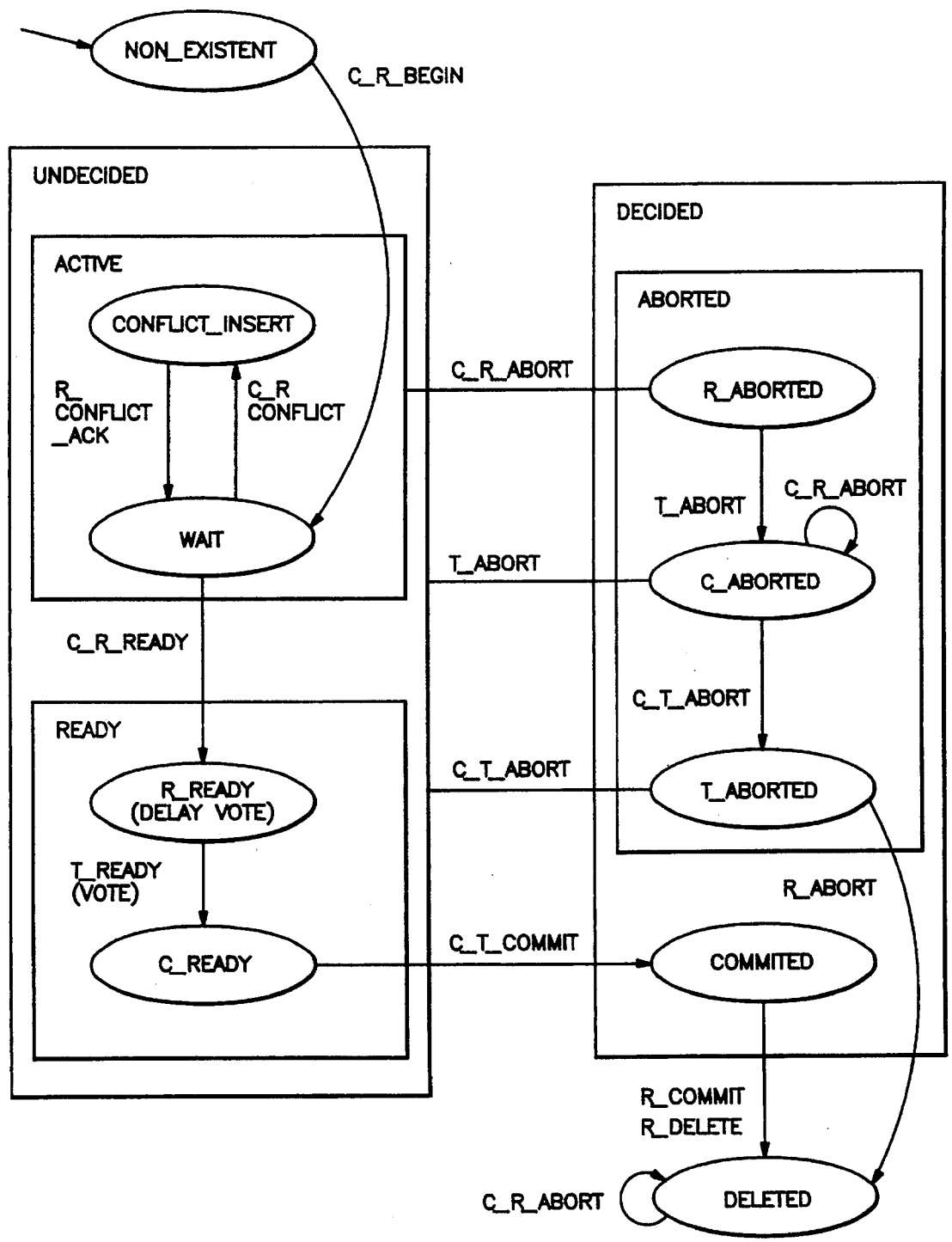
Figure 21:
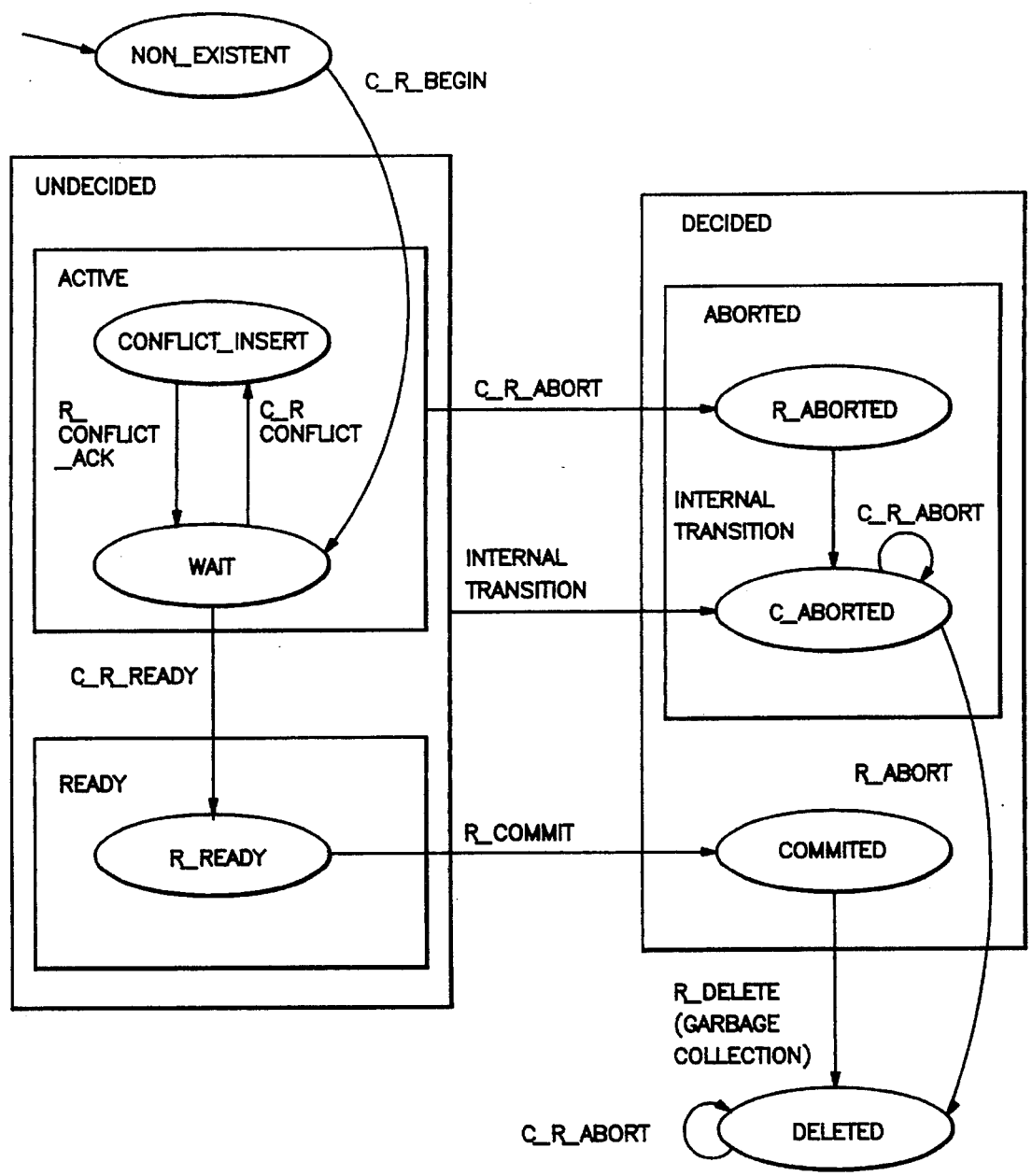

FIGA. 4 illustrates various scheduling possibilities for conflicting memory access operations of distributed global transactions for the case in which a second transaction can read the write data of a first transaction only after the first transaction is committed;

FIG. 4B illustrates various scheduling possibilities for conflicting memory access operations of distributed global transactions for the case in which a second transaction can read the write data of a first transaction before the first transaction is committed;

FIG. 5A shows a digital computer configured in accordance with the present invention to enforce a global transaction commitment ordering in which distributed global transactions are committed in the order in which conflicting component operations are performed;

FIG. 5B illustrates a distributed computing system including a plurality of the digital computers as shown in FIG. 5A;

FIG. 6 illustrates a scheduling procedure employed by a transaction scheduler component of a digital computer in the system of FIG. 5B;

FIG. 7 illustrates an organization of a transaction list and related pointers which are used by the transaction scheduler for scheduling the performance of component operations of distributed transactions;

FIG. 8 is a schematic diagram illustrating a data structure corresponding to a graph of conflict ordering between distributed transactions having conflicting component operations;

FIG. 9 is a pictorial diagram of the graph corresponding to the data stored in the data structures of FIGS. 7 and 8;

FIG. 10 is a flow chart of a procedure that references the data structure of FIG. 7 to enforce global transaction commitment ordering;

FIG. 11 is a state diagram of the digital computer shown in FIG. 5A when used in a multi-processing system of FIG. 5B for processing both local and global transactions;

FIGS. 12A and 12B together comprise a flow chart of a procedure for selecting a transaction to commit and for selectively aborting transactions to enforce global transaction commitment ordering;

FIG. 13 is a flow chart of a "garbage collection" procedure for removing committed local transactions from the graph of conflict ordering shown in FIG. 9;

FIG. 14 is a flow chart of a procedure for committing and aborting transactions in response to signals from a coordinator of a global transaction;

FIG. 15 is a procedure for detecting a conflicting memory access operation during the preparation of a transaction;

FIG. 16 is a modified graph in which write-read conflicts are distinguished from other conflicts;

FIG. 17 is a flow chart of a recursive procedure for insuring recoverability by performing cascading aborts;

FIG. 18 shows a modification to the flow chart of FIG. 12A that should be made for an alternative embodiment of the invention that permits a global transaction to read data written by an undecided transaction;

FIG. 19 is a block diagram showing a global transaction commitment order coordinator employing the present invention inserted in a conventional transaction processing system between a transaction manager and a resource manager;

FIG. 20 is a state diagram of the transaction processing system of FIG. 19 for the processing of global transactions; and FIG. 21 is a state diagram of the transaction processing system of FIG. 19 for the processing of local transactions.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
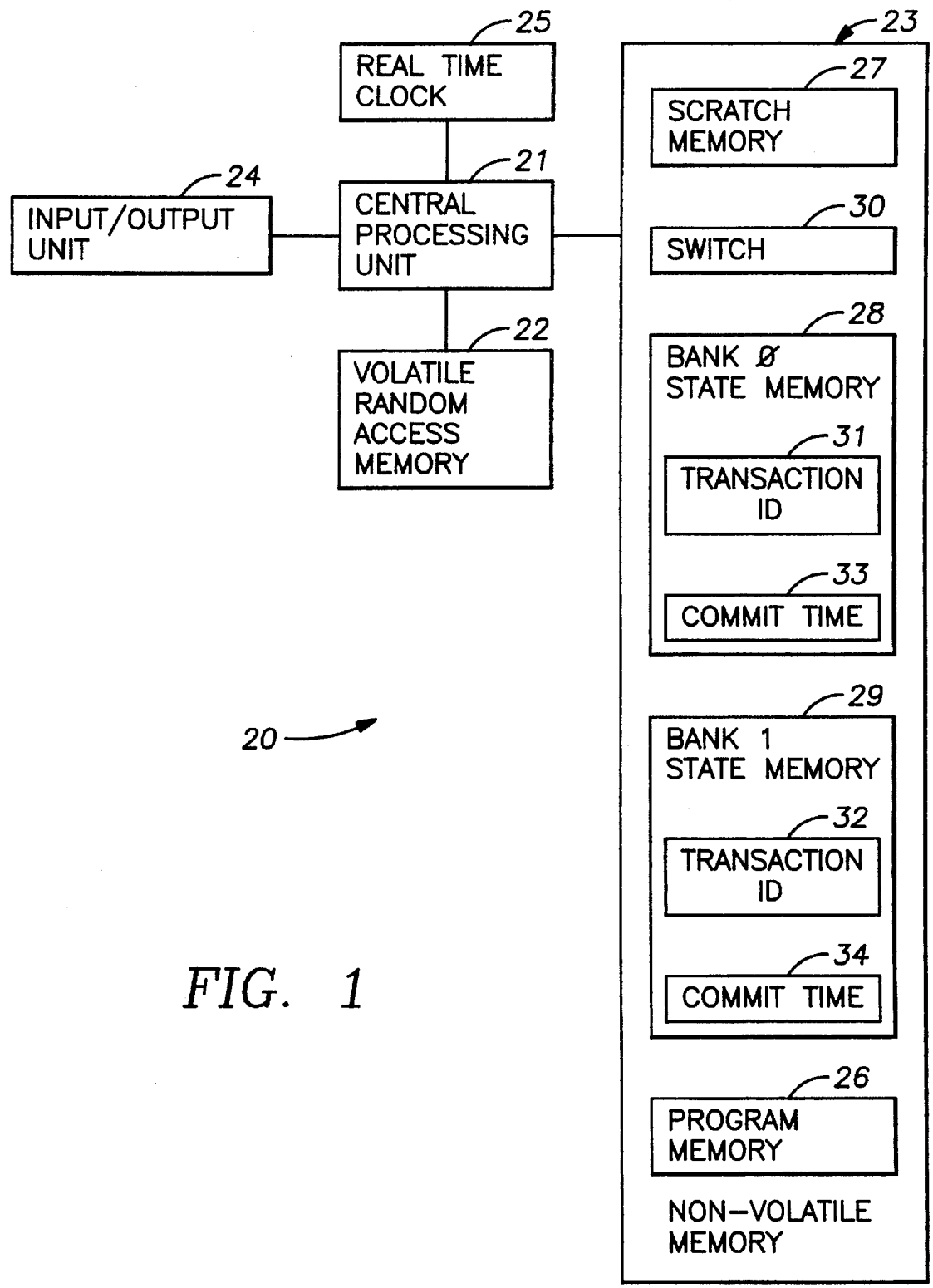
FIG. 1 is a block diagram of a digital computer configured for transaction processing.

Turning now to FIG. 1, there is shown a block diagram generally designated 20 of a digital computer configured for transaction processing. The computer 20 includes a central processing unit 21 for executing programmed instructions; a volatile random access memory 22 for holding instructions or data; a non-volatile memory 23 such as a hard disk drive, an input/output unit 24, and a real time clock 25. The non-volatile memory 23 includes a program memory 26 in which programs are stored, and a scratch memory area 27 for storing data records.

Typically, the digital computer 20 executes programs which have been transferred from the program memory 26 to the volatile random access memory 22. During the execution of a program, it is often necessary to operate upon an amount of data that exceeds the capacity of the volatile random access memory 22. In this case, data records are alternately stored and retrieved from the scratch memory area 27.

A common problem associated with the digital computer 20 is the likelihood that the execution of instructions by the central processing unit will become disrupted due to a hardware failure, software error or power failure. A power failure, for example, will cause the disappearance of data and programs stored in the volatile random access memory 22. The problem of the loss of data in the volatile random access memory 22 due to a power failure can be solved by storing back-up copies of data in the non-volatile memory 23. The back-up copies, however, must be made in such a way that considers the possibility of failure during a write operation to the non-volatile memory 23. In this case the data record affected by the write operation might have been corrupted and therefore must be discarded.

To deal with the problem of possible failure when writing to non-volatile memory, there has been established a method of programming called "transaction processing" which guarantees that a portion of the non-volatile memory (referred to hereinafter as "state memory") will either be unaffected by a transaction or will be properly updated by results of a transaction, in the presence of the failures. Transaction processing is based upon the technique of making a back-up copy of state memory before the results of a transaction are written to state memory, and also writing in non-volatile memory an indication of either a first processing phase in which the back-up copy is being made, or a second processing phase in which the results of a transaction are being written to state memory, in order to indicate which copy might have been corrupted during a failure. For making a back-up copy of state memory, for example, the non-volatile memory 23 includes two banks of state memory 28 and 29. To provide an indication of which bank of state memory might have been corrupted by a failure, the non-volatile memory 23 includes a memory location 30 for storing a switch or flag.

When recovering from a failure, it is desirable to know the transaction that was last performed by the central processing unit 21, so that processing can be resumed from the interrupted point without repeating or skipping a transaction. For this purpose, whenever the state memory in either of the memory banks 28 or 29 is updated, a transaction identification code 31, 32 is written into the state memory along with the time 33, 34 at which the results of the transaction were first written (i.e., committed) to state memory.

Figure 2A:
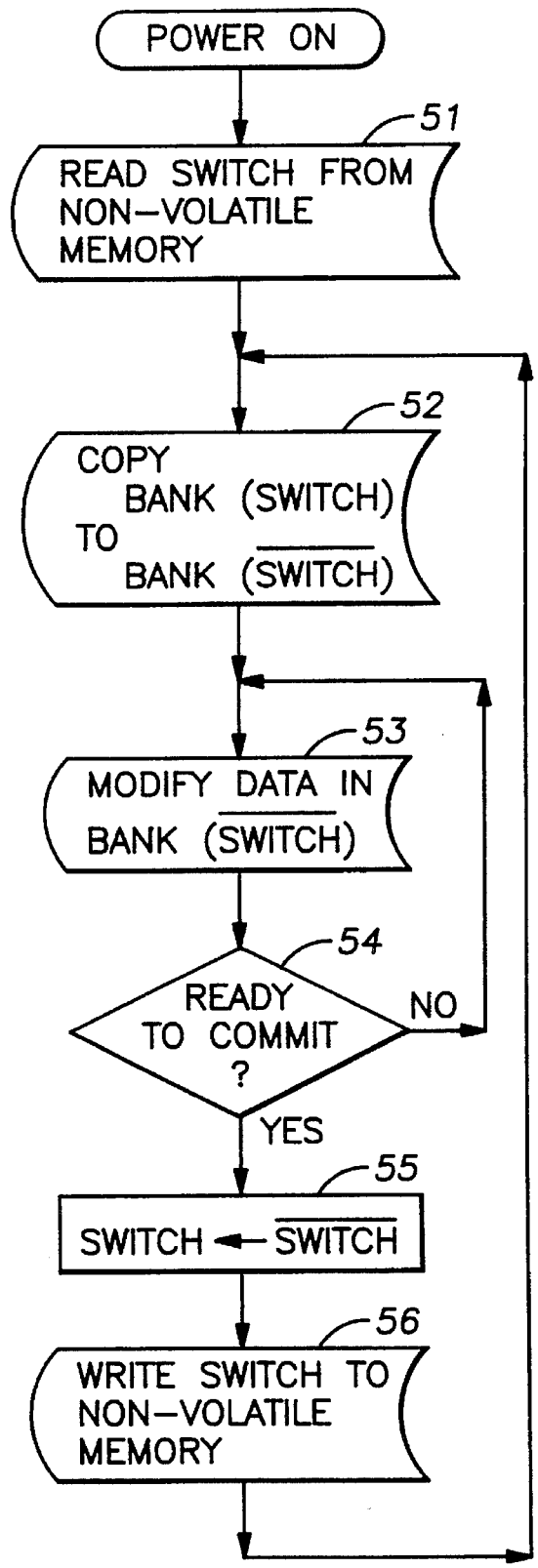
FIG. 2A is a flow chart of a procedure for performing transaction processing in the computer of FIG. 1 by switching between two banks of state memory.

Turning now to FIG. 2A, there is shown a flow chart of a procedure for guaranteeing that when recovering from a failure, the state memory of the computer 20 shown in FIG. 1 is either unaffected by a transaction or is properly updated by the result of a transaction. Assume, for example, that the computer system is turned on after a power failure. In a first step 51, the central processing unit 21 reads the value of the switch 30 stored in the non-volatile memory 23. This switch indicates which of the two banks of state memory 28, 29 might possibly have been corrupted by the power failure. In step 52, the central processing unit 21 references the value of the switch to read the bank of state memory known not to have been corrupted, and to make a "working copy" of the data in the other bank of state memory. Therefore, after step 52, both bank 28 and bank 29 of state memory have the same contents. Moreover, the transaction identifier 31, 32 and the commit time 33, 34 can be inspected to find the location in a program of the next transaction to be processed.

In step 53 transaction processing is continued by modifying the data in the working copy of state memory by writing results of the transaction being processed. The end of processing of the transaction is reached in step 54. To commit the results of the transaction to state memory, the value of the switch is changed in step 55, and in step 56 the changed value of the switch is written into the switch location 30 of the non-volatile memory. When viewed by the central processing unit 21 during recovery from a failure, the writing of the changed value of the switch into the non-volatile memory has the effect of insuring that the committed result of the transaction either has no effect upon the state memory, or properly updates the state memory, depending upon whether the failure occurs before or after the value of the switch has been written into the non-volatile memory. Because the value of the switch 30 is a single bit and the switch 30 is stored in a record different from the records of the banks of state memory, any failure occurring during the writing of the this single bit is inconsequential; in this case, neither of the banks of state memory should be corrupted, so the value of the switch does not matter.

The method of committing the result of a transaction as illustrated in FIG. 2A is rather inefficient when the result of a transaction modifies only a small portion of the state memory. In this case, step 52 spends a good deal of time unnecessarily copying data records that have not been modified. This unnecessary copying can be eliminated by the somewhat more complex procedure of FIG. 2B.

Figure 2B:
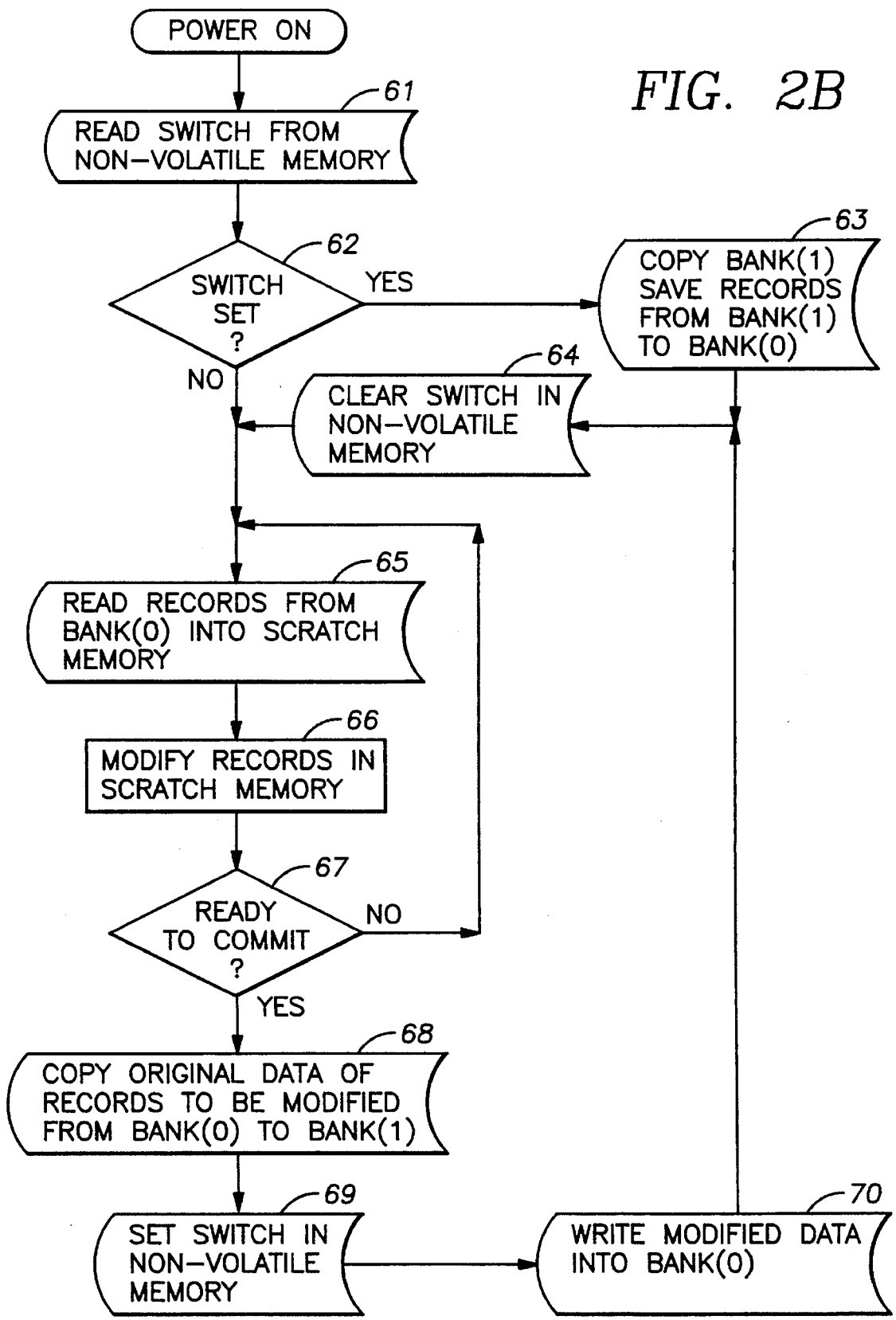
FIG. 2B is an alternative procedure for operating the digital computer of FIG. 1 for transaction processing by saving copies of only the data records of state memory that are modified by a transaction.

In the first step 61 of FIG. 2B, the switch is read from the non-volatile memory. Next, in step 62, the central processing unit checks whether the switch is set. If so, then a failure occurred during the processing phase in which the results of a transaction were being committed to state memory, as further described below. Therefore, in step 63 records saved in the state memory bank 29 are copied to state memory bank 28. Then, in step 64, the switch in non-volatile memory is cleared.

To process a transaction, in step 65, data records are read from the state memory bank 28 and transferred into the scratch memory area 27. Then in step 66 the records in scratch memory are modified in accordance with results of the transaction. When the transaction is finished, as found in step 67, then in step 68, original data of records to be modified are copied from state memory bank 28 to the state memory bank 29. Then in step 69 the switch is set in non-volatile memory. Then in step 70 the results of the transaction are committed by writing the modified data into the state memory bank 28. Finally, in step 64, the switch is cleared in non-volatile memory. Processing of the next transaction begins in step 65.

As described above with respect to FIG. 2A or FIG. 2B, it is assumed that transactions are processed in sequence by the central processing unit 21 of the computer 20 in FIG. 1. In a conventional transaction processing system, however, the processing of transactions are typically distributed in such a way that the performance of a second transaction is begun before the results of a first transaction are committed. Moreover, the preparation and committing of transactions is scheduled in such a way as to ensure consistent results. In other words, the transaction processing system provides a mechanism for enforcing local serializability. The scheduling of operations for the transactions is typically performed by a multi-tasking or multi-processing operating system program that services a transaction queue. In such a system, the transaction at the head of the queue is given priority and is processed unless this transaction at the head of the queue must wait for completion of an input/output operation or a memory access operation to nonvolatile memory. In this situation, the transaction having priority may return execution to the operating system, and the operating system will pass execution to the next transaction having priority. Upon completion of the input/output or memory access operation, however, an input/output or memory interrupt will occur, causing execution to be interrupted in favor of an interrupt handler that will return execution to the operating system. The operating system will then transfer execution to transaction at the head of the queue, which was waiting for the completion of the input/output or memory access operation. In this fashion, the resources of the computer 20 are used more effectively. Such multi-tasking and multi-processing operating systems are well known in the art and are available commercially from the major computer manufacturers. A specific example is the "Rdb/VMS" (Trademark) and "VAX DBMS" (Trademark) brand of operating systems manufactured and sold by Digital Equipment Corporation of Maynard, Mass. 01754-1418. A detailed description of Rdb/VMS is given in L. Hobbs et al., *Rdb/VMS—A Comprehensive Guide*, Digital Press, Digital Equipment Corporation, Maynard, Mass., 1991. The processing of transactions in such a conventional system will now be described below, with reference to FIG. 3.

To ensure ease of recovery in the situation where a second transaction is begun before a first transaction commits, the second transaction is usually precluded from reading any results of the first transaction before the first transaction commits. A transaction places "write locks" on the state memory records to be modified by the transaction, and these "write locks" are removed when the transaction is committed, as further described below with reference to FIG. 3.

To ensure consistency of data read by a transaction, the transaction could place "read locks" on any state memory records that are read by the transaction. The use of memory locks, however, inhibits concurrency between transactions, which causes a decrease in transaction processing speed. Therefore, the "Rdb/VMS" (Trademark) operating system uses a known "snapshot" mechanism to prevent memory locks from blocking read operations by read-only transactions. The "snapshot" mechanism permits a "read-only" transaction to read, at any time, a consistent version of any state memory record existing at the time that the transaction begins. In particular, a lock placed on a record for the benefit of a first transaction need not block the reading of the record by a second "read-only" transaction because a "snapshot" of the locked record is created for the benefit of the "read-only" transactions, as further described below with reference to FIG. 3. The "snapshot" mechanism is further described in L. Hobbs et al., *Rdb/VMS—A Comprehensive Guide*, cited above, and it is also described in Spiro et al. U.S. patent application Ser. No. 07/717,212 filed Jun. 18, 1991, incorporated herein by reference.

Figure 3:
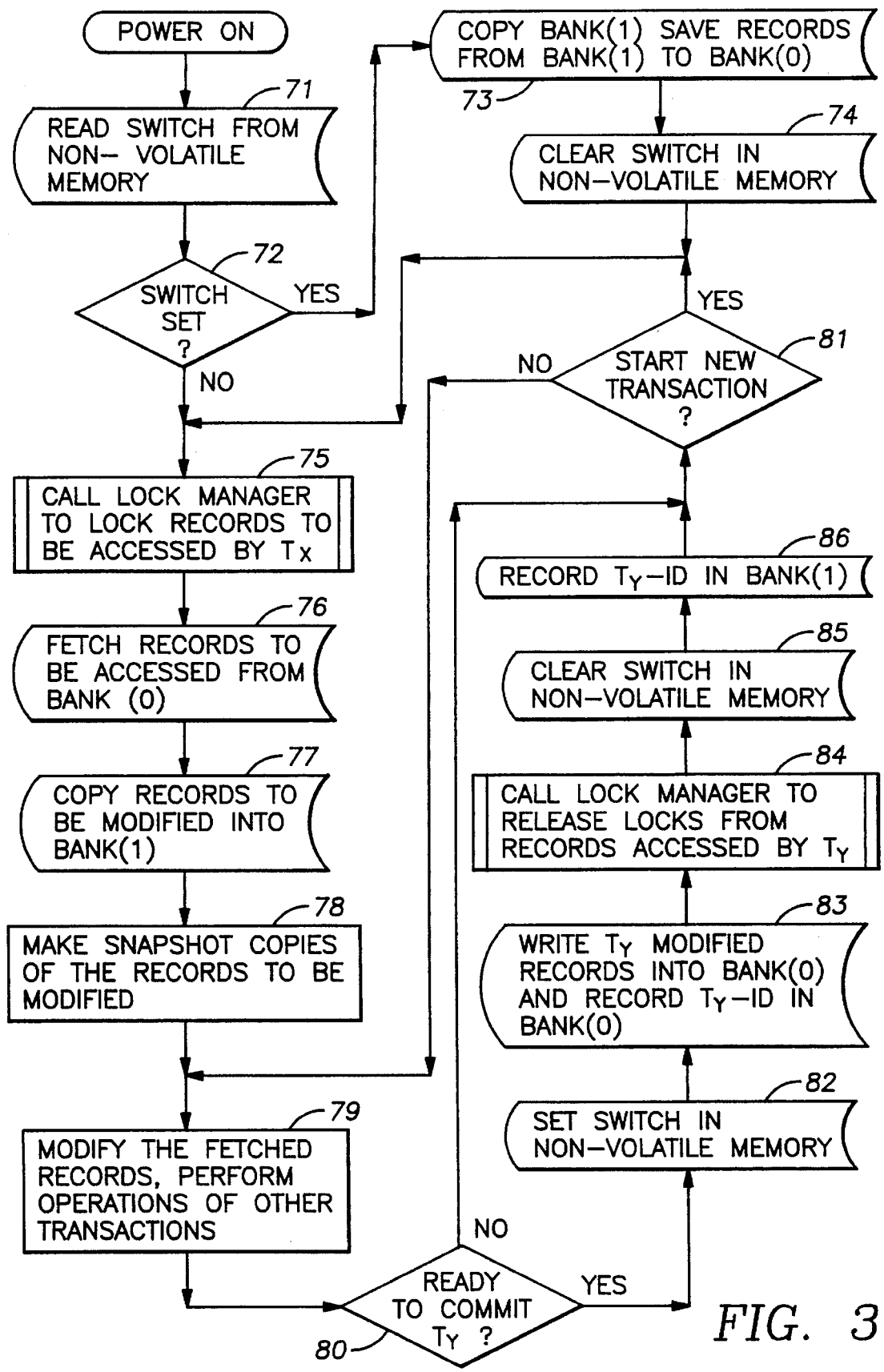
FIG. 3 is a flow chart illustrating the operation of a conventional transaction processing system that permits multiple transactions to be processed in such a way that the performance of a second transaction is begun before the results of a first transaction are committed.

Turning now to FIG. 3, there is shown a flow chart of the operation of the computer 20 for processing transactions when using the "Rdb/VMS" (Trademark) operating system. In this case the operating system uses a conventional "undo" recovery procedure, in contrast to the procedure of FIG. 2B, which is known as a "re-do" procedure. When the computer (20 in FIG. 1) is turned on, for example after a power failure, execution by the central processing unit (21 in FIG. 1) begins in the first step 71. In step 71, the central processing unit 21 reads the switch from non-volatile memory. If the switch is found in step 72 to be set, then execution branches to step 73, to copy records saved in BANK(1) to BANK(0). In step 73, the transaction-ID recorded in BANK(1) is also copied to BANK(0). Then in step 74 the switch in non-volatile memory is cleared. Steps 71 to 74 in effect "undo" the effects of failed transactions. The BANK(1) save records constitute a so-called "before-image log file" indicating records that were modified by failed transactions (i.e., the transactions that had begun but had not yet committed at the time that the failure interrupted the processing of the transactions). The switch read from nonvolatile memory in step 71 is an indication of whether or not the "before-image log file" contains any records that were modified by transactions that have not yet been committed.

Once the non-volatile state memory in BANK(0) has been restored, transaction processing can resume in step 75 by beginning processing for a next transaction $T_x$ selected by the scheduler of the operating system. The scheduler, for example, selects the next transaction $T_x$ from a predefined schedule based on the transaction having been last committed that is indicated by the transaction-ID recorded in BANK(0), and begins a "fetch" phase for the transaction $T_x$. In step 75, a "lock manager" program is called to check the availability of records to be accessed by the transaction $T_x$. A multi-processing operating system typically provides such a "lock manager". The lock manager, for example, maintains lock data structures such as a hash index table to a cache of locks. The cache of locks is indexed before a record is fetched in the following step 76, in order to determine whether a record to be accessed by the current transaction is already locked, and to lock a free record to be accessed by a "read-write" transaction. Such a lock manager is desirable in multi-processing systems to simplify scheduling. If a record to be accessed by the current transaction is already locked, then the operating system is invoked to interrupt processing of the current transaction, and to begin or continue processing of another transaction, such as the transaction having locked the record. Otherwise, the record is locked for the transaction $T_x$.

Once the records to be accessed by the current transaction are locked, in step 76 the records are fetched from BANK(0) and written into volatile memory. In step 77, the records to be modified are copied into BANK(1). In step 78, "snapshot copies" of the records to be modified are also made. This completes the "fetch" phase for the transaction $T_x$.

Next, in step 79, the records are modified in accordance with results of the transaction. Under the control of the scheduler of the operating system, processing of the transaction $T_x$ may be interrupted in step 79 (for example while waiting for completion of a memory or input/output request), to perform operations of other transactions. Moreover, preparation of results for a transaction $T_y$ may become finished in step 79, as detected by the scheduler in step 80, or the processing of a transaction may be interrupted to begin processing of a new transaction, as detected by the scheduler in step 81. Therefore, a number of "before images" may be logged in the BANK(1) state memory, and processing of a number of transactions may begin, until a transaction Ty is ready to be committed, as found in step 80.

In step 82, a "commit" phase is begun for the transaction $T_y$, by setting the switch in non-volatile memory. Next, in step 83, the records modified by the transaction $T_y$ are written into BANK(0), and the transaction ID of the transaction $T_y$ is also recorded in BANK(0). In step 84, the "lock manager" is called to release the locks on the records modified by the transaction $T_y$. In step 85, the switch in non-volatile memory is cleared. Finally, in step 86, the transaction ID of the transaction $T_y$ is recorded in BANK(1). This completes the "commit phase" of processing of the transaction $T_y$. Then, as selected by the scheduler in step 81, processing of other transactions continues in step 79 or processing for a new transaction is begun in step 75.

FIG. 3 was described in terms of a multiplicity of transactions having begun before some of the multiplicity of transactions have committed. In this situation the scheduler of the operating system program time-shares execution among the multiplicity of transactions during the transaction processing steps 75 to 81. In step 75, the lock manager places locks on a group of records that must be accessed in a consistent fashion during a "read-write" transaction, in order to prevent other transactions from also writing to them and to prevent other transactions from reading inconsistent records. When a "read-only" transaction desires to read a record, it invokes the "snapshot" mechanism, which accesses the lock data structures to determine whether the desired record is locked, and when the desired record is locked, a "snapshot copy" of the record is read instead of the record in the state memory of BANK(0).

In order to guarantee the serializability of transactions in a distributed environment, each transaction is specified as either a "read-only" transaction or a "read-write" transaction. A "read-only" transaction may read a snapshot record, but a "read-only" transaction may not modify a record. A "read-write" transaction may not read a snapshot record, but it may read and modify a record.

So that the relatively simple recovery scheme of FIG. 3 will operate in such a distributed transaction environment, the locks imposed by a transaction are not released until step 84 when the transaction is committed. The locks imposed by a transaction are also released whenever a transaction is aborted.

In a conventional transaction processing system operating as shown in FIG. 3, consistency of state memory is ensured by the use of memory locks. In the present invention, however, global transactions need not be subject to such stringent locking procedures. Instead, consistency in the presence of global transactions is assured by committing a selected global transaction and aborting an abort set of global or local transactions selected so that the order of commitment of global transactions is consistent with an order of conflicts among the global transactions, taking into consideration indirect conflicts caused by local transactions. In particular, global serializability is ensured by scheduling the commitment of global transactions so that the commitment order of directly or indirectly conflicting global transactions conforms to the order of the conflicts (as reflected by a serializability graph). When the scheduling of commitment of global transactions has this property of "extended commitment ordering", it can also be shown that in a distributed processing system (as further described below in connection with FIG. 5B), global serializability is guaranteed when only "atomic commitment" is used to coordinate the various processors in the system, so long as local serializability is guaranteed by any kind of mechanism. This is demonstrated by a rather elaborate mathematical proof, which is appended to the present specification. From a practical standpoint, this result means that the advantages of the present invention can be applied to any existing distributed transaction processing system.

As described above with reference to FIG. 3, a conventional transaction processing system insures that a second transaction can read the write data of a first transaction only after the first transaction is committed. This is a sufficient but not necessary condition to insure recoverability. In a first embodiment of the present invention, this condition can also be maintained for global transactions to minimize the amount of nonvolatile memory required and to avoid what is known as "cascading aborts" to achieve recoverability. In this first embodiment, for example, memory access by global transactions must respect "write locks" placed on records by other transactions.

FIG. 4A shows three different possibilities for the scheduling of a first global transaction having a write operation and a second global transaction having a conflicting read operation. In general, two operations are conflicting when they are memory access operations that access the same resource and at least one of the operations is a write operation. By inspection it can be seen that of the three scheduling possibilities, the possibility (b) violates the commitment ordering requirement and therefore may cause inconsistency in the state of the state memory. Due to the fact that the write operation $W_x$ does not commute with the read operation $R_x$, the result for the transaction $T_2$ for the scheduling possibility (b) may be different from the result for the transaction $T_2$ for the scheduling possibility (a). To obtain consistent results, the present invention permits conflicting operations of two global transactions to be scheduled in a selected order to most efficiently use resources available to a central processing unit, but insures consistency by enforcing a commitment order of global transactions that is consistent with the order of conflicts among the global transactions. Inconsistent scheduling possibilities, such as the possibility (b) in FIG. 4A, are prohibited by aborting a conflicting transaction when a selected global transaction is committed, or by delaying commitment of a selected global transaction until after the conflicting transaction is committed.

In the example of FIG. 4A, for example, suppose that the first operation scheduled is a read operation $R_x$ of the second global transaction $T_2$, as shown in possibilities (b) and (c). If the global transaction $T_2$ is committed before the global transaction $T_1$ as shown in possibility (c), no inconsistency will result because the scheduling is in conformance with the order of conflicts among the global transactions. If, however, the first transaction $T_1$ is committed before the second transaction $T_2$ as shown in possibility (b), then the second transaction $T_2$ must be aborted because otherwise commitment of the second transaction $T_2$ would be inconsistent with the order of conflicts and may lead to inconsistent results.

For the present invention, indirectly conflicting global transactions must also be considered. Due to the local transactions, two global transactions $T_1$ and $T_2$ may indirectly conflict, for example, when referencing different resources that are also referenced by one or more local transactions. As further described below with reference to FIG. 9, indirect conflicts are detected by maintaining a serializability graph recording the effects of transactions, including committed local transactions. Specifically, two global transactions are indirectly conflicting when there is a directed path including more than one edge between them in the serializability graph.

The present invention further permits the scheduling of operations such that a second global transaction $T_2$ can read the write data of a first global transaction $T_1$ before the first transaction $T_1$ is committed. In this case recoverability can be guaranteed by a process of cascading aborts, as further described below with reference to FIGS. 16 and 17. For the case of a first global transaction $T_1$ having a write operation $W_x$ and a second global transaction $T_2$ having a conflicting read operation $R_x$, there are six scheduling possibilities, denoted in FIG. 4B as (a) to (f). Two of these scheduling possibilities (b) and (d) are inconsistent with the order of conflicts among the global transactions and therefore may lead to inconsistent results. The present invention prevents these scheduling possibilities from occurring by determining the order of conflicts among the global transactions and then delaying commitment of a selected global transaction or aborting a conflicting operation if necessary to enforce global transaction commitment ordering.

Turning now to FIG. 5A, there is shown a block diagram of the programming and data structures used in the digital computer 20 of FIG. 1 for scheduling transactions and enforcing global transaction commitment ordering. Global and local transactions are initiated, for example, by application programs 90. To commit the results of transactions to state memory 28, 29 and to recover from failures, the digital computer is provided with a resource manager (RM) 91 that, for example, performs the operations shown in FIG. 3. The resource manager 91, for example, also manages a transaction list (TL) 93 as further described below with reference to FIG. 6. In general, a resource manager (RM) is a software component that manages state memory resources affected by committing transactions in such a way that the memory state of the resources can be restored before the transaction is committed by effectively undoing all of the changes introduced by the transaction. In other words, the resource manager ensures that the transactions have the property of "atomicity", or "all or nothing" semantics upon its state memory resources. A resource is typically, but not necessarily, a data item or a data object. Examples of resource managers are typically found in data base systems (DSB's), queue managers, and cache managers.

To provide an interface for conducting an atomic commitment protocol for scheduling global transactions, digital computer 20 also includes a transaction manager (TM) 92. Preferably the presence of operations conflicting with global transactions is detected in real time when the transactions are performed, as further described below with reference to FIG. 15. To enforce global transaction commitment ordering, the order in which such conflicting operations are performed is recorded in global transaction commitment ordering serializability graph (GTCO-SG) 94 which is a data structure in memory, and which is described further below with reference to FIGS. 8 and 9. To enforce the global transaction commitment order, global transactions are selected for commitment and transactions are selectively aborted by a global transaction commitment order coordinator (GTCOCO) 95, which is further described below with reference to FIGS. 11 to 18.

The present invention is directed to a multi-processor or multi-processing system in which a plurality of transactions are performed concurrently and component operations of the same "global" transaction are performed concurrently in different processors or processes. A multi-processor system 590 is illustrated in FIG. 5B. In this case, three digital computers 591, 592, 593 are interconnected through a communication channel 94, and the communication is controlled by the transaction managers (TM) 595, 596, 597. In the multi-processor system 590, any one of the transaction managers 595, 596, 597 may assume the role of a coordinator and issue global transactions to the other global transaction managers. These global transactions are coordinated, for example, according to the well-known two phase commit protocol, as was described above with reference to the background art, and as further described below with reference to FIG. 11.

The transaction managers may also exchange state information over the communication channel 594. In particular, transaction processing systems generally fall within two broad categories called database management systems and object oriented systems, depending upon whether or not state memory information is resident in the non-volatile memory files of a particular one of the digital computers 591, 592, 593, or whether the state information is associated with predefined objects which may be passed from one computer to another. The present invention, however, is applicable to both types of systems because the present invention more particularly concerns the scheduling of component operations in the transactions and the enforcement of global transaction commitment ordering, and is not particularly concerned with where the state memory is physically located or maintained in a distributed processing system.

Turning now to FIG. 6, there is shown a flow chart of a procedure followed by a transaction scheduler in the resource manager for real-time scheduling of component operations of transactions in accordance with available computing resources of the digital computer. In particular, the transactions include input/output and memory access of rotating memory such as disk drives, and possibly mathematical computations that are performed by a coprocessor. Without real-time scheduling and interleaving of operations of different transactions, the central processing unit of the digital computer would have to spend a good deal of time waiting for these operations to be completed before performing the component operations of other transactions.

To more effectively use the resources of the digital computer, a transaction may dispatch input/output and memory access requests to the input/output and memory units of the computer, then set an inhibit flag indicating to the scheduler that the processing of the current transaction should be inhibited until completion of the input/output or memory access operation, and finally execute a software interrupt to the transaction scheduler in order to permit the transaction scheduler to transfer execution to another transaction. When the requested input/output or memory access operation is completed, the input/output or memory device issues a completion interrupt which is handled by a device handler interrupt routine that clears the inhibit flag of the transaction that requested the input/output or memory access operation. It should be noted that input/output and memory access completion interrupts and device handlers for such interrupts are well known in the art.

Referring now particularly to the first step 101 in FIG. 6, the transaction scheduler responds to an interrupt by removing the context of the interrupted transaction from the processor stack of the digital computer, and by placing the context in a respective context storage for the interrupted transaction. The context includes the value of the program counter which points to the interrupted memory location in the transaction program, as well as the context of other general purpose registers in the digital computer.

The transaction scheduler may also be entered during initial start-up of the digital computer in step 102. In step 102, the transaction list 93 and other data structures such as the serializability graph (GTCO-SG) are cleared and pointers are initialized.

The transaction scheduler may also be entered at the end of preparation for a transaction. In this case, in step 103 the transaction is marked to indicate that it is ready to be committed, and also the current time indicated by the real time clock (25 in FIG. 1) is saved in a memory location allocated to the transaction to indicate the time at which the transaction became ready. It should be noted, however, that some tasks placed on the transaction list might be so-called background tasks of low priority, which are never completed and use central processor execution time remaining after the servicing of all transactions in the list.

The transaction scheduler may also be entered at the end of a device handler interrupt routine. Step 111, for example, clears the inhibit flag (I in the list of FIG. 7) for the transaction having requested the input/output or memory operation, and then execution continues in step 101 to interrupt the current transaction to possibly reschedule execution back to the transaction having requested the input/output or memory operation.

The transaction scheduler performs three major tasks; it responds to transaction requests by placing the transactions on the transaction list; it schedules the performance of component operations of transactions; and it declares ready transactions. In step 104, for example, the transaction scheduler checks whether a transaction has been requested. A transaction scheduler interrupt, for example, may occur in response to an interrupt signal from the input/output unit indicating that a user or another digital computer has requested the performance of a transaction. In this case, in step 105 the transaction request is placed on the transaction list. Also, in step 107, the lock manager of the resource manager is invoked, as described above with respect to step 75 of FIG. 3, to lock the records to be accessed by the transaction, and thereby ensure local serializability. It is possible that some of these records are already locked by another transaction. In this case, the lock manager, for example, puts a pointer to the requested transaction on a "wait list" for the locked records, and sets the inhibit flag for the requested transaction. When the record eventually is unlocked, as described above with respect to step 84 of FIG. 3, the pointer at the head of the wait list is removed, and the inhibit flag for the transition pointed to by the removed pointer is cleared. In this example, the order of performance of conflicting operations, as well as the order of commitment, becomes the order in which the transactions are requested, so long as the memory locks are not bypassed.

Turning for a moment to FIG. 7, there is shown a specific example of the transaction list 93. The transaction list includes a linked list of transaction identification numbers 106. Associated with each transaction identification number is a pointer to the next entry in the linked list, and values for a number of flags (V, R, I, G, P, C, L). These flags include a valid flag V indicating whether the entry in the list includes valid data, a flag R indicating whether preparation of the transaction has been completed and the transaction is ready to be committed, a flag I indicating whether preparation of the transaction has been inhibited until completion of an input/output or memory access request, a flag G indicating whether the transaction is a local or global transaction, a flag P indicating whether the completion of preparation of a global transaction has been reported to a coordinator, a flag C indicating whether a local transaction has been committed, and a flag L indicating that lock has been placed on the transaction because it is in the "abort set" of another transaction that might be committed. The flags G and P associated with global transactions are further described below with reference to FIGS. 15 and 16.

Also associated with the list 93 are a head pointer 108, a tail pointer 109, and a pointer 110 to the transaction being performed. The head pointer 108, for example, has a negative value when the list is empty, and otherwise has a positive value pointing the list entry for the first (highest priority) transaction. In a similar fashion, the tail pointer 109 has a negative value when the list is empty and otherwise has a positive value pointing to the last entry in the list. The pointer 110 to the transaction being performed is used by the transaction scheduler in step 101 of FIG. 6 when responding to an interrupt. In particular the pointer 110 is used to find the respective context storage location for the interrupted transaction when performing step 101.

Returning now to FIG. 6, in step 112 the transaction scheduler checks whether a transaction is ready to be committed. If so, then in step 100, the transaction scheduler checks the "G" flag for the transaction. If the transaction is local, then in step 115 the resource manager (RM) commits the results of the local transaction to the state memory, and releases any locks imposed by the transaction. Otherwise, in step 113, the transaction scheduler invokes the global transaction commitment order coordinator (95) to select the global transaction to commit, and to enforce global transaction commitment ordering with possible aborts and delay. When the global transaction commitment order coordinator decides not to delay commitment, as tested in step 114, then in step 115, the resource manager (RM) commits the results of the global transaction to the state memory, and releases any locks imposed by the transaction.

Because the global transaction commitment order coordinator enforces global transaction commitment ordering, the global transactions can bypass the memory locks to more efficiently use the available resources of the processor. For the Case 1 embodiment of the invention of FIG. 4A, the global transactions may bypass the read locks to read data. For the Case 2 embodiment of FIG. 4B, the global transactions may bypass the read and write locks to read data. Also, the local transactions may bypass the locks so long as the serializability of the local schedule is not violated. The serializability of the local schedule, for example, could be insured by a combination of write locks and time stamps. Instead of using read locks, a resource would be stamped with the beginning time of the transaction that last read or wrote the resource. Any transaction attempting to write to the resource would first compare its time stamp with any time stamp of the resource, and if the write transaction would have an earlier time stamp, it would be aborted to enforce the serializability of the local schedule. Such a mechanism for ensuring local serializability would not necessarily cause the commitment order of all transactions to be the same as the order of conflicts among all of the transactions.

Finally, in step 116, the transaction scheduler checks the transaction list to determine whether there is an uninhibited transaction that is not yet ready. If so, then in step 117, the transaction scheduler selects one of the uninhibited transactions that is not yet ready. To perform steps 116 and 117, for example, the transaction scheduler first checks whether the transaction list is empty by testing whether the head pointer 108 has a negative value. If the head pointer has a positive value, then the transaction scheduler checks the flags R and I for the transaction at the head of the list to determine whether is not yet ready and is not inhibited. If the first entry is ready or is inhibited, then the transaction scheduler checks the tail pointer 109 to determine whether the end of the list has been reached. If not, then the transaction scheduler checks the pointer to the next entry and performs the same steps until either an uninhibited transaction not yet ready is found or the end of the list has been reached.

When an uninhibited transaction not yet ready has been selected, then in step 118 the context of the selected transaction is placed on the stack. In this regard it should be noted that when a transaction is first placed on the transaction list, then an initial context for the transaction is placed in the respective context storage for the interrupted transaction. The initial context, for example, includes a program counter value pointing to the first instruction in the program for the transaction. After step 118, a return from interrupt is performed in step 119 to begin or continue the execution of instructions in the program for the selected transaction.

Turning now to FIG. 8, there is shown a specific example of a data structure 94 for storing the global transaction commitment order serializability graph (GTCO-SG). As further described below in connection with FIGS. 9–14, the data structure 94 is used in connection with the flags in the transaction list 93. Whenever a particular order of performing conflicting operations in a respective pair of transactions has been established, that order of performance of the conflicting operation is noted in the global transaction commitment order serializability graph. If the memory access operations performed by each transaction and the memory locations of those memory access operations are known at the time that a transaction is placed on the list, then it is possible in Case 1 of FIG. 4A for the order of conflicts to be determined at that time. In this regard, it should be noted that for Case 1 as illustrated in FIG. 4A, write operations are in effect performed at the time of transaction commitment. Aside from this particular case, the order of performance of conflicting operations is determined when a second one of the conflicting operations is scheduled for performance by the transaction scheduler and the memory location accessed by that conflicting operation is determined.

It should be noted that the global transaction commitment order serializability graph may include committed local transactions. When a local transaction is committed in step 115 of FIG. 6, its entry in the transactions list 93 is removed at this time only when it does not have any path in the graph 94 from any undecided transactions. If it does have a path from an undecided transaction, then its I flag and its C flag are set, and it remains in the graph so long as it has a path from an undecided transaction. The graph 94 can be searched for such a path by using a recursive procedure similar to the ABORT(T) procedure listed below.

At the time that presence of a conflict is detected, as further described below with reference to FIG. 14, the order of performance is recorded in the global transaction commitment order serializability graph. The pertinent data in the graph of FIG. 8 and transactions list 93 is presented in pictorial form in FIG. 9. The flags that are set in the data structure of FIG. 8 correspond to edges 131 in the pictorial representation of FIG. 9. The direction of an edge 131 indicates the order of performance of the conflicting operations in the transactions. Once this order of performance is established, a corresponding global transaction commitment order is enforced by delaying commitment of transactions, or aborting transactions.

Enforcement of the global transaction commitment order by aborting transactions is illustrated by steps 141 and 142 in FIG. 10. In step 141 a ready global transaction to be committed is selected. Preferably, the selection is performed by an atomic commitment coordinator according to the well-known atomic commitment protocol introduced above. In this protocol, the atomic commitment coordinator sends a "vote" request to all participating processors. If all of the participating processors respond with a "yes" or "prepared" vote, then the atomic commitment coordinator sends a "commit" command to the participating processors. The preferred atomic commitment protocol is further described below with reference to the state diagram of FIG. 11.

In step 142, the global transaction commitment order is enforced by aborting an abort set so that the commitment order of the committed global transaction is consistent with the order of conflicts among global transactions. For the commitment order illustrated by the graph in FIG. 9, for example, if the transaction $T_6$ is selected, then transactions $T_2$ and $T_3$ are aborted to enforce the global transaction commitment order. In particular, when a global transaction is committed, any and all paths to it in the GTCO-SG from any and all global undecided transactions, and from any and all active transactions (representing possible future paths from global transactions) are disconnected by aborting a set of transactions on the paths. This "abort set" may include global as well as local transactions. In some cases, the abort set is empty, in which case no transactions need to be aborted to enforce the global transaction commitment order. In other cases, the abort set may not be unique, and the abort set can be selected in an expedient fashion, or a fashion optimized to maximize system performance, or some trade-off between selection expediency and overall performance.

The most convenient selection involves choosing the undecided transactions, on the paths from the undecided global transactions to the committed transactions, that are the closest (on each path separately) to the committed transaction. This selection gives a unique abort set. Shown below is pseudo-code for a specific procedure to find this abort set:

```
ABORT (T) /* returns a "closest neighbor" abort set */
set ABORT:=empty /* initial value is the empty set */
set NODE_VISITED:=empty /* set of nodes visited */
BACK_FRONT(T)
```

```
            return ABORT
      BACK_FRONT(T) /* a recursive procedure that computes the set
            ABORT */
      for every edge (T',T) in the GTCO-SG do
         if T' is not in NODES_VISITED then
            begin
            insert T' into NODE_VISITED
               if undecided (T') then insert T' into ABORT
                  else BACK_FRONT(T')
            end
      end_BACK_FRONT
      end_ABORT
```

This closest neighbor abort set, however, is not necessarily optimum. If any of the nearest undecided neighbors is ready, for example, then the next nearest undecided neighbor can be alternatively selected for the abort set. An optimal selection for the abort set would choose the abort set to maximize system performance. To maximize performance, an optimum abort set may include a minimum number of transactions to be aborted, although the performance penalty associated with aborting a transaction may be quite different with each transaction. A transaction, for example, may already have been included in another abort set of a global transaction reserved for commitment, and, in this case, the transaction already in an abort set (i.e., the transaction having its flag L=1) can be included in other abort sets with a minimal performance penalty. Depending on the particular system, it may be desirable to abort local transactions instead of global transactions. Also, a priority could be assigned to each transaction, or computed based upon the order of each transaction in the transaction list, and the priorities of the members in each abort set could be summed to compute an overall performance penalty associated with each possible abort set. Therefore, at the expense of additional search time, other possible abort sets could be found, an overall performance penalty could be estimated for each abort set, and the abort set estimated to have the least performance penalty could be chosen.

Aborting of a transaction involves discarding the results of the transaction. For local transactions, a transaction could be aborted by resetting the contents of its respective context storage to its initial context. The current value of the program counter for the transaction, for example, is reset to the beginning of the program for the transaction. In addition, the transaction list 93 and the global transaction commitment order serializability graph 94 must be updated. For a global transaction, the aborted global transaction is restarted if at all by the atomic commitment coordinator of the global transaction. In this case, the global transaction is entirely removed from the transaction list.

Turning now to FIG. 11, there is shown a state diagram of a processor 145 in a distributed transaction processing system that uses the preferred atomic commitment protocol to process global transactions. The processor also processes local transactions. The local transactions, for example, are issued by a local user 146 such as an application program executed by the processor. Global transactions issued by the local user are coordinated by the transaction manager 147, that functions as the atomic commitment coordinator for these global transactions. Therefore, the processor 145 should know whether a transaction is global or local, depending on the source of the transaction. Existing systems, however, may have to be modified to provide information identifying each transaction as global or local. The information should be made available to the local scheduler as early as possible for use by the local concurrency control mechanism. Otherwise, each transaction should be assumed to be global, but in this case any optimization of the local concurrency control for local transactions is lost. When an optimistic local concurrency control is used, for example, knowledge that a transaction is local can be used at any time before the transaction is decided. For some applications, some transaction types are a-prior known to be local, and hence this information could be used to identify local transactions in systems which do not explicitly identify the source of each transaction.

In any case, the transaction scheduler receives the transaction request and puts the transaction request into an entry of the transaction list. The transaction scheduler eventually transfers execution to the transaction, and the transaction is executed until either it becomes inhibited or it becomes ready. As described above in connection with FIG. 6, a transaction may become inhibited after requesting an input/output operation or memory operation, and, upon completion of the input/output or memory operation, the transaction will become uninhibited. A transaction that is either active, inhibited or ready can be aborted to enforce global transaction commitment ordering.

The transaction scheduler may commit a ready local transaction. To insure global synchronization in a distributed transaction processing system, however, a ready global transaction is committed only after a handshake with the coordinator 147. This handshake insures that a global transaction is not committed unless all of the processors that are processing assigned portions of the global transaction are also ready to commit their assigned portions of the global transaction. Therefore, when the state of a global transaction changes from the "active" to the "ready" state, a "prepared" signal is transmitted to the coordinator 147.

When the coordinator 147 receives "prepared" signals from all of the processors participating in a global transaction, then the coordinator sends a "commit" command back to the processors. If, however, the coordinator fails to receive a "prepared" signal from all of the participating processors, then the coordinator may transmit an "abort" signal to the processors. In FIG. 1, these handshake signals are indicated by dotted lines.

When a local transaction is committed, the transaction scheduler notifies the local user 146 that the transaction has been completed. When a global transaction is committed, the transaction scheduler removes the global transaction from the transaction list and sends a signal to the coordinator 147 indicating that the global transaction has been committed. Moreover, when a global transaction is aborted, the global transaction is removed from the transaction list and the global transaction commitment order serializability graph, and the transaction scheduler sends a signal to the coordinator 147 to confirm the abort. For a local transaction, however, it may be desirable to restart preparation of the transaction, and in this case it is only necessary to reset the initial context of the transaction, clear the transaction from the global transaction commitment order serializability graph, and set the state of the transaction back to "active" by resetting the R and I flags in the transaction list entry of the transaction.

Turning now to FIG. 12, there is shown a flow chart generally designated 150 of a procedure for a global transaction commitment order coordinator working in connection with a transaction manager 151 and a resource manager 152 to selectively abort or delay the commitment of transactions to enforce commitment ordering of global transactions. As described above, the transaction manager 151 acts as an interface for initiating global transactions and conducting an atomic commitment protocol. The resource manager 152 has a transaction scheduler 153 that schedules the preparation of local transactions as well as global transactions $T_g$ identified by a request 154.

The transaction scheduler 153 periodically checks whether a transaction is ready to commit. Preferably, the transaction scheduler also checks whether a global transaction is ready to commit in response to a "vote request" 155 from the atomic commitment coordinator of a global transaction. Although such a "vote request" is not needed for the atomic commit protocol described above with respect to FIG. 11, it permits the commitment of a global transaction to be delayed to possibly reduce the number of members in the global transaction's abort set. In the procedure illustrated by the flow chart 150 of FIG. 12A, for example, a "prepared" message for a global transaction ready to commit is sent to the atomic commitment coordinator immediately when the abort set for the global transaction is null; otherwise, a "prepared" message for the global transaction is sent to the coordinator only after receiving a vote request 155 from the atomic commitment coordinator. In an alternative embodiment described below, a vote request is not used, but if the abort set is not null, a "prepared" message is sent to the atomic commitment coordinator only after a predetermined period of time.

When the transaction scheduler 153 finds that a transaction is ready to commit, the global transaction commitment order coordinator checks in step 156 whether a global lock has been placed on the ready transaction. If a global lock has been placed on the ready transaction, then it is not committed, and execution returns to the transaction scheduler to continue processing for another transaction. It is not necessary to use such a global lock, but the use of such a global lock permits some transactions to be committed that would otherwise have to be aborted when chosen to be included in the abort set of a global transaction. Instead of immediately aborting the members of an abort set for a global transaction, a global lock is placed (in step 171 of FIG. 12B) on the members of an abort set, and then (in step 169) a "prepared" message for the global transaction is sent to the atomic commitment coordinator. If the atomic commitment coordinator then decides to abort the global transaction, the global locks for the global transaction are released (in FIG. 14), thereby permitting the members of the abort set to be committed.

Next, in step 157, execution branches to step 158 when the ready transaction is local. If the ready transaction has a path from any undecided transaction in the global transaction commitment order serializability graph, as tested in step 158, then the ready transaction must remain in the graph (even though it will become a committed local transaction). Therefore, in this case, execution branches to the resource manager 152 to commit the ready transaction. Otherwise, in step 159, the ready transaction is removed from the graph. Its removal may permit other committed local transactions to be removed from the graph, as attempted in step 160 by calling a "garbage collection" subroutine shown in the flow chart of FIG. 13. Execution continues to the resource manager 152 to commit the ready transaction.

If the ready transaction is global, as tested in step 157, then in step 161, the global transaction commitment order serializability graph is searched to find an abort set for the ready transaction, as described above in FIG. 2A. If an abort set cannot be found without any transaction reported to an atomic commitment coordinator as being prepared (i.e., without the flag P=1), then in step 167, execution branches depending on whether the abort set is null. If so, then in step 168, a message is sent to the atomic commitment coordinator indicating that the ready transaction has been prepared to be committed, and in step 169, the P flag for the ready transaction is set. Then execution continues so that the transaction scheduler 153 processes another transaction.

If in step 167 the abort set was not null, then in step 170, execution branches depending on whether the atomic commitment coordinator issued a vote request for the ready transaction. If not, then execution continues so that the transaction scheduler processes another transaction. Otherwise, in step 171, a global lock is placed on each member of the abort set. Next, in step 168, a message is sent to the atomic commitment coordinator for the global transaction indicating that the ready transaction has been prepared to be committed, and in step 169, the P flag for the ready transaction is set. Then execution continues so that the transaction scheduler 153 processes another transaction.

Turning now to FIG. 13, there is shown a flow chart 180 of the garbage collection subroutine that is called in steps 160 and 166 of FIG. 12A and step 166 of FIG. 12B. In a first step 181, execution returns if there are not any committed local transactions that were on paths from the transaction that was just removed from the global transaction commitment order serializability graph. Otherwise, in step 182, the graph is inspected to determine whether each of these local committed transactions has a path from any undecided transaction in the graph. For each of these committed local transactions which does not have any path from any undecided transaction, in step 183, that committed local transaction is removed from the graph, and, in step 184, the subroutine of FIG. 13 is called recursively to attempt the removal of more committed local transactions that were on paths in the graph from the committed local transaction that was just removed from the graph.

Turning now to FIG. 14, there is shown a flow chart 190 of an interrupt routine for responding to commit and abort requests from an atomic commitment coordinator. These requests are passed to the global transaction commitment order coordinator through the transaction manager 151. In response to a request to commit a specified global transaction, in step 191 the members of the transaction's abort set are each removed from the global transaction commitment order serializability graph by performing steps 165 and 166 of FIG. 12B, and aborted by the resource manager. Next, in step 192, the specified global transaction is removed from the graph by performing steps 159 and 160 of FIG. 12A, and committed by the resource manager. Then, in step 193, an acknowledgement is sent to the atomic commitment coordinator for the global transaction, and execution returns from the interrupt.

In response to a request to abort a specified global transaction, in step 194, any global locks imposed by the transaction are removed. Associated with each globally-locked transaction, for example, is a list of pointers to all of the global transactions having locks on the locked transaction. Associated with each prepared global transaction is a list of pointers of the locked members of its abort set. Removal of the global locks imposed by the specified transaction in this example entails removing the pointers to the specified transaction from the list associated with each member of the specified transaction's abort set, and when any list associated with each member of the abort set becomes empty, releasing the lock on that member. Then, in step 195, the specified transaction is removed from the global transaction commitment order serializability graph by performing steps 165 and 166 of FIG. 12B, and the specified transaction is aborted by the resource manager. Finally, in step 193, an acknowledgement is sent to the atomic commitment coordinator for the global transaction, and execution returns from the interrupt.

Turning now to FIG. 15, there is shown a flow chart 200 of a procedure for determining the order of conflicts among conflicting transactions. The procedure 200 is invoked during the preparation of a memory access operation such as a read or write. In the first step 201, the address of the memory access operation is determined. Next, in step 202 the address is compared to addresses of prior operations that may conflict. This is done by searching a list of addresses of prior operations for each transaction in the transaction list. If the present operation is a read operation, then the read operation may conflict with prior write operations. If the present operation is a write operation, then the write operation may conflict with a prior read (or for Case 2 of FIG. 4B, a prior write operation). When there is an address match as tested in step 203, then in step 204 the present order of the transaction is recorded in the global transaction commitment order serializability graph (94 in FIG. 7). In particular, for Case 1 of FIG. 4A, conflicts only occur between a read operation and a write operation, and the order of operation is read then write. For Case 2 of FIG. 4B, the present order must be for the current transaction to be performed after the previous transaction. In step 205 execution branches back to step 202 if there are additional prior memory access operations to check, or otherwise preparation of the memory access continues in step 206 by adding the address determined in step 171 to a list of addresses for read or write operations of the current transaction. Then, in step 207, the operation is prepared or performed. Execution then returns to the transaction.

Turning now to FIG. 16, there is shown an augmented global transaction commitment order serializability graph in which edges including a particular kind of write read conflict are distinguished from edges of other conflicts. Such an augmented graph can be stored in a data structure similar to the data structure shown in FIG. 8, but each edge is represented by a pair of flags, consisting of a first flag indicating any kind of conflict, and a second flag indicating that there is a write-read conflict between a first transaction that was the last transaction to write to a resource E before being read by a second transaction. The augmented graph of FIG. 16 is used to perform cascading aborts to insure recoverability for a system in which a second transaction can read the write data of a first transaction before the first transaction is committed, as was described above with reference to FIG. 4B. Suppose, for example, that global transaction $T_5$ is selected as a ready transaction to be committed. To enforce global transaction commitment ordering, then global transactions $T_3$ and $T_4$ of FIG. 16 must be aborted. However, assume that the transaction processing system operates in the fashion as described above with reference to FIG. 4B. In this case, when a transaction is aborted to enforce global transaction commitment ordering, then every transaction that has read write data of the aborted transaction must also be aborted. From the augmented graph of FIG. 16, it is seen that when the transaction $T_4$ is aborted, then the transaction $T_7$ must also be aborted because of the write read conflict between transactions $T_4$ and $T_7$. Moreover, when the transaction $T_7$ is aborted, then so must the transaction $T_8$ because the transaction $T_8$ has read data written by the transaction $T_7$.

A specific procedure for performing a cascading abort is shown in the flow chart 210 of FIG. 17. In the first step 211 the augmented graph is searched to find all of the transactions $T_y$ such that $T_y$ has read data written by a specified transaction $T_x$. Then in step 212 the transaction $T_x$ is aborted. In a final step 213, the subroutine 190 of FIG. 17 is recursively called to abort each of the transactions $T_y$. It is assumed, of course, that during the recursive call, step 212 will not attempt to abort any committed local transaction in the graph. Such an attempt is an error condition, indicating that the transaction scheduler has failed to ensure recoverability of the system. Any such error should be reported to the system manager, because it may indicate that the state memory has been corrupted with inconsistent results.

Preferably, an explicit step is inserted into the scheduling procedure to ensure recoverability in any system intended to operate in accordance with Case 2 of FIG. 4B. As shown in FIG. 18, for example, a scheduler 153' first checks in step 156' whether there is a global lock on a ready transaction before permitting the transaction to be committed, as was shown in FIG. 12A. To ensure recoverability, however, an additional step 221' is used which prevents any ready transaction from being committed when it has a write-read conflict with any undecided transaction in the augmented global transaction commitment order serializability graph.

Turning now to FIG. 19, there is shown an embodiment of the present invention wherein a global transaction commitment order coordinator (GTCOCO) 251 is inserted into a conventional transaction processing system having a transaction manager (TM) 252 and a resource manager (RM) 253. Application programs 257 send requests for global transactions to the transaction manager 252 and requests for local transactions to the resource manager 253. As shown, the global transaction commitment order coordinator 251 assumes a subset of the interface 254 between the transaction manager 252 and the resource manager 253. The global transaction commitment order coordinator 251 intercepts a conventional portion 255 of the interface 254, and is interconnected to the resource manager 253 via an extended interface 256 that has some additional signals unique to the operation of the global transaction commitment order coordinator. In the distributed processing system, the configuration shown in FIG. 17 may be used at each node in the system. Alternatively, only some of the processors in the system could use a global transaction commitment order coordinator, and the other processors could use conventional strong-strict two phase locking for concurrency control, in the fashion described above with respect to FIG. 3, for the scheduling of global as well as local transactions.

In general terms, the global transaction commitment order coordinator provides added value by delaying "yes votes" on behalf of global transactions when necessary to comply with global transaction commitment ordering. If the system does not provide a global deadlock resolution mechanism, then the global transaction commitment order coordinator could also provide such a mechanism by aborting transactions after a predetermined time limit (as a result of forcing "yes" votes and then committing and aborting transactions).

It is assumed that the resource manager 253 provides the following conventional services:

R_PREPARE(T): The TM notifies the RM to complete the transaction T. It means that the RM will not receive any additional requests or external data on behalf of transaction T;

R_COMMIT(T): The TM notifies the RM to commit transaction T. A prerequisite for invocation of this service is that the RM has previously acknowledged preparation of the transaction (i.e., voted YES); and R_ABORT(T): The TM notifies the RM (and eventually also all the other RMs involved with T) to abort transaction T.

It is also assumed that the transaction manager 252 provides the following conventional services:

T_READY(T): The RM notifies the TM that is has completed processing transaction T, and it votes YES (i.e. it is ready to commit or abort T according to the TM's notification);

T_ABORT(T): The RM notifies the TM that it has aborted transaction T (which will result in aborting T by all the RMs involved).

When inserted into the TM-RM interface 254, the global transaction commitment order coordinator 251, rather than the resource manager 253, directly invokes T_READY(T) and T_ABORT(T) services of the transaction manager 252. Moreover, the global transaction commitment order coordinator 251, instead of the resource manager, directly receives the signals from the transaction manager for causing the R_COMMIT(T) and R_ABORT(T) services. For convenience in identifying the services in the following description, the services of the global transaction commitment order coordinator to these signals are named as C_T_COMMIT(T) and C_T_ABORT(T), respectively.

The RM-GTCOCO interface is a superset of the TM-GTCOCO interface. In particular additional services are defined for maintaining the GTCO-SG, the GTCOCO's data structure. The signals from the RM which previously invoked the conventional T_READY(T) and T_ABORT(T) services of the transaction manager now invoke services C_R_READY(T) and C_R_ABORT(T), respectively, of the global transaction commitment order coordinator 251. The global transaction commitment order coordinator 251 is also invoked by the resource manager 253 to perform the following additional services of the commitment order coordinator:

C_R_BEGIN(T, Type): The RM notifies the GTCOCO to establish a node for T in the GTCO-SG, and "Type" takes on the values "local" or "global"; and C_R_CONFLICT($T_1,T_2$): Prior to executing an operation of $T_2$ that generates the conflict with $T_1$, the RM invokes this service to notify the GTCOCO. If a respective edge from $T_1$ to $T_2$ does not exist already in the GTCO-SG, it is being created. The actual operation of $T_2$ is executed by the RM only after receiving an acknowledgement from the GTCOCO to guarantee that the GCOSG is updated with that conflict at that time.

The resource manager 253 is invoked by the global transaction commitment order coordinator 251 to perform the original R_COMMIT(T) and R_ABORT(T) services. The resource manager 253 is also invoked by the commitment order coordinator 251 to provide the following additional service:

R_CONFLICT_ACK($T_1,T_2$). After this invocation the RM can execute the operation or operations in $T_2$ that cause the respective conflict with $T_1$; and R_DELETE(T). This invocation is used by the GTCOCO to notify the RM to stop informing it of conflicts with a committed transaction. In other words, the GTCOCO sends this invocation after it has deleted a committed local transaction from the GTCO-SG.

Keeping in mind the above definitions of the invocations of FIG. 19, it should be apparent that states of in the system are responsive to the invocations as shown in FIG. 20 for global transactions and FIG. 21 for local transactions. The invocations are further defined by the following PASCAL/SQL based pseudo code, which is based on the state diagrams of FIGS. 20 and 21.

In the following pseudo code, concurrent invocations are allowed, as well as several concurrent invocations of the same service. T_ERROR(T) and R_ERROR(T) are error message invocations of the TM, RM respectively, indicating erroneous invocation sequencing. The transaction's atomic state is returned as an error type. The procedure GARBAGE_COLLECTION(T) is invoked with R_COMMIT(T) and R_ABORT(T) after T is decided to recursively notify the RM (using DELETE(T')) to stop conflict notification on committed local transactions T' ("forget" T') that have paths from T and do not belong in the GTCO-SG.

```
        GARBAGE_COLLECTION(T)        /* recursive procedure;
                                        invocation follows deciding T*/
        if decided(T) /* to stop the recursion at an undecided
        transaction */ then if (Type=local and CHECK_PATHS(T)=false or
 5      Type=global then begin
                if committed(T) then DELETE(T)
                for every T' where (T,T') is in the GTCO-SG do
10                              GARBAGE_COLLECTION(T')
                delete T from the GTCO-SG       /* set deleted(T);
                                                   pseudo state change */
        end 15      CHECK _PATHS(T) /* returns Boolean; checks if T has an edge from
                        an undecided transaction or a (committed) local
                        transaction */
                set CHECK_PATHS:=false
                for every T" where (T",T) is in the GTCO-SG do
20              if T".Type=local or undecided(T") then set
                CHECK_PATHS:=true
        end_CHECK_PATHS
        end_GARBAGE_COLLECTION
```

```
        C_T_COMMIT(T)                    /* commit a global transaction */
        if not C_ready(T)   then T_ERROR(T)
        else
        begin
 5          set committed (T)                   /* state change */
            for every T' in ABORT(T)
                    if not aborted (T') then
            case T' Type of
            local:   /* set C_aborted(T')        pseudo change */
10                   R_ABORT(T')
                     GARBAGE_COLLECTION(T')
            global:  T_ABORT(T')
                     set C_aborted(T')           /* state change */

15          end_case
            R_COMMIT(T)
            GARBAGE_COLLECTION(T)
        end
        end_C_T_COMMIT
20

C_T_ABORT(T)                    /* abort a global transaction T */
        if not (undecided (T) or C_aborted(T)) then T_ERROR(T)
25      else
        begin   /* set T_aborted(T)      pseudo state change */
```

```
            R_ABORT(T)              /* notify the RM to abort T */
            GARBAGE_COLLECTION(T)
    end
    end_C_T_ABORT C_R_ABORT(T)
    if not(active(T) or  /*in a case of invocation collision*/
    C_aborted(T) or deleted(T)    /*i.e. T does not exist*/  )
    then R_ERROR(T)
    else if active(T) then
        case Type of
        local:    /* set R_aborted(T)      pseudo change */
                  /* set C_aborted(T)      pseudo change */
                  R_ABORT(T)
                  GARBAGE_COLLECTION(T)
        global:   /* set R_aborted(T)      pseudo state change */
                  T_ABORT(T)
                  set C_aborted(T)         /* state change */
        end case
    end_C_R_ABORT C_R_BEGIN(T,Type)               /* nodes's Type is local
                                       or global */
    if not non_existent(T)
```

```
        /* i.e. if there is a T node in the GTCO-SG*/ then R_ERROR(T)
        else
        begin
            insert a node for T to the GTCO-SG
            set wait(T)                    /* state change */
        end
        end_C_R_BEGIN C_R_READY(T)
        if not wait(T) then R_ERROR(T) else
        begin
                set time(T):=local_time
                    /* time(T) is used by the VOTE procedure to timeout
                    delaying the voting on global/committing local T;
                    local_time indicates the local clock's value */
                set R_ready(T)             /* state change */
        end
        end_C_R_READY C_R_CONFLICT(T',T)
        if not wait(T) or deleted (T') then R_ERROR(T)
        else
```

```
          begin
                    /* set conflict_insert(T)      pseudo state change */
                    if the edge (T',T) does not exist in the GTCO-SG then
                              insert the edge (T',T) to the GTCO-SG
5         R_CONFLICT_ACK(T',T)
                    /* set wait(T)                 pseudo change */
          end
          end_C_R_CONFLICT
          VOTE (timeout)
10        /* timeout:  A YES vote may be issued on a ready transaction T
          after the time passed since T entered a ready state has exceeded
          the timeout value, even if this may cause aborting transactions
          in the set ABORT(T). */
          repeat
15             select any transaction T where
                              R_ready(T)
                    and       (ABORT(T) is empty
                         or   decided(T') for every T' in ABORT(T))
               if found then YES(T)     /* voting YES without aborts */
20             else      select any transaction T where
                              R_ready(T)
                         and  optimal(T) /* see a remark below */
                         and  local_time - time(T) > timeout
                              /* T entered the ready state at time(T);
25                            local_time indicates the clock's value */
                    if found then
```

```
                    case Type of
                    local:   set committed(T) /* state change */
                             R_COMMIT(T)
                             GARBAGE_COLLECTION(T)
5                   global:  if not C_ready(T') for every global
                             transaction T' in ABORT(T)
                                     /* YES vote on T' has not been invoked */
                             then YES(T) /* voting YES with
                                                 possible future aborts */
10                  end_case
        end_repeat
        YES (T)
                                             /* procedure */
                    T_READY(T)               /* voting YES on T */
15                  set C_ready(T)           /* state change */
        end_YES
        end_VOTE
```

In the above vote procedure, a timeout signal is used in lieu of the immediate vote request from the atomic commitment coordinator as was described above with reference to FIG. 12A. Also in the vote procedure, the Boolean optimal (T) indicates whether the choice of T to be committed is optimal concerning the effects of aborting the transactions in the above set, ABORT(T) when T is global, or affecting such sets for other global transactions when T is local. Usually, there may exist several optimal transactions simultaneously. The optimality criterion, for example, a weighted cost of the transactions in ABORT(T), and the criterion may vary according to transactions' applications, system configuration or state, etc. A way to implement such a criteria is by assigning a priority to each transaction in the GTCO-SG. Minimizing the priorities sum for transactions in ABORT(T) is an example. A priority may change dynamically until the voting event (T_READY(T)) occurs. From the architecture point of view, priorities should be carried to the GTCOCO through invocations. There is no difficulty, in principle, to acquire such priorities from the local RM (e.g., by a C_R_SET_PRIORITY(T,priority) service). Common existing two-phase commit interfaces, however, do not support, for the time being, this kind of information coming from the TM. Passing priorities through the TM, though, has the advantage of possibly considering global priorities (vs local ones if only the local RM is involved).

The global transaction commitment order coordinator 251 as defined by the above pseudo code can be modified to guarantee recoverability of the output schedule. The modified commitment coordinator will be referred to as a GTCORCO. The GTCORCO is used when the interfacing RM (253 in FIG. 19) does not guarantee recoverability, and it still follows the state diagrams of FIGS. 20 and 21. The GTCORCO differs from the above pseudo code example by using cascading aborts, and by the following additional modifications. Certain write-read conflicts are reflected in the GTCO-SG's edges, as illustrated in FIG. 16. If the edge $(T_1,T_2)$ represents a wr conflict where $T_1$ was the last transaction to write to a resource x before being read by a transaction $T_2$ (and possibly some other conflicts) the Boolean $wr(T_1,T_2)$ has the value true, and no YES vote is issued on $T_2$ if $wr(T_1,T_2)$ has the value true (to avoid recoverability violation). Moreover, the service C_R_CONFLICT has an additional Boolean parameter, wr, to indicate such a wr conflict (C_R_CONFLICT($T_1,T_2$,wr)). Furthermore, the GTCORCO's invocations, as well as its VOTE procedure, are modifications of the GTCOCO's, reflecting the differences listed above.

The following recursive procedure CASCADE(T) invokes T_ABORT(T) for global transactions and R_ABORT(T) for local transactions, and generates additional T_ABORT and R_ABORT invocations when necessary to maintain recoverability.

```
     case Type of
     local:    /* set C_aborted(T)          pseudo change */
               R_ABORT(T); GARBAGE_COLLECTION(T)
25   global:   T_ABORT(T)
               set C_aborted(T)              /* state change */
```

```
            end_case
            for every T' such that the edge (T,T') is in the GTCO-SG
                    if wr(T,T') then CASCADE(T')
            end_CASCADE
 5

GARBAGE_COLLECTION(T)        /* unchanged; same as the GTCOCO's */

10  C_T_COMMIT(T)                /* commit a global transaction T */
    if not C_ready(T) then T_ERROR(T)
    else
    begin       set committed(T)              /* state change */
                for every T' in ABORT(T) do
15              if not aborted(T') then CASCADE(T')
                R_COMMIT(T); GARBAGE_COLLECTION(T)
                delete T from the USG      /* set deleted(T);
                                              pseudo state change */
    end
20  end_C_T_COMMIT C_T_ABORT(T)                 /* abort a global transaction T */
25  if not( undecided (T) or C_aborted(T) then T_ERROR(R)
    else
```

```
          begin          /* set T_aborted(T)      pseudo state change */
                         for every T' such that the edge (T,T') is in the GTCO-SG
                                  if wr(T,T') then CASCADE(T')
                         R_ABORT(T); GARBAGE_COLLECTION(T)
5         end
          enc_C_T_ABORT 10        C_R_BEGIN(T,Type)                /* unchanged; same as the GTCOCO's
          */
          C_R_READY(T)                     /* unchanged; same as the GTCOCO's
          */
          C_R_ABORT(T)
15        if not( active(T) or   /* in a case of invocation collision */
          C_aborted(T) or deleted(T)     /* i.e. T does not exist */  )
          then R_ERROR(T)
          else if active(T) then
                    begin
20                            /* set R_aborted(T)      pseudo state change */
                              CASCADE(T)
                    end
          end_C_R_ABORT

25
```

```
C_R_CONFLICT(T',T,wr)
if not wait(T) or deleted(T') then R_ERROR(T)
else
begin
                /* set conflict_insert(T)   pseudo state change */
                if the edge (T',T) does not exist in the GTCO-SG
then
                        begin   insert the edge (T',T) to the GTCO-SG
                                set wr(T',T):= false
                        end
                if wr then set wr(T',T):= true
                R_CONFLICT_ACK(T'T,wr)
                /* set wait(T)          pseudo change */
end
end_C_R_CONFLICT
```

/* Note: The parameter wr in R_CONFLICT_ACK is used in order to execute respective read operations only after the wr parameter of the appropriate edge in the GTCO-SG has been set to "true." */

VOTE (timeout)
/* timeout: A YES vote may be issued on a ready global transaction T after the time passed since T entered a ready state has exceeded the timeout value, even if this may cause aborting transactions in the set ABORT(T). */

```
     repeat
            select any global transaction T where
                        R_ready(T)
            and         (ABORT(T) is empty
 5                      or (aborted(T') and not wr(T',T) or committed(T'))
                                    for every T' in ABORT(T)   )
            if found then YES(T)        /* voting YES without aborts */
            else     select any transaction T where
                        R_ready(T)
10          and      not wr(T'T) for every T' in ABORT(T)
            and      optimal(T)
            and      local_time - time(T) > timeout
                        /* T entered the ready state at time(T);
                        local_time indicates the clock's value */
15          if found then
                 case Type of
                 local:    set committed(T) /* state change */
                           R_COMMIT(T); GARBAGE_COLLECTION(T)
                 global:   if not C_ready for every global T' in
20                             ABORT(T)
                              /* YES vote on T' has not been invoked */
                              then YES(T) /* voting YES with
                                       possible future aborts */
                 end_case
25   end_repeat
     YES(T)
```

```
                    T_READY(T)          /* procedure*/
                                        /* voting YES on T */
                    set C_ready(T)      /* state change */
       end_YES
5      end_VOTE
```

It should be apparent that the services provided by the above pseudo-code are applicable to a wide range of environments in addition to a distributed transaction processing system having separate discrete processors or processes, such as object-oriented systems employing nested transactions, or systems for composed transactions based on flow management or so-called "business transactions." The services provided by the pseudo-code, for example, are directly applicable to any system using T_READY (voting), COMMIT and ABORT services, in which global serializability is required, local serializability is ensured locally, and results are obtained for conflicting operations.

In view of the above, the component operations of a number of global transactions can be distributed and scheduled for execution using any kind of resource manager with a local scheduler that ensures local serializability, yet global consistency can be maintained by enforcing a global transaction commitment ordering that is consistent with the order of conflicts among global transactions, including indirect conflicts caused by local transactions. Conformance to such a global transaction commitment ordering in such a distributed transaction It should be apparent that the services provided by the above pseudo-code are applicable to a wide range of environments in addition to a distributed transaction processing system having separate discrete processors or processes, such as object-oriented systems employing nested transactions, or systems for composed transactions based on flow management or so-called "business transactions." The services provided by the pseudo-code, for example, are directly applicable to any system using T_READY (voting), COMMIT and ABORT services, in which global serializability is required, local serializability is ensured locally, and results are obtained for conflicting operations.

In view of the above, the component operations of a number of global transactions can be distributed and scheduled for execution using any kind of resource manager with a local scheduler that ensures local serializability, yet global consistency can be maintained by enforcing a global transaction commitment ordering that is consistent with the order of conflicts among global transactions, including indirect conflicts caused by local transactions. Conformance to such a global transaction commitment ordering in such a distributed transaction processing system guarantees the serializability of the combined (global) schedule. Moreover, the serializability of the combined (global) schedule is maintained while maintaining the autonomy of each distributed processor, and while using a conventional atomic commitment protocol for coordination of global transactions. Therefore, a distributed transaction processing system is easily constructed by linking together a plurality of transaction processors without changing the scheduling characteristics of each processor to thereby process global transactions in an efficient manner using the available computational resources of the system.

APPENDIX I

Definitions and Proofs of Extended Commitment Ordering Properties

The following shows that a history property called "Extended Commitment Ordering" solves the global serializability problem for a distributed transaction processing system using any kind of mechanism in each resource manager for ensuring local serializability. In particular, global serializability is guaranteed by "Extended Commitment Ordering" when each resource manager in a distributed transaction processing system ensures local serializability, and the resource managers are autonomous to the extent that they coordinate via atomic commitment protocols only and do not exchange any additional concurrency control information, although the resource managers should identify their local transactions.

Definitions

1. A transaction $T_i$ is a partial order of events. The binary, asymmetric, transitive, and irreflexive relation that comprises the partial order is denoted "$<_i$". The subscript i may be omitted when the transaction's identifier is known from the context. Events include read and write operations; $r_i[x]$ denotes that transaction $T_i$ has read resource x, i.e., has retrieved its state, and $w_i[x]$ means that transaction $T_i$ has written resource x, i.e., has modified its state. A transaction has also an event of deciding whether to commit or abort its results; $e_i$ means this decision event of $T_i$.

Axioms

2. A transaction $T_i$ has exactly a single event $e_i$. A value is assigned to $e_i$ as follows: $e_i=c$ if the transaction is committed; $e_i=a$ if the transaction is aborted. $e_i$ may be denoted $c_i$ or $a_i$ when $e_i=c$ or $e_i=a$ respectively.

3. For any operation $p_i[x]$ that is either $r_i[x]$ or $w_i[x]$, $p_i[x] <_i e_i$.

Definitions

4. Two operations on a resource x, $p_i[x]$, $q_j[x]$ are conflicting if they do not commute (i.e., operations performed in different orders result in different resource states, e.g., if $p_i[x]$ is $w_i[x]$ and $q_j[x]$ is $r_j[x]$).

5. A complete history H over a set T of transactions is a partial order with a relation $<_H$ defined according to the following axioms 6, 7 and 8.

Axioms

6. If $T_i$ is in T and $event_a <_i event_b$, then $event_a <_H event_b$.

7. If $T_i$ and $T_j$ are in T then for any two conflicting operations $p_i[x]$, $q_j[x]$, either $p_i[x] <_H q_j[x]$ or $q_j[x] <_H p_i[x]$.

8. Let $T_i$, $T_j$ be transactions in T and $r_j[x]$ a read operation. If $w_i[x] <_H r_j[x]$ then either $e_i <_H r_j[x]$ or $r_j[x] <_H e_i$. (This axiom provides a unique definition of the history's semantics because if $e_i=a$ the effect of $w_i[x]$ is undone; i.e. reading x after $e_i$ results in reading a state of x that existed just before $w_i[x]$.) (Note: The subscript H in $<_H$ may be omitted when H is known from the context.)

Definitions

9. A history is any prefix of a complete history. A prefix of a partial order P over a set S is a partial order P' over a set S'⊆S, with the following properties:

If b∈S' and a $<_P$ b then also a∈S'

If a,b∈S' then a $<_{P'}$ b if and only if a $<_P$ b

10. A transaction $T_2$ is in conflict with transaction $T_1$ if for respective conflicting operations $q_2[x]$, $p_1[x]$, $p_1[x]<q_2[x]$. (Note that this definition is asymmetric.)

11. If $p_1[x]$ is $w_1[x]$ and $q_2[x]$ is $w_2[x]$ then $T_2$ is in a ww conflict with transaction $T_1$.

12. If $p_1[x]$ is $w_1[x]$ and $q_2[x]$ is $r_2[x]$ then $T_2$ is in a wr conflict with transaction $T_1$.

13. If $p_1$ is $r_1[x]$ and $q_2[x]$ is $w_2[x]$ then $T_2$ is in a rw conflict with transaction $T_1$.

14. There is a conflict equivalence between two histories H and H' (the two are conflict equivalent) if they are both defined over the same set of transactions T, and consist of the same transaction events (for partially executed transactions), and $p_i[x] <_H q_j[x]$ if and only if $p_i[x] <_{H'} q_j[x]$ for any conflicting operations $p_i[x]$, $q_j[x]$ of any committed transaction $T_i$, $T_j$ respectively in T (i.e. H and H' have the same conflicts between operations of committed transactions).

15. A history H over a transaction set T is serial if for every two transaction $T_i$, $T_j$ in T the following is true: If $p_i[x] <_H q_j[y]$ then for any other operations $s_i[u]$, $t_j[v]$ in H $s_i[u] <_H t_j[v]$ (i.e. all the operations of $T_i$ precede all the operations of $T_j$).

16. A history is serializable (SER; is in SER) if it is conflict equivalent to some serial history.

17. A Serializability Graph of a history H, SG(H), is the directed graph SG(H)=(T,C) wherein T is the set of all unaborted (i.e. committed and undecided) transactions in H, and C (a subset of T×T) is a set of edges that represent transaction conflicts such that for any two transactions $T_1$, $T_2$ in T, there is an edge from $T_1$ to $T_2$ if $T_2$ is in a conflict with $T_1$. The Committed Transactions Serializability Graph of a history H, CSG(H), is the subgraph of SG(H) with all the committed transactions as nodes and with all respective edges. The Undecided Transaction Serializability Graph of a history H, USG(H), is the subgraph of SG(H) with all the undecided transactions as nodes and with all the respective edges.

The Serializability Theorem

18. A history H is serializable (is SER) if and only if CSG(H) is cycle-free.

Definitions

19. A transaction $T_2$ reads a resource x from transaction $T_1$ if $T_2$ reads x, and $T_1$ is the last transaction to write x before being read by $T_2$ (i.e. $W_1[x]<r_2[x]$ and there is no $W_3[x]$ such that $W_1[x]<W_3[x]<r_2[x]$). A history H is recoverable (REC; is in REC) if no committed transaction in H has read resource state written by an aborted transaction in H. To guarantee this, if for any two transactions $T_1$, $T_2$ in H, whenever $T_2$ reads any resource from $T_1$, $T_2$ is committed only after $T_1$ has been committed. Formally: ($T_2$ reads x from $T_1$) and $e_2=c$ implies (($e_1<e_2$ and $e_1=c$) or ($e_1<r_2[x]$ and $e_1=a$)).

20. A history H avoids cascading aborts (ACA; is in ACA, is cascadeless) if any transaction in H reads resources written by committed transactions only. Let $T_1$, $T_2$ be any two transactions in H. The following expression is a formal representation of this concept:

$T_2$ has read x from $T_1$ implies $e_1<r_2[x]$.

21. Let $T_1$, $T_2$ be any two transactions in H. H is strict (ST; is in ST; has the strictness property) if $w_1[x]<p_2[x]$ implies $e_1<p_2[x]$ where $p_2[x]$ is either $r_2[x]$ or $w_2[x]$.

Theorem

22. REC⊃ACA⊃ST where ⊃ denotes a strict containment. (This theorem follows immediately from the definitions.)

Definitions

23. Two Phase Locking (2PL) is a serializability mechanism that implements two types of locks: write locks and read locks. A write lock blocks both read and write operations of a resource, while a read lock blocks write operations only. 2PL consists of partitioning a transaction's duration into two phases: In the first locks are acquired; in the second locks are released.

24. A history is in Strong-Strict Two-phase Locking (S-S2PL) if for any conflicting operations $p_1[x]$, $q_2[x]$ of transactions $T_1$, $T_2$ respectively in H $p_1[x]<q_2[x]$ implies $e_1<q_2[x]$. (Note: A history is a two-phase locking if it can be generated by the two-phase locking mechanism. Strict two-phase locking requires that write locks issued on behalf of a transaction are not released until its end; however, read locks can be released earlier, at the end of phase one of the two-phase locking mechanism. Strong-Strict Two-Phase locking requires that all locks are not released before the transaction ends (when it is either committed or aborted.) Strong-Strict Two-Phase locking blocks any conflicting operations on a resource accessed by a transaction until the end of the transaction.)

25. A mechanism is blocking if in some situations it delays operations in a transaction until certain events occur in other transactions.

26. A history property is inherently blocking if it can be enforced by blocking mechanisms only.

27. A history property is non inherently blocking if it can be enforced by any non-blocking mechanism. (Note: Both serializability and recoverability are non inherently blocking because they can always be guaranteed by aborting a violating transaction any time before it ends. This observation is the basis for optimistic concurrency control, where transactions run without blocking each other's operations, and are aborted only when ended if violating serializability or any other desired property. Two-phase locking and ACA on the other hand are inherently blocking.)

28. A transaction is decided if it is either aborted or committed; otherwise it is undecided.

29. An undecided transaction is ready if it has completed its processing, and is prepared either to be committed or aborted; otherwise it is active.

30. A transaction is undecided if it is either ready or active.

Commitment Ordering Definition

31. A history has the Commitment Ordering property (i.e., is in CO) if for any conflicting operations $p_1[x]$, $q_2[x]$ of committed transactions $T_1$, $T_2$ respectively, $p_1[x]<q_2[x]$ implies $e_1<e_2$. Formally: ($e_1=c$ and $e_2=c$ and $p_1[x]<q_2[x]$) implies $e_1<e_2$.

Commitment Ordering Theorem

32. SER⊃CO (i.e., Commitment Ordering Implies Serializability.)

Proof: Let a history H be a CO, and let $\ldots \to T_i \to \ldots \to T_j \to \ldots$ be a (directed) path in CSG(H). Using the CO definition and an induction by the order on the path we conclude immediately that $c_i<c_j$. Now suppose that H is not in SER. By the Serializability Theorem (1.18) (without loss of generality) there is a cycle $T_1 \to T_2 \to \ldots \to T_n \to T_1$ in CSG(H) where $n \geq 2$. First let $T_i$ and $T_j$ above be $T_1$ and $T_2$ of the cycle respectively (consider an appropriate prefix of the expression describing the cycle). This implies by the observation above that $c_1<c_2$. Now let $T_i$ and $T_j$ be $T_2$ and $T_1$ respectively (consider an appropriate suffix of the expression describing the cycle). This implies that $c_2<c_1$. However, $c_1<c_2$ and $c_2<c_1$ contradict each other since the relation "<" is asymmetric. Hence CSG(H) is acyclic, and H is in SER by the Serializability Theorem. Now examine the following serializable, non CO history to conclude that the containment is strict: $r_1[x] \; w_2[x] \; c_2 \; c_1$ Definitions 33. Timestamp Ordering (TO) concurrency control mechanisms provide serializability and are based on a time-stamp $ts(T_i)$ (e.g., a real number) associated with each transaction $T_i$; timestamps are distinct.

Timestamp Ordering Rule

34. For any two conflicting operations $p_1[x]$, $q_2[x]$ of any committed transactions $T_1$, $T_2$ respectively, $ts(T_1)<ts(T_2)$ implies $p_1[x]<q_2[x]$. (Note: timestamp ordering is non-blocking (because it can be enforced by aborting either $T_1$ or $T_2$ after all their operations have been issued), and provides the basis for optimistic timestamp ordering based concurrency control, as well as a basis for blocking Timestamp Ordering based mechanisms.)

Blocking Timestamp Ordering Rule

35. For any two conflicting operations $p_1[x]$, $q_2[x]$ of any transactions $T_1$, $T_2$ respectively, $ts(T_1)<ts(T_2)$ implies $p_1[x]<q_2[x]$. (Note: This Blocking Timestamp Ordering rule requires that conflicting operations are scheduled according to the timestamps order regardless of whether the respective transactions are committed.)

Timestamp Commitment Ordering Rule

36. For any two committed transaction $T_1$, $T_2$ with respective conflicting operations, $ts(T_1)<ts(T_2)$ implies $e_1<e_2$. Formally: ($e_1=c$ and $e_2=c$ and ($p_1[x]$, $q_2[x]$ conflict) and $ts(T_1)<ts(T_2)$) implies $e_1<e_2$.

Theorem

37. A history has the Commitment Ordering property if and only if it is generated by a mechanism that obeys both the Timestamp Ordering Rule (34) and the timestamp Commitment Ordering Rule (36). (Note: This theorem means that if the Timestamp Commitment Ordering (TCO) rule is being enforced by any Timestamp Ordering mechanism, then only histories having the Commitment Ordering Property are generated. The TCO rule can be enforced by delaying commitment events when necessary to comply with the timestamp order.)

Definitions

38. Transaction Termination Scheduler (TTS) is an RM component that monitors the set of transactions and decides when and which transaction to commit or abort. In a multi-resource manager environment this component participates in atomic commitment procedures on behalf of its resource manager and controls (within the respective resource manager) the execution of the decision reached via atomic commitment for each relevant transaction.

39. A Commitment Ordering Transaction Terminating Scheduler (COTTS) performs the following procedure or its equivalent:

(a) The COTTS maintains a serializability graph, USC, of all undecided transactions. Every new transaction processed by the RM is reflected as a new node in USG; every conflict between transactions in USG if reflected by a directed edge (an edge between two transactions may represent several conflicts though). USG(H)=(UT, C) where UT is the set of all undecided transactions in a history H; and C (a subset of UT×UT) is the set of directed edges between transactions in UT. There is an edge from $T_1$ to $T_2$ if $T_2$ is in a conflict with $T_1$. The USG reflects all operation's conflicts until commit. The set of transactions aborted as a result of committing T (to prevent future commitment-ordering violation) is defined as follows:

$$ABORT_{CO}(T) = \{T' | T' \to T \text{ is in } C\}$$

The COTTS iteratively performs the following steps:

(a) selects any ready transaction (i.e. that has completed processing) T in USG (using any criteria, possibly by priorities assigned to each transaction; a priority can be changed dynamically as long as the transaction is in USG), and commit it;

(b) aborts all the transactions in the set $ABORT_{CO}(T)$, i.e. all the transactions (both ready and active) in USG that have an edge going to T; and (c) removes any decided transaction (T and the aborted transactions) from the graph (they do not belong in USG by definition).

Theorem

40. The Commitment Ordering Transaction Termination Scheduler (COTTS) produces histories having the Commitment Ordering (CO) Property.

Proof: The proof is by induction on the number of iterations by the COTTS, starting from an empty history $H_0$, and an empty graph $USG_0 = USG(H_0)$. $H_0$ is CO. Assume that the history $H_n$, generated after iteration n, is CO. $USG_n$ (in its UT component) includes all the undecided transactions in $H_n$. Now perform an additional iteration, number n+1, and commit transaction $T_1$ (without loss of generality—wlg) in $USG_n$. $H_{n+1}$ includes all the transactions in $H_n$ and the new (undecided) transactions that have been generated after completing step n (and are in $USG_{n+1}$). Examine the following cases after completing iteration n+1:

(a) Let $T_2$, $T_3$ (wlg) be two committed transactions in $H_n$. If $T_3$ is in conflict with $T_2$ then $c_2 < c_3$ since $H_n$ is CO by the induction hypothesis.

(b) $c_2 < c_1$ for every (previously) committed transaction $T_2$ in $H_n$ with which $T_1$ is in a conflict.

(c) Suppose that a committed transaction $T_2$ is in a conflict with $T_1$. This means that $T_1$ is in $abort_{CO}(T_2)$, and thus was aborted when $T_2$ was committed. This is a contradiction.

The cases above exhaust all possible pairs of conflicting committed transactions in $H_{n+1}$. Hence $H_{n+1}$ is CO.

(Note: If there exists a transaction that does not reside on any cycle in USG then there exists a transaction T with no edges from any other transaction. T can be committed without aborting any other transaction since $ABORT_{CO}(T)$ is empty. If all the transactions in USG are on cycles, at least one transaction has to be aborted. This situation seems to be uncommon. In a multi RM environment, the RM (TTS) typically receives a request (via an atomic commitment protocol) to commit some transaction T in the USG, all transactions in $ABORT_{CO}(T)$, i.e. with edges to T, need to be aborted when T is committed (by the COTTS). Thus, the COTTS has to delay its yes vote on T if it has voted yes on any transaction in ABORT(T) to guarantee a consistent commit order in all the RMs involved (enforcing CDDC for pairs of conflicting transactions; see definition 50 below). The TTS may choose to vote yes on T immediately (the non-blocking without delays approach). Another approach (non-blocking with delays) is to delay the voting on T for a given amount of time. During the delay the set $ABORT_{CO}(T)$ may become smaller or empty. If T is in a ready state the set cannot increase. Instead of immediately committing, or delaying the voting on T for a given amount of time (which may result in aborts) the TTS can block the voting on T until all transactions in $ABORT_{CO}(T)$ are decided. However, if another RM in the environment also blocks, this may result in a global deadlock.)

Definition

41. A CORTTS is a COTTS which generates histories that are both CO and recoverable. The CORTTS maintains an enhanced serializability graph, wr-USG:

$$wr\text{-}USG(H) = (UT, C, C_{wr})$$

where

UT is the set of all undecided transactions in the history H; and C is the set of edges between transactions in UT. There is a C edge from $T_1$ to $T_2$ if $T_2$ is only in non "read from" wr conflicts with $T_1$. $C_{wr}$ is the set of edges between transactions in UT with wr conflicts as well. There is a $C_{wr}$ edge from $T_1$ to $T_2$ if $T_2$ has read from $T_1$ (and possibly $T_2$ is also in conflicts of other types with $T_1$). C and $C_{wr}$ are disjoint. The set of transactions aborted as a result of committing T (to prevent future commitment-ordering violation) is defined as follows:

$$ABORT_{CO}(T) = \{T' | T' \to T \text{ is in } C \text{ or } C_{wr}\}$$

The definition of $ABORT_{CO}(T)$ here has the same semantics as of the respective set for COTTS. The set of aborted transactions due to recoverability, as a result of aborting transaction T', is defined as follows:

$ABORT_{REC}(T') = \{T'' | T' \to T'' \text{ is in } C_{wr} \text{ or } T''' \to t'' \text{ is in } C_{wr}$ where T''' is in $ABORT_{REC}(T;)\}$ Note that the definition is recursive. This well reflects the nature of cascading aborts. The CORTTS iterates the following steps: (a) select any ready transaction T in wr-USG, that does not have any in-coming $C_{wr}$ edge (i.e. such that T is not in $ABORT_{REC}(T')$ for any transaction T' in $ABORT_{CO}(T)$; this to avoid a need to later abort T itself), and commit it; (b) abort all the transaction T' (both ready and active) in $ABORT_{CO}(T)$; (c) abort all the transaction T'' (both ready and active) in $ABORT_{REC}(T')$ for every T' aborted in the previous step (cascading aborts); and (d) remove any decided transaction (T and all the aborted transactions) from the graph. (Note: during each iteration wr-USG should reflect all operation's conflicts till commit.)

Theorem

42. The CORTTS produces CO, recoverable histories

Proof: The histories generated are CO by theorem 40 since CORTTS differs from COTTS only in aborting additional transactions during each iteration (due to the recoverability requirement). Since all the transactions that can violate recoverability (transactions in $ABORT_{REC}(T')$ for every aborted transaction T' in $ABORT_{CO}(T)$ are aborted during each iteration (i.e. transactions that read data written by an aborted transaction before the abort), the generated histories are recoverable. (Note: The CORTTS can be implemented as a non-blocking without delays, with delays and blocking TTS With results similar to those discussed above in the notes about the COTTS.)

Corollaries

43. A COTTS generates histories that are serializable.

44. A CORTTS generates histories that are both serializable and recoverable.

45. Non-blocking schedulers based on COTTS and CORTTS generate deadlock free executions only. (Note: The TTSs above can be combined with any resource access scheduler (RAS) for scheduling resource access operations. If both the TTS and the RAS are non-blocking, then also the combined mechanism is non-blocking, and hence ensures deadlock-freeness. A combination of a RAS and another TTS can replace a RAS above, if some filtering (by a TTS) is required to impose further history properties. In this case the filtering TTS may only abort transaction. But it does not matter if the RAS produces serializable histories since the CO TTSs above guarantee serializability. The combined mechanism may execute as follows: First, the transactions are controlled by the RAS (or a RAS with a TTS). The unaborted, ready transactions are considered by the COTTS as candidates to be committed, and transactions are aborted if violating the CO TTS's conditions. Note that if the scheduler above is S-S2PL based, then the USG of the respective CO TTS does not have any edges. This means that no aborts by the CO TTS are needed, as one can expect, and a CO TTS is unnecessary. This is an extreme case. Other scheduler types can induce other properties of the respective USGs to impose desired schedule patterns and system behaviors, according to the nature of the transactions involved. Note also that if the combined CC mechanism (a RAS, or a RAS and a TTS) guarantees the Recoverability property, and implements CDDC (see definition 50 below) for transaction pairs having "read from" conflicts, the COTTS is sufficient (no need for CORTTS because recoverability is inherited, the same is true also for cascadelessness and strictness). When the scheduler is Timestamp Ordering (TO) based and CO is desired, CO can be imposed by enforcing the Timestamp Commitment Ordering rule.

Definitions

46. An environment comprises a distributed services system having a plurality of Resource Managers (RMs), where a transaction can span any subset of participating RMs. Each RM in an environment has an identifier (e.g. RM 2). Events are qualified by both a transaction's identifier and an RM's identifier (e.g. $w_{3,2}[x]$ means a write operation of resource x by RM 2 on behalf of transaction $T_3$).

Axiom

47. If $P_{i,j}[x]$, $q_{k,l}[y]$, $j \neq l$ are operations (by RMs j, l respectively), then $x \neq y$; i.e. these operations cannot conflict.

Definitions

48. A global transaction $T_i$ consists of one or more local subtransactions. A local subtransaction $T_{i,j}$ accesses all the data under the control of RM j that $T_i$ needs to access, and only these resources (i.e. all its events are qualified with j). A local subtransaction obeys the definition of a transaction. A local subtransaction has the states as defined in definitions 28, 29 and 30.

49. A local history is generated by a single RM, and defined over the set of its local subtransactions. A local history obeys the definition 9 of a history. $H_i$ is the history generated by RM i with a relation $<_{Hi}$.

It is assumed that an atomic commitment (AC) protocol is applied to guarantee atomicity in the distributed environment. See definition 50 below. It is also assumed that a commit decision delegation condition (CDDC) is applied by each RM participating in the AC protocol when different transactions have dependent commit decisions. See definition 50 below.

50. An AC protocol implements the following general scheme each time a transaction is decided: Each participating RM votes either "Yes" or "No" (but not both) after the respective local subtransaction has reached the "ready" state, or votes "No" if unable to reach the "ready" state. The transaction is committed by all RMs if and only if all have voted "Yes". Otherwise it is aborted by all the RMs. (Note: 2PC is a special case of AC.) In what follows we distinguish between the commit decision events by the AC protocol, and the commit events in the individual RMs. We consider only the commit decision events of the AC protocol which are unique for every committed transaction.

An RM obeys CDDC for $T_1$ and $T_2$ if, after voting yes on $T_1$, it does not vote yes on $T_2$ before committing or aborting $T_1$.

Example: The following two transactions both access resources x and y. x, y are under the control of RMs 1, 2 respectively. $T_1$ and $T_2$ and their local transactions are the following:

| RM 1 | $T_{1,1}$: $r_{1,1}[x]$ $c_1$ | $T_{2,1}$: $w_{2,1}[x]$ $c_2$ |
|------|-------------------------------|-------------------------------|
| RM 2 | $T_{1,2}$: $r_{1,2}[y]$ $c_1$ | $T_{2,2}$: $w_{2,2}[y]$ $c_2$ |
|      | $T_1$                         | $T_2$                         |

The RMs generate the following (local) histories $H_1$ and $H_2$:

RM 1: $H_1$ $r_{1,1}[x]$ $w_{2,1}[x]$ $c_2$ $c_1$

RM 2: $H_2$ $w_{2,2}[y]$ $c_2$ $r_{1,2}[y]$ $c_1$

Note that the history $H_1$ violates commitment-ordering which results in a (global) serializability violation. The respective global history H is described by the following order relationships:

$$r_{1,1}[x] < w_{2,1}[x] < c_2 < r_{1,2}[y] < c_1$$

$$w_{2,2}[y] < c_2$$

51. For any history property X a (global) history H is in Local-X (is locally X) if the local history of every RM in the environment is in X (is X).

Theorem

52. A history is in X (is globally X) if and only if it is in Local-X (i.e. Local-X=X), where X is any of the following properties: REC, ACA, ST, CO, S-S2PL.

Proof: Follows from the definition of Local-X, Axiom 47, AC, CDDC, and the definitions of REC, ACA ST, CO and S-S2PL.

Theorem

53. Being in Local-X does not imply that a history is in X (i.e. Local-X⊃X), where X is any of the following properties: SER, 2PL, S2PL.

Proof: Let H be the history as in the example above. The history H is in Local-SER, Local-2PL and Local-S2PL since both $H_1$ and $H_2$ are in SER, 2PL and S2PL. However H is not in SER, 2PL or S2PL. CSG(H) has a cycle, so by the serializability Theorem (18) the H is not in SER. If it is in 2PL or S2PL, it is also in SER, and we have a contradiction.

Theorem

54. SER⊃Local-CO. In other words if a history is in Local-CO then it is globally serializable. This theorem follows from the Commitment Ordering theorem and theorem 52.

(Note: Local-CO can be maintained by RMs using any types of CO mechanisms.)

Definition

55. Let S be a system over a set of possible states, STATES. S guarantees a property P if every state in STATES is in P. In what follows, global histories generated by a multiple-RM environment are considered states of the environment. A permanent risk (PR) transaction is a transaction that can cause a potential serializability violation when committed, and will stay in this situation forever. The PR property is relative to the resource manager. The above requirement implies that each RM in the environment should implement the following Commitment Strategy (CS): Starting from a history with no decided transactions any ready transaction is committed (usually the RM is requested via an AC protocol to commit some transaction). Every other transaction that is a PR is aborted. (hidden axiom is assumed here, that resources are not held unnecessarily. Otherwise PR transactions can be marked and kept undecided for ever.) Then another (any) ready transaction, that cannot cause a serializability violation, is committed. Again all the PR transactions are aborted, and so forth. Ready transactions can be committed concurrently if CDDC is maintained for any pair of transactions $T_1$, $T_2$ such that $T_2$ is in a conflict with $T_1$.

Theorem

56. If only local serializability information is available for each RM in the environment, and if atomic commitment is applied, then CS is a necessary strategy for each RM, in order to guarantee global serializability. CS produces locally CO histories (global histories in Local-CO).

Proof: The Serializability Theorem implies that the serializability graph provides all the necessary information about serializability. We assume that every RM, say RM i, "knows" its local serializability graph $SG_i$ (it includes all the committed and undecided transactions only) and its subgraphs $CSG_i$ (includes committed transactions only) and $USG_i$ (includes all undecided transactions). We also assume (based on AC) that each RM has committed a transaction, if and only if it has voted "Yes", and "knows" that all other RMs participating in a transaction have voted "Yes", and will eventually commit it. The goal for each RM is to guarantee a cycle-free (global) CSG (committed transaction serializability graph), by avoiding any action that may create a global cycle (local cycles in $CSG_i$ are eliminated by RM i). First, CS is trivially necessary for the following reasons: Since a PR transaction remains PR for ever (by definition), it cannot be committed and must be aborted to free resources. On the other hand, any ready transaction that cannot cause a serializability violation can be committed. We now need to identify permanent risk (PR) transactions, while implementing CS. We show that this implies that each RM operates as a COTTS. Each RM implements CS as follows:

(a) Base stage: Assume that $CSG_i$ does not include any transaction. Commit any ready transaction T. Suppose that prior to committing T there is an edge T'→T in $USG_i$. It is possible that there is an edge T→T' in some $USG_j$ of some RM j, j≠i, but RM i, though, cannot verify this. This means that committing T' later may cause a cycle in CSG. Since committing T cannot be reversed (see transaction state transitions in section 3), no event can change this situation. Hence T' is a PR, and RM i must abort it.

(b) Inductive stage: Suppose that $CSG_i$ includes one transaction at least. We show that no ready transaction can cause a serializability violation if committed, and hence can be committed (provided that a consensus to commit is reached by all the participating RMs via AC): Commit any ready transaction T. Examine any undecided transaction T' (in $USG_i$.) Suppose that prior to committing T there is an edge T'→T in $USG_i$. Using again the arguments given for the base stage, T' is a PR, and RM i must abort it (by voting "No" via AC). If there is no edge from T' to T, no decision concerning T' is taken at this stage. Examine now any previously committed transaction T". It is impossible to have a path T→ . . . →T" in $CSG_i$ or in $CSG_j$ for any RM j, j≠i since if this path existed at the stage when T" was committed, it would have been disconnected during that stage, when aborting all transactions with edges to T" (using the arguments given for the base stage above), and since no incoming edges to T" could have been generated after T" has been committed. Hence, only a path T"→ . . . →T can exist in $CSG_i$ or in $CSG_j$ for any RM j, j≠i. This means that no cycle in CSG through T and T" can be created, and no T" needs to be aborted (which would fail the strategy).

The arguments above ensure that no ready transaction can cause a serializability violation when committed at the beginning of an inductive stage, as was assumed, and hence (any ready transaction) T could have been committed.

In the CS implementation above all the PR transactions are identified and aborted at each stage. Examining this implementation we conclude that it functions as a COTTS. Hence, by theorem 40 every RM involved produces a CO history, and the generated (global) history is locally CO (in Local-CO). The only possible deviation from the implementation above is by aborting additional transactions at each stage. Such a deviation still maintains the generated history in Local-CO.

Corollary

57. If RMs coordinate concurrency control via atomic commitment only, then guaranteeing local commitment-ordering is a necessary and sufficient condition for guaranteeing (global) serializability. This corollary follows from theorems 52, 55 and 56.

Corollary

58. If RMs coordinate concurrency control via atomic commitment only, then guaranteeing local commitment-ordering and local recoverability are a necessary and sufficient condition for guaranteeing (global) serializability and recoverability. This corollary follows from Theorem 52.

59. A Global deadlock is a deadlock caused by a mutual blocking of two or more local subtransactions in two different transactions at least, by two different RMs at least. (Notes: Since commitment-ordering is not inherently blocking, it can be implemented in a non blocking manner, for example, by aborts or by aborts after delays. If the schedulers of all the RMs in the environment are non-blocking (with the exception of one that can be blocking), the executions are deadlock-free.

Another way to implement commitment-ordering is by using blocking CO certifiers (CO schedulers with a non-blocking RAS and a blocking TTS). If the schedulers for all RMs are certifiers, when two at least are blocking, the global deadlocks can occur (even if each RM resolves its own deadlocks). In this case all the transactions involved with a deadlock are in a ready state. This fact allows to resolve deadlocks during atomic commitment.

If schedulers of two or more RMs are blocking, where one, at least, has a blocking RAS (e.g. S-S2PL, or CO, BTO based), then also active transactions can be involved with a global deadlock. In this case atomic commitment messages are not sufficient for deadlock resolution, and additional messages signaling the presence of blocks (possibly piggybacked on AC messages of other transactions) are required).
Definitions 60. Extended Commitment Ordering (ECO) is a property of histories that guarantees global serializability when applied locally (in each RM) together with (local) serializability. ECO generalizes Commitment Ordering (CO) by distinguishing between local transactions (i.e., confined to a single RM) and global ones (i.e., span two or more RMs). A history is ECO if the order of any two committed, global transactions on any path in the committed transaction serializability graph (CSG; i.e., as reflected by the direction of edges) matches the order of the respective commitment events. Thus, ECO applies the commitment order condition to global transactions. ECO is not inherently blocking, and can be implemented in a non-blocking manner, which guarantees deadlock-freeness if also the local serializability mechanism is non-blocking. The price for this, however, is the possibility of cascading aborts when recoverability is applied.

61. Let $\Gamma$ be a set of directed graphs $G_k$ (k is a member in some set of integers I), all of them over the same set of nodes T. G, the union graph over $\Gamma$ is a directed graph over all the nodes in all the graphs $G_k$, with all the edges of all the graphs. Formally: A node $T_i$ is a node of G if and only if it is a node of some $G_k$ in $\Gamma$. G has an edge $(T_i,T_j)$ if and only if this is an edge in some $G_k$ in $\Gamma$.

62. Lemma

Let an environment consist of a set of RMs, {RM k | is in I}, that are coordinated via Atomic Commitment (AC) protocols. Let $H_k$ be the history of RM k, and let H be the global history in the environment. Then CSG(H) is the union graph over the set of all the graphs $CSG(H_k)$.

Proof: Since the RMs in the environment are coordinated via AC, global atomicity is guaranteed, and a transaction $T_i$ is a node in $CSG(H_k)$ for every RM k that participates in $T_i$ if and only if it is committed. $T_i$ is also a node in CSG(H) if and only if it is committed. Thus, $T_i$ is a node in CSG(H) if and only if it is a node in all $CSG(H_k)$ such that RM k participates in $T_i$. Similar arguments hold for edges that represent conflicting operations between committed transactions.

Definition

63. The (binary) relation $\Rightarrow$ (reads: precedes in CSG) is a relation between two committed transactions. Let $T_1$, $T_2$ be two committed transactions in a history H. $T_1 \Rightarrow T_2$ (reads: $T_1$ precedes $T_2$ in CSG(H)) if there is a (directed) path in CSG(H) from $T_1$ to $T_2$. The notation $\Rightarrow_k$ is used for $CSG(H_k)$, where $H_k$ is the history of RM k.

Lemma

64. A history H is in CO if and only if for any two committed transactions $T_1$, $T_2$, in H $T_1 \Rightarrow T_2$ implies $c_1 < c_2$.

Proof: (i) Suppose that a history H is in CO. For any two committed transactions $T_1$, $T_2$, in H, an edge $T_1 \rightarrow T_2$ in CSG(H) means that $T_2$ is in conflict with $T_1$. H being in CO implies that $c_1 < c_2$ (by the definition of CO). Suppose that $\ldots \rightarrow T_i \rightarrow \ldots T_j \rightarrow \ldots$ is a (directed) path in CSG(H). By the above observation and an induction by the order on the path, we conclude that $c_i < c_j$. Using the definition of $\Rightarrow$, we conclude that for any two transactions $T_i$, $T_j$ in CSG(H), $T_i \Rightarrow T_j$ implies $c_i < c_j$; (ii) If for any two committed transactions, $T_i$, $T_j$, $T_i \Rightarrow T_j$ implies $c_i < c_j$, this is particularly true for paths in CSG(H) of length one, i.e., if the edge $T_i$, $T_j$ is in CSG(H) then $c_i < c_j$. Thus $T_j$ being in a conflict with $T_i$ implies $c_i < c_j$, and H is in CO.

Definition

65. A history H is in ECO if for any two committed, global transactions $T_1$, $T_2$ respectively in H, $T_1 \Rightarrow T_2$ implies $c_1 < c_2$. Formally: ($c_1 = c$ and $c_2 = c$ and ($T_1$ is global) and ($T_2$ is global) and $T_1 \Rightarrow T_2$) implies $C_1 < c_2$. In particular, a history $H_k$ generated by RM k is in ECO if and only if for any two committed, global transactions $T_1$, $T_2$ respectively, $T_1 \Rightarrow_k T_2$ implies $c_1 < c_2$.

Theorem

66. ECO$\supset$CO (i.e., CO implies ECO). Proof: (i) Suppose that a history is in CO. Thus, for any two transactions $T_i$, $T_j$, $T_i \Rightarrow T_j$ implies $c_i < c_j$. This is true particularly for two global transactions $T_i$, $T_j$, which implies ECO; (ii) To conclude that the containment is strict, examine the following (local) history that is in ECO but not in CO: $w_1[x]r_2[x]w_3[x]C_2c_1c_3$ where $T_1$, $T_3$ are global and $T_2$ is a local transaction.

67. ECO=Local-ECO (i.e., a global history is in ECO if and only if it is in Local-ECO).

Proof: (i) Let a history H be in Local-ECO. By lemma 62 $T_i \Rightarrow T_j$ implies (without loss of generality) that there exist sequences of RMs and global transactions such that $T_i = TR_0 \Rightarrow_{RM\_1} TR_1 \Rightarrow_{RM\_2} \cdots \Rightarrow_{RM\_m} TR_m \Rightarrow_{RM\_m+1} \cdots \Rightarrow_{RM\_n} TR_n = T_j$ where $TR_m$ is a global transaction with participating RMs R__m and R__m+1 (and possibly others), where M=0, ..., n−1. Since every RM is in ECO (by definition of Local-ECO), $TR_m \Rightarrow_{RM\_m+1} TR_{m+1}$ implies $c(TR_m) < c(TR_{m+1})$ where $c(TR_m)$ is the commit event of $TR_m$. Thus, $c(TR_0) < c(TR_n)$. Hence, $T_i \Rightarrow T_j$ implies $c_i < c_j$, and H is in ECO;

(ii) If a history H is in ECO, then $T_1 \Rightarrow T_2$ implies $c_1 < c_2$ for any two committed global transactions in H. By lemma 62 $T_1 \Rightarrow_k T_2$ implies $T_1 \Rightarrow T_2$. Thus, by the claim above for every RM k in the environment and any two global transactions, $T_1$, $T_2$, $T_1 \Rightarrow_k T_2$ implies $c_1 < c_2$, and H is in Local-ECO.

68. SER$\supset$ Local-SER-ECO (=Local-ECO$\cap$Local-SER) (i.e., local ECO together with local serializability imply global serializability. In spite of the fact that Local-SER$\supset$SER (theorem 53), if we apply Local-ECO in addition to Local-SER, we guarantee global serializability. (Note: The notation Local-SER-ECO is used for the class Local-ECO$\cap$Local-SER that is also the class ECO$\cap$Local-SER (by theorem 67)).

Proof: Suppose that a history H is in Local-ECO and in Local-SER, and it is not in SER. Hence, CSG(H) includes a cycle. Assume (without loss of generality) that the cycle is $T_1 \rightarrow T_2 \rightarrow \ldots T_n \rightarrow T_1$.

(i) Suppose that one transaction at most (i.e., one or none) on the cycle is global. This means (follows by definition 61) that all the transactions on the cycle, with the possible exception of a single transaction, are local to the same RM k (i.e., do not span any other RMs). Thus, all conflicts represented by the cycle's edges are by operations of RM k. Hence, $CSG(H_k)$ has a cycle (the same cycle as the cycle above), which contradicts local serializability.

(ii) Suppose now that the cycle above includes two global transactions (and possibly more) $T_i,T_j$, i<j. Since H is in Local-ECO, it is also in ECO by theorem 66. $T_i,T_j$ being on a cycle implies that both $T_i \Rightarrow T_j$ and $T_j \Rightarrow T_i$ are true. This implies, by the definition of ECO, that both $c_i < c_j$ and $c_j < c_i$ are true, and again we have reached a contradiction. Thus, CSG(H) cannot have a cycle and H is in SER.

Corollary

69. If each RM in the environment generates a serializable, ECO (local) history (or a history that is CO), then the global history is serializable (since it is in Local-SER-ECO). (This is concluded from theorems 52 and 66.)

Theorem

70. Local-SER-ECO⊃ Local-CO. Proof: Local-SER-ECO= Local-∩ECO∩Local-SER by definition. Local-ECO=ECO⊃CO=Local-CO by theorems 66, 67, and 68. Also, Local-SER⊃SER⊃CO=Local-CO by definition 51 and theorems 52 and 53. Thus, Local-SER-ECO⊇ Local-CO. The following global history is in Local-SER-ECO but not in Local-CO, showing that the containment is strict:

| RM 1 | $r_{1,1}[x] \rightarrow w_{2,1}[x] \rightarrow c_2 \rightarrow c_1$ |
|---|---|
| RM 2 | $w_{2,2}[y] \rightarrow c_2$ |

In this example, $T_1$ is a local transaction; $T_2$ is global. The history is (trivially) in Local-SER-ECO but not in Local-CO.

Definition

71. Extended Timestamp Commitment Ordering Rule (ETCO): For any two global committed transactions $T_1$, $T_2$ such that EITHER $T_1 \Rightarrow T_2$, OR $T_2 \Rightarrow T_1$ AND $ts(T_1)<ts(T_2)$ implies $e_1<e_2$. Formally: $e_1=c$ and $e_2=c$ and $(T_1 \Rightarrow T_2$ or $T_2 \Rightarrow T_1)$ and $ts(T_1)<ts(T_2))$ implies $e_1<e_2$.

Theorem

72. A history is in ECO if and only if it is generated by a mechanism that obeys both the TO and the ETCO rules. This follows from the definitions of TO, ETCO and ECO. The theorem above means that if the ETCO rule is being enforced by any TO mechanism, then only ECO histories are generated. The ETCO rule can be enforced by delaying commitment events when necessary to comply with the timestamp order.

Procedure

73. The following ECO procedure enforces the ECO property on RMs' histories. The ECO procedures are executed locally in each RM involved. This is done in a cooperation with a local concurrency control mechanism (any) that guarantees local serializability, and with an atomic commitment (AC) protocol that coordinates the RMs involved with global transactions. The ECO procedures maintain the GTCO Serializability Graph (GTCO-SG), that has transactions as nodes and conflicts among them as directed edges. A distinction is made between local and global transactions. GTCO-SG(H)=(GT,LT,C) where GT is the set of all undecided global transactions in a history H; LT is the set of the following local transactions: A local transaction is in LT if it is either undecided or it is committed and has a directed path from any undecided transaction; and C (a subset of $(GT \cup LT) \times (GT \cup LT)$ is the set of directed edges between transactions in $GT \cup LT$. There is an edge from $T_1$ to $T_2$ if $T_2$ is in a conflict with $T_1$.

The set $ABORT_{ECO}(T)$ is defined to be the set of transactions aborted as a result of committing a global transaction T (to prevent future ECO violation). $ABORT_{ECO}(T)$ is constructed as follows: Let T" be a global or active transaction that has a directed path in the GTCO-SG to T (i.e., T" $\Rightarrow$ T), that does not go through any other transaction in GT. For every path from any such T" to T, $ABORT_{ECO}(T)$ includes exactly one transaction T' in GT $\cup$ LT such that either T' is T" or T' is an undecided (local) transaction such that T" $\Rightarrow$ T' and T' $\Rightarrow$ T, and if there exists a T''' such that T' $\Rightarrow$ T''' $\Rightarrow$ T, then T''' is either committed or ready. (Notes: If all the local transactions on the path above from T" to T are committed, then T'=T". T' is one of the following: The closest active neighbor of T on every path from T" to T; or a ready neighbor that does not have any active transaction on any path from T' to T. For every T in GT, there are usually several ways to select the set $ABORT_{ECO}(T)$ (i.e., it is not uniquely defined). The set is selected in a way that minimizes the cost (using any criteria) of aborting its members. A special case that uniquely determines $ABORT_{ECO}(T)$, but less optimizes it, is selecting T' to be the closest undecided (active or ready) neighbor.

In order to enforce ECO locally, the following procedure enforces CDDC for any global transactions T' and T such that T' is in $ABORT_{ECO}(T)$, A procedure that enforces ECO is as follows:

1) select any ready transaction (i.e., a transaction that has completed processing) T in the GTCO-SG (using any criteria, possibly by priorities assigned to each transaction; a priority can be changed dynamically as long as the transaction is in GTCO-SG).

2) if T is global and no YES vote has been issued (via an AC protocol) on any transaction in $ABORT_{ECO}(T)$ (to comply with CDDC), then vote YES on T. Later, asynchronously, if T is committed by the AC protocol, abort all the transactions in the set $ABORT_{ECO}(T)$; remove T and the (possibly other) aborted transactions from the graph (they do not belong in the GTCO-SG by definition); remove all committed (local) transactions that do not have a path from any undecided transaction (such transactions do not belong in the GTCO-SG by definition).

3) else (i.e., if T is local), commit T (provided that the local serializability mechanism has previously requested this by notifying that T is ready, i.e., committing T does not result in a local serializability violation). Asynchronously, if T does not have a path from any undecided transaction, remove T from the GTCO-SG (it does not belong in the GTCO-SG by definition). (Note: During each iteration, the GTCO-SG should reflect all operations' conflicts of all its transactions until T is committed.)

Theorem

74. Histories generated by a scheduler that involves the above procedure are in ECO.

Proof: The proof is by induction on the number of iterations by the algorithm, starting from an empty history $H_0$, and an empty graph GTCO-$SG_0$=GTCO-SG($H_0$). $H_0$ is in ECO. Assume that the history $H_n$, generated after iteration n, is in ECO. Now perform an additional iteration, number n+1, and commit transaction $T_1$ (without loss of generality—wlg) in GTCO-$SG_n$. $H_{n+1}$ includes all the transactions in $H_n$ and the new (undecided) transactions that have been generated after completing step n (and are in GTCO-$SG_{n+1}$). Examine the following cases after completing iteration n+1:

(i) Let $T_1$ be a local transaction. Since no edges in SG($H_{n+1}$) into a previously committed transaction could have generated, no new paths between global committed transactions could have been generated, and thus, $H_n$ being in ECO (induction hypothesis) implies that $H_{n+1}$ is also in ECO.

(ii) Now let $T_1$ be a global transaction. (a) Let $T_2$, $T_3$ (wlg) be two (previously) committed global transactions in $H_n$. If $T_2 \Rightarrow T_3$ then $c_2<c_3$ since $H_n$ is ECO by the induction hypothesis. (b) It is obvious that $c_2<c_1$ for every (previously) global committed transaction $T_2$ in $H_n$ such that $T_2 \Rightarrow T_1$. (c) Suppose that $T_1 \Rightarrow T_2$ where $T_2$ is a global (previously) committed transaction, that was committed in step j<n+1. When $T_2$ was committed, aborting all the transactions in $ABORT_{ECO}(T_2)$ means that either one of the following is true: $T_1$ was in $ABORT_{ECO}(T_2)$ and thus was aborted earlier, contrary to the fact that $T_1$ is the last committed transaction, or all the paths in GTCO-SG($H_{j-1}$) to $T_2$ from any global transaction have been disconnected when aborting the transactions in $ABORT_{ECO}(T_2)$, and no new paths could have been generated after $T_2$ was committed, especially paths from $T_1$ to $T_2$. Thus, $T_1 \Rightarrow T_2$ is impossible, and again we have reached a contradiction.

The cases above exhaust all possible pairs of global committed transactions in $H_{n+1}$ that are related through "⇒". Hence, $H_{n+1}$ is in ECO.

(Notes: In a multi RM environment, a RM's event scheduler typically receives a request via an AC protocol to vote on committing some global transaction T in the GTCO-SG (local transactions are decided by the RM). If the scheduler can commit the transaction it votes "YES" via AC, which is an obligation to either commit or abort according to the decision reached by the AC protocol. When the scheduler commits T, all transactions in $ABORT_{ECO}(T)$ need to be aborted by procedure 73. Thus, the scheduler has to delay its YES vote on T (enforcing CDDC), if it has voted YES on any transaction in $ABORT_{ECO}(T)$, since this can result in a contradiction (i.e., in a different commit order of the two transactions in another RM) if the AC protocol decides to commit both. If YES vote on T is possible, the scheduler may choose to do so immediately upon being requested (the non-blocking without delays approach), or to delay the voting for a given, predetermined amount of time (non-blocking with delays). During the delay, the set $ABORT_{ECO}(T)$ may become smaller or empty, since its members may be decided and removed from the GTCO-SG, and since $ABORT_{ECO}(T)$ cannot increase after T has reached the ready state. Instead of immediately voting, or delaying the voting for a given amount of time (which may still result in aborts), the scheduler can block the voting on T until $ABORT_{ECO}(T)$ is empty. However, if another RM in the environment also blocks, this may result in a global deadlock (e.g., if T' is in $ABORT_{ECO}(T)$ for one RM, and T is in $ABORT_{ECO}(T')$ for another RM.)

Procedure

75. Recoverability can be enforced either by the local concurrency control mechanism that enforces CDDC for any transaction pair with "read from" conflicts, or by an enhancement of the ECO algorithm. If recoverability (or ACA or ST) is enforced by the local CC mechanism, also the combined mechanism (i.e., the CC mechanism, together with the ECO algorithm) guarantees it. If the local CC mechanism does not provide recoverability, the ECO algorithm can be enhanced to guarantee it. In the modified algorithm edges in the GTCO-SG that represent wr conflicts of a reading transaction with transactions that have written the last states read, are marked as wr edges (i.e., the GTCO-SG includes this additional information). To enforce recoverability, this wr conflict information is utilized as follows:

1) A transaction T with a marked wr conflict with a transaction T' is not committed before T' is committed; and 2) Whenever a transaction T is aborted, all the transactions T' that (recursively) have a marked wr conflict with T are aborted as well (cascading aborts). These transactions are defined by the following $ABORT_{REC}(T)$ set: $ABORT_{REC}(T)=\{T' \mid T'$ is in a marked wr conflict with T, or T' is in a marked wr conflict with some T''' in $ABORT_{REC}(T)\}$.

The following is the modified ECO-Recoverability procedure. The modifications are emphasized:

Repeat the following steps:

1) Select any ready transaction (i.e., a transaction that has completed processing) T in the GTCO-SG (using any criteria, possibly by priorities assigned to each transaction; a priority can be changed dynamically as long as the transaction is in GTCO-SG), that does not have any marked wr conflicts with any undecided transaction (in GTCO-SG).

2) If T is global and no YES vote has been issued (via an AC protocol) on any transaction in $ABORT_{ECO}(T)$, then vote YES on T. Later, asynchronously, if T is committed (by the AC protocol), abort all the transactions in the set $ABORT_{ECO}(T)$ and in the sets $ABORT_{REC}(T')$ for every T' in $ABORT_{REC}(T)$; if T is aborted, abort also all transactions in $ABORT_{REC}(T)$; remove T and the (possibly other) aborted transactions from the graph (they do not belong in the GTCO-SG by definition); remove all committed (local) transactions that do not have a path from any undecided transaction (such transactions do not belong in the GTCO-SG by definition).

3) Else (i.e., if T is local), commit T (provided that the local serializability mechanism has previously requested this by notifying that T is ready, i.e., committing T does not result in a local serializability violation. Asynchronously, if T does not have a path from any undecided transaction, remove T from the GTCO-SG (it does not belong in the GTCO-SG by definition).

(Notes: During each iteration, the GTCO-SG should reflect all operations' conflicts of all its transactions until T is committed. If a local transaction T is (asynchronously) aborted by the scheduler, rather than becoming ready, then also the transactions in $ABORT_{REC}(T)$ are aborted, and the aborted transactions are removed from the GTCO-SG).

Theorem

76. Histories generated by a scheduler that involves procedure 75 are in both ECO and REC.

Proof: The arguments given in the proof of theorem 74 for procedure 73 hold true also for procedure 75, and thus, histories generated by procedure 75 are in ECO.

The discussion above, describing the modifications in procedure 73 explains how recoverability is maintained after each iteration of procedure 75. Thus, only recoverable histories are generated by the algorithm.

Definitions

77. Theorem 68 implies that if all the RMs in the environment provide (local) serializability (i.e., the global history is in Local-SER), and are coordinated via AC protocols, then Local-ECO is a sufficient condition for global serializability (SER).

We now show that if Local-SER is applied, and all the RMs in the environment have the extended knowledge autonomy property (i.e., the RMs are coordinated solely via AC protocol, and can identify local transactions), then Local-ECO is also a necessary condition for guaranteeing global serializability (SER).

Theorem

78. If all the RMs in the environment have the extended knowledge autonomy property, and each of them provides (local) serializability (i.e., the global history is in Local-SER), then guaranteeing Local-ECO is a necessary condition for guaranteeing global serializability (SER).

Proof: Suppose that guaranteeing Local-ECO is not necessary for guaranteeing global serializability under the conditions above. Let Y be the most general history property (class) that is necessary. Since under the conditions above Local-ECO is a sufficient condition, the following is true:

(i) Y⊃ECO (strict containment; if Y=ECO, then guaranteeing ECO is the necessary property, contrary to our assumption above).

The above assumption, together with theorem 68 imply:

(ii) SER⊃Local-Y∩Local-SER⊃Local-ECO∩Local-SER.

Suppose that the environment includes two RMs that generate local serializable histories: Rm 1 that generates histories in Y, and RM 2 that generates histories in ECO, which are also in Y (by (i)). Hence, all the global histories generated are in Local-Y (by definition of Local-Y) as well as in Local-SER, and thus also in SER (by (ii)).

We now schedule transactions in the environment above in such a way that the following global history H is generated:

It includes two global transactions $T_1$, $T_2$ where $c_2 < c_1$, with the following characteristics:

$w_{1,1}[x] < w_{2,1}[x]$, i.e. $T_1 \Rightarrow T_2$, which is possible since $H_1$ is in Y by the assumption above, and not necessarily in ECO (by i; otherwise Y collapses to ECO, and (i) is contradicted).

$w_{2,2}[x] < w_{1,2}[x]$, i.e. $T_2 \Rightarrow T_1$ as should exist since $H_2$ is in ECO by the assumption above.

$T_1 \Rightarrow T_2$ and $T_2 \Rightarrow T_1$ imply that CSG(H) has a cycle, i.e., H is not in SER (theorem 2.1) and we have reached a contradiction.

Hence, guaranteeing ECO is a necessary condition.

Corollary

79. Local ECO and local serializability (Local-SER-ECO) is a necessary and sufficient condition for guaranteeing (global) serializability in an environment of RMs that have the extended autonomy property. (This is concluded from theorems 68 and 78.)

Conclusion

80. These proofs show that applying ECO locally in each RM that participates in global transactions via atomic commitment (AC) protocols guarantees global serializability in a multi Resource Manager (RM) environment. ECO in this environment optimizes the RMs' concurrency control, and can be implemented as non-blocking (optimistic) mechanisms. Because ECO can be enforced locally in each RM, no change in existing atomic commitment protocols and interfaces is required to utilize the ECO solution to the global serializability problem. The only additional knowledge that a RM needs to implement ECO is that about its local transactions. Therefore, ECO is a practical solution for the global serializability problem in a high-performance, distributed transaction processing environment.

What is claimed is:

1. A computer-implemented method of processing global transactions that are distributed across a computing system and local transactions that are not distributed across the computing system, said method comprising the steps of:

a) preparing results of said local and global transactions under the control of a resource manager that insures serializability of a local schedule of said local transactions;

b) checking for memory access conflicts among said local and global transactions, not all of said local and global transactions having memory access conflicts, and when said checking for memory access conflicts finds that one of said local and global transactions has a first operation that conflicts with a second operation in another one of said local and global transactions, recording in memory of said computing system an order of performance for the transactions having the first conflicting operation and the second conflicting operation;

c) after a plurality of said global transactions which conflict with each other have prepared results that are ready to be committed, selecting an abort set of transactions for a selected one of said plurality of said global transactions which conflict with each other and have prepared results that are ready to be committed, said abort set being selected based on said order of performance having been recorded in memory and being selected so that (1) each uncommitted global transaction excluded from said abort set other than the selected global transaction would not conflict directly or indirectly with the selected global transaction after aborting all transactions in said abort set, and (2) each transaction for which preparation of results has begun that is not yet ready to be committed and that is excluded from said abort set would not conflict directly or indirectly with the selected global transaction after aborting all transactions in said abort set, whereby said order of performance having been recorded in said memory is consistent with the committing of the selected global transaction and commitment at a later time of global transactions that are excluded from the abort set, and wherein said abort set includes at least one global transaction which conflicts indirectly with the selected global transaction via at least one local transaction conflicting with each of said selected global transaction and said at least one global transaction such that commitment of said at least one global transaction after commitment of the selected global transaction would be inconsistent with said order of performance having been recorded in said memory; and d) committing to memory state of said computing system prepared results of said selected global transaction, and aborting prepared results of said transactions in said abort set.

2. The method as claimed in claim 1, wherein said committing of said selected global transaction occurs in response to an atomic commitment protocol with said resource manager.

3. The method as claimed in claim 2, wherein said atomic commitment protocol includes the steps of:

e) the resource manager signaling that said selected global transaction has been prepared and is ready to be committed; and then f) the atomic commitment protocol requesting the resource manager to commit to memory state of said computing system prepared results of said selected global transaction.

4. The method as claimed in claim 3, wherein said atomic commitment protocol further comprises the step of requesting said resource manager to signal whether said selected global transaction has been prepared and is ready to be committed.

5. The method as claimed in claim 3, further comprising the step of said resource manager receiving a request to prepare another one of said global transactions, and said resource manager delaying acknowledgement of completion of preparation of results of said another one of said global transactions when an abort set for said another one of said global transactions must include said selected global transaction after said resource manager has signaled that said selected global transaction has been prepared and is ready to be committed.

6. The method as claimed in claim 2, wherein after said step d), said method further comprises the steps of said resource manager:

e) selecting another abort set of said transactions for another one of said global transactions for which results have been prepared, f) placing a lock on said another abort set to prevent results of transactions in said another abort set from being committed, g) transmitting a signal in an atomic commitment protocol indicating that results of said another one of said global transactions are ready to be committed, and then h) in response to an abort signal in said atomic commitment protocol, releasing said lock on said another abort set and aborting said results of said another one of said global transactions.

7. The method as claimed in claim 1, wherein there exist more than one non-empty abort set such that said order of performance recorded in said memory of said computing system is consistent with the committing of said selected global transaction and commitment at a later time of global transactions that are excluded from each non-empty abort set, and wherein said step of selecting an abort set determines which of the non-empty abort sets has a minimum performance loss due to the aborting of results of transactions in each non-empty abort set, and selects the non-empty abort set having said minimum performance loss.

8. The method as claimed in claim 1, further comprising the step of delaying the committing of the prepared results of said selected global transaction until said abort set becomes empty in order to minimize the number of transactions having results that are aborted in said step d).

9. The method as claimed in claim 1, further comprising the step of delaying acknowledgement of completion of preparation of a specified one of said global transactions until committing of said specified one of said global transactions before committing all other of said global transactions not yet committed nor aborted is consistent with said order of conflicts.

10. The method as claimed in claim 9, further comprising the step of terminating said delaying when said delaying persists for a predetermined duration of time.

11. The method as claimed in claim 9, further comprising the step of terminating said delaying upon receipt of a termination signal from an atomic commitment protocol coordinating commitment of said specified one of said global transactions.

12. The method as claimed in claim 1, wherein said checking for memory access conflicts includes detecting when a data access operation for one transaction addresses data accessed by data access operations for other transactions.

13. The method as claimed in claim 1, wherein said method includes a step of committing prepared results of said at least one local transaction, said step of committing prepared results of said at least one local transaction being performed prior to performing said step of selecting an abort set.

14. The method as claimed in claim 1, wherein a read operation of a second one of said transactions reads write data written by a write operation of a first one of said transactions before said first one of said transactions is committed, and wherein said method further comprises the step of aborting results of all of said transactions that have read data written by aborted transactions.

15. The method as claimed in claim 1, wherein said method includes a step of committing prepared results of a first local transaction and a step of committing prepared results of a second local transaction, and wherein said local schedule has a commit order of said first and second local transactions that is contrary to an order of conflicts between said first and second local transactions.

16. The method as claimed in claim 1, wherein said step of recording in memory of said computing system includes recording in said memory a graph of conflict orders between said local and global transactions, and wherein said step of selecting an abort set includes searching said graph for determining said abort set, said abort set including a transaction on each path in said graph to said selected global transaction from a global transaction not yet having results aborted or committed to memory state of said computing system, and said abort set further including a transaction on each path in said graph to said selected global transaction from a local transaction that has not completed preparation of results.

17. The method as claimed in claim 16, wherein said searching said graph for determining said abort set includes, for each of said paths, searching for and including in said abort set a transaction not yet having results aborted or committed that is closest to said selected global transaction.

18. The method as claimed in claim 16, further comprising the steps of removing from said graph committed local transactions when said committed local transactions do not have any paths in said graph from transactions that are not yet committed nor aborted.

19. The method as claimed in claim 1, wherein said step of preparing results of said local and global transactions includes said resource manager managing memory locks to insure seralizability of said local schedule of said local transactions.

20. The method as claimed in claim 1, wherein said step of preparing results of said local and global transactions includes said resource manager comparing time stamps of said local transactions to time stamps of memory resources to insure serializability of said local schedule of said local transactions.

21. A computer-implemented method of processing global transactions that are distributed across a computing system and local transactions that are not distributed across the computing system, said computing system including local processors for processing local transactions and at least one global coordinator, said method comprising the steps of:

a) a local processor receiving from said global coordinator requests to perform global transactions;

b) said local processor servicing a transaction queue for scheduling and performing operations of said local and global transactions such that operations of some of said local and global transactions are performed in accordance with availability of resources of said digital computer before commitment of other of said local and global transactions, and said local processor employing memory locks to insure that the operations of local transactions provide consistent results;

c) said local processor checking for memory access conflicts among said local and global transactions, not all of said local and global transactions having memory access conflicts, and when said checking for memory access conflicts finds that one of said local and global transactions has a first operation that conflicts with a second operation in another one of said local and global transactions, recording in memory of said computing system an order of performance for the transactions having the first conflicting operation and the second conflicting operation; and d) after a plurality of said global transactions which conflict with each other have results that are ready to be committed by said local processor, said local processor selecting an abort set of transactions for a selected one of said plurality of said global transactions which conflict with each other and have results that are ready to be committed by said local processor, said abort set being selected based on said order of performance being recorded in said memory and being selected so that (1) each uncommitted global transaction excluded from said abort set other than the selected global transaction would not conflict directly or indirectly with the selected global transaction after aborting all transactions in said abort set, and (2) each transaction for which preparation of results has begun that is not yet ready to be committed and that is excluded from said abort set would not conflict directly or indirectly with the selected global transaction after aborting all transactions in said abort set, whereby said order of performance recorded in said memory is consistent with the committing of the selected global transaction and commitment at a later time of global transactions that are excluded from the abort set, and wherein said abort set includes at least one global transaction which conflicts indirectly with the selected global transaction via at least one local transaction conflicting with each of said selected global transaction and said at least one global transaction such that commitment of said at least one global transaction after commitment of said selected global transaction would be inconsistent with said order of performance having been recorded in said memory; and e) said local processor committing to memory state of said computing system prepared results of said selected global transaction, and aborting prepared results of said transactions in said abort set.

22. The method as claimed in claim 21, further including the step of said local processor delaying commitment of global transactions for which preparation of results by said local processor has been completed but for which commitment before commitment of other of said global transactions is contrary to said order of performance.

23. The method as claimed in claim 21, further including the step of said local processor delaying acknowledgement of completion of preparation of results of a requested one of said global transactions until commitment of said requested one of said global transactions before committing all other of said global transactions not yet committed nor aborted is consistent with said order of performance.

24. The method as claimed in claim 23, further comprising the step of said local processor terminating said delaying acknowledgement upon receipt of a signal.

25. The method as claimed in claim 21, wherein said checking for memory access conflicts is performed during the preparation of results for transactions having conflicting operations.

26. The method as claimed in claim 21, wherein a read operation of a second one of said transactions reads write data written by a write operation of a first one of said transactions before said first one of said transactions is committed, and wherein said method further comprises the step of said local processor aborting all results prepared by said local processor of said transactions that have read data written by aborted transactions.

27. The method as claimed in claim 21, wherein said step of scheduling ensures consistent results of local transactions by ensuring serializability of a local schedule and includes said local processor committing prepared results of a first local transaction and committing prepared results of a second local transaction, wherein said local schedule has a commitment order of said first and second local transactions that is contrary to an order of conflicts between said local transactions.

28. The method as claimed in claim 21, wherein after said step d), said method further comprises said local processor:

f) selecting an abort set of said transactions for one of said global transactions for which results have been prepared, g) placing a lock on said abort set to prevent results of transactions in said abort set from being committed, h) transmitting a signal in an atomic commitment protocol indicating that results of said one of said global transactions is ready to be committed, and then i) in response to an abort signal in said atomic commitment protocol, releasing said lock on said abort set and aborting said results of said one of said global transactions.

29. The method as claimed in claim 21, wherein said step of recording in memory of said computing system includes said local processor recording in said memory a graph of conflict orders between said local and global transactions, and wherein said step of selecting an abort set includes said local processor searching said graph for an abort set of transactions, said abort set including a transaction on each path in said graph to said selected global transaction from a global transaction not yet having results aborted or committed to memory state of said computing system.

30. The method as claimed in claim 29, wherein said searching said graph for determining said abort set includes, for each of said paths, searching for and including in said abort set a transaction that is not yet committed nor aborted and is closest to said selected global transaction.

31. The method as claimed in claim 29, further comprising the steps of removing from said graph committed local transactions when said committed local transactions do not have any paths in said graph from transactions that are not yet committed nor aborted.

32. In a distributed processing system, a digital computer system for processing global transactions that are distributed across said distributed processing system and local transactions that are not distributed across said distributed processing system, said digital computer system comprising, in combination:

a) means for servicing a transaction queue for performing operations of said local and global transactions such that operations of some transactions are performed in accordance with availability of resources of said digital computer system before commitment of other transactions, and means for managing memory locks such that the operations of local transactions provide consistent results;

b) means for checking for memory access conflicts among said local and global transactions, not all of said local and global transactions having memory access conflicts, and when said checking for memory access conflicts finds that one of said local and global transactions has a first operation that conflicts with a second operation in another one of said local and global transactions, recording in memory of said computing system an order of performance for the transactions having the first conflicting operation and the second conflicting operation; and c) means, operative after a plurality of said global transactions which conflict with each other have results that are ready to be committed, for selecting an abort set of transactions for a selected one of said plurality of said global transactions which conflict with each other and have results that are ready to be committed, said abort set being selected based on said order of performance having been recorded in said memory and being selected so that (1) each uncommitted global transaction excluded from said abort set other than the selected global transaction would not conflict directly or indirectly with the selected global transaction after aborting all transactions in said abort set, and (2) each transaction for which preparation of results has begun that is not yet ready to be committed and that is excluded from said abort set would not conflict directly or indirectly with the selected global transaction after aborting all transactions in said abort set, whereby said order of performance having been recorded in said memory is consistent with the committing of the selected global transaction and commitment at a later time of uncommitted global transactions that are excluded from the abort set, and wherein said abort set includes at least one global transaction which conflicts indirectly with the selected global transaction via at least one local transaction conflicting with each of said selected global transaction and said at least one global transaction such that commitment of said at least one global transaction after commitment of said selected global transaction would be inconsistent with said order of performance having been recorded in said memory; and d) means for committing to memory state of said computing system prepared results of said selected global transaction, and aborting prepared results of said transactions in said abort set.

33. The digital computer system as claimed in claim 32, further including means responsive to said abort set being non-empty for delaying the commitment of said selected global transaction and the aborting of transactions in said abort set.

34. The digital computer system as claimed in claim 33, further comprising means for terminating said delaying in response to a signal in an atomic commitment protocol.

35. The digital computer system as claimed in claim in claim 31, wherein said means for aborting includes means for aborting all of said transactions that have read data written by aborted transactions.

36. The digital computer system as claimed in claim 32, further comprising means for exchanging information about global transactions in accordance with an atomic commitment protocol.

37. The digital computer system as claimed in claim 32, wherein said means for recording includes means for recording in memory of said digital computer system a graph of conflict orders between said transactions, and wherein said means for selecting an abort set includes means for searching said graph for determining said abort set of transactions, said abort set including a transaction on each path in said graph to said selected global transaction from a global transaction not yet having results aborted or committed to memory state of said digital computer system.

38. The digital computer as claimed in claim 37, further comprising means for removing from said graph committed local transactions when said committed local transactions do not have any path in said graph from transactions that are not yet committed nor aborted.

* * * * *